(12) United States Patent
Willi et al.

(10) Patent No.: US 10,470,558 B2
(45) Date of Patent: Nov. 12, 2019

(54) TOOTHBRUSH WITH MOVED ELEMENTS

(71) Applicant: TRISA HOLDING AG, Triengen (CH)

(72) Inventors: Christoph Willi, Beromünster (CH); Pierre Kirchhofer, Eich (CH); Armin Bärtschi, Winznau (CH); Vivek Patel, Old Bridge, NJ (US); Matthew Kwang, Old Bridge, NJ (US); Gerhart Huy, Hamilton Sq., NJ (US)

(73) Assignee: TRISA HOLDING AG, Triengen (CH)

( * ) Notice: Subject to any disclaimer, the term of this patent is extended or adjusted under 35 U.S.C. 154(b) by 389 days.

(21) Appl. No.: 15/319,872

(22) PCT Filed: Jun. 24, 2015

(86) PCT No.: PCT/EP2015/064217
§ 371 (c)(1),
(2) Date: Dec. 19, 2016

(87) PCT Pub. No.: WO2015/197671
PCT Pub. Date: Dec. 30, 2015

(65) Prior Publication Data
US 2017/0135462 A1 May 18, 2017

(30) Foreign Application Priority Data
Jun. 27, 2014 (EP) ..................... 14174758

(51) Int. Cl.
*A46B 7/06* (2006.01)
*A46B 7/02* (2006.01)
(Continued)

(52) U.S. Cl.
CPC ................ *A46B 7/06* (2013.01); *A46B 7/02* (2013.01); *A46B 9/04* (2013.01);
(Continued)

(58) Field of Classification Search
CPC .... A46B 7/06; A46B 7/02; A46B 9/04; A46B 2200/1006; A46B 2200/1066;
(Continued)

(56) References Cited

U.S. PATENT DOCUMENTS 5,839,148 A * 11/1998 Volpenhein .............. A46B 7/06
15/167.1
5,996,157 A 12/1999 Smith et al.
(Continued)

FOREIGN PATENT DOCUMENTS

EP 0454625 A1 10/1991

OTHER PUBLICATIONS

Dec. 27, 2016 International Preliminary Report on Patentability issued in International Patent Application No. PCT/EP2015/064217.
(Continued)

*Primary Examiner* — Shay Karls
(74) *Attorney, Agent, or Firm* — Oliff PLC

(57) ABSTRACT

A toothbrush including a main member that includes a handle portion, a neck portion and a head portion. At least one brush member, which forms at least part of the brush head along with the head portion and is movable relative to the head portion, is disposed in the head portion. The at least one brush member can be moved under the effect of a cleaning movement manually exerted on the teeth.

15 Claims, 23 Drawing Sheets

Figure 1A:
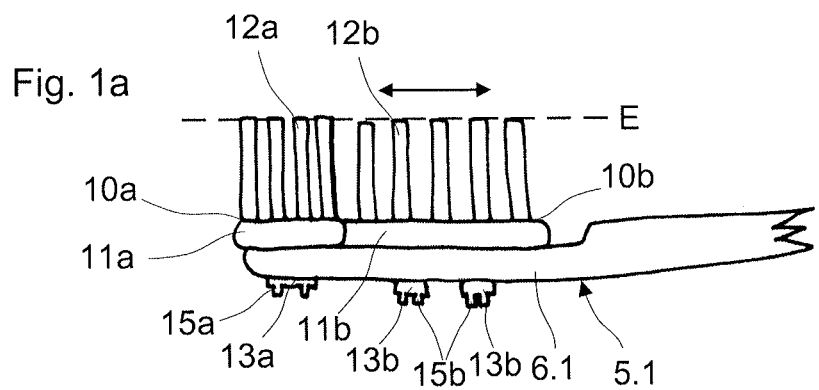

(51) Int. Cl.
- *A46B 9/04* (2006.01)
- *B29C 45/14* (2006.01)
- *B29K 23/00* (2006.01)
- *B29K 75/00* (2006.01)
- *B29L 31/42* (2006.01)

(52) U.S. Cl.
CPC ............... *A46B 2200/1006* (2013.01); *A46B 2200/1066* (2013.01); *B29C 45/14385* (2013.01); *B29K 2023/12* (2013.01); *B29K 2075/00* (2013.01); *B29L 2031/425* (2013.01)

(58) Field of Classification Search
CPC .......... B29C 45/14385; B29K 2023/12; B29K 2075/00; B29L 2031/425
See application file for complete search history.

(56) References Cited

U.S. PATENT DOCUMENTS

| | | | | |
|---|---|---|---|---|
| 6,148,462 A | * | 11/2000 | Zseng | A46B 5/0091 15/22.1 |
| 2004/0177462 A1 | * | 9/2004 | Brown, Jr. | A46B 3/16 15/167.1 |
| 2010/0205760 A1 | * | 8/2010 | Alvarenga | A46B 7/08 15/167.1 |
| 2011/0138563 A1 | * | 6/2011 | Phgura | A46B 5/0095 15/167.1 |

OTHER PUBLICATIONS

Oct. 6, 2015 International Search Report issued in International Patent Application No. PCT/EP2015/064217.

\* cited by examiner

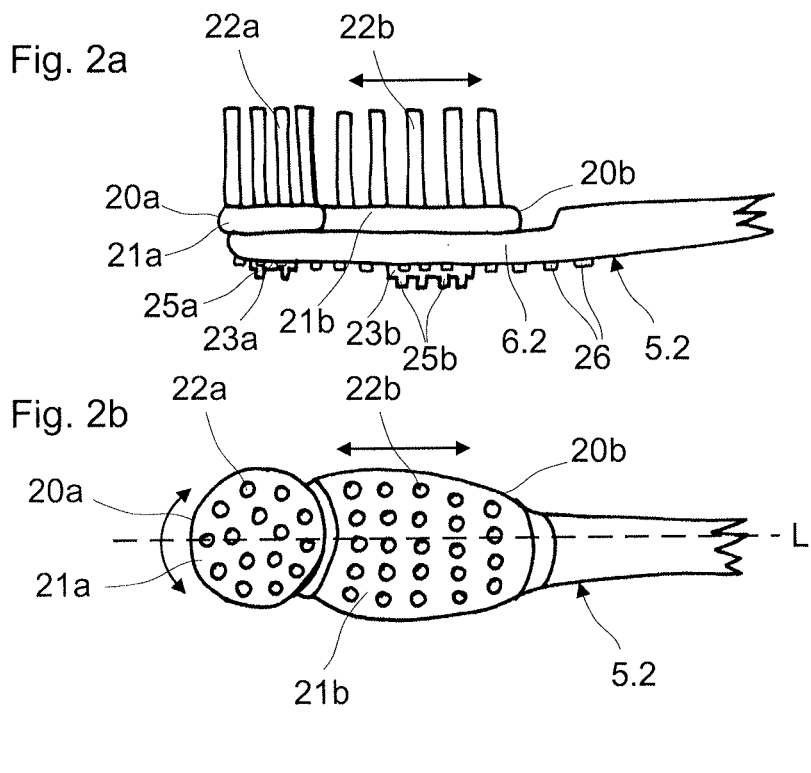
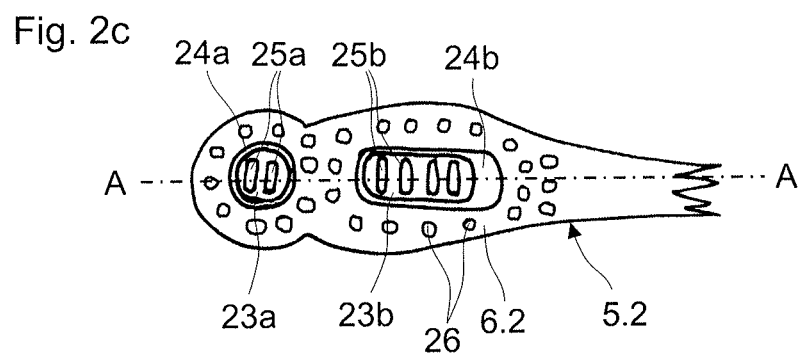
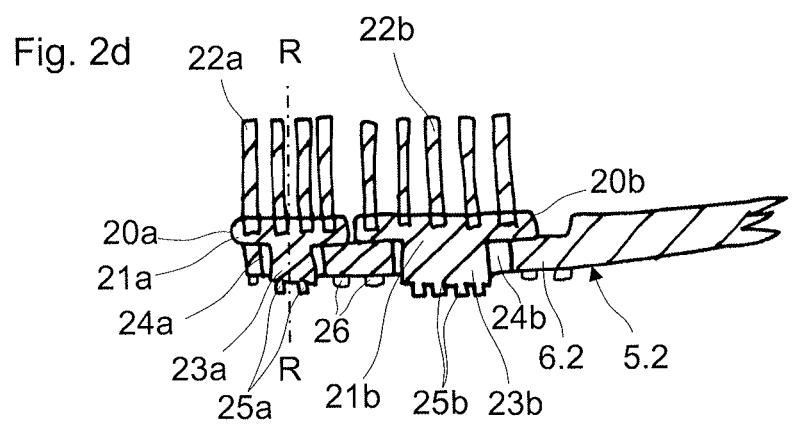

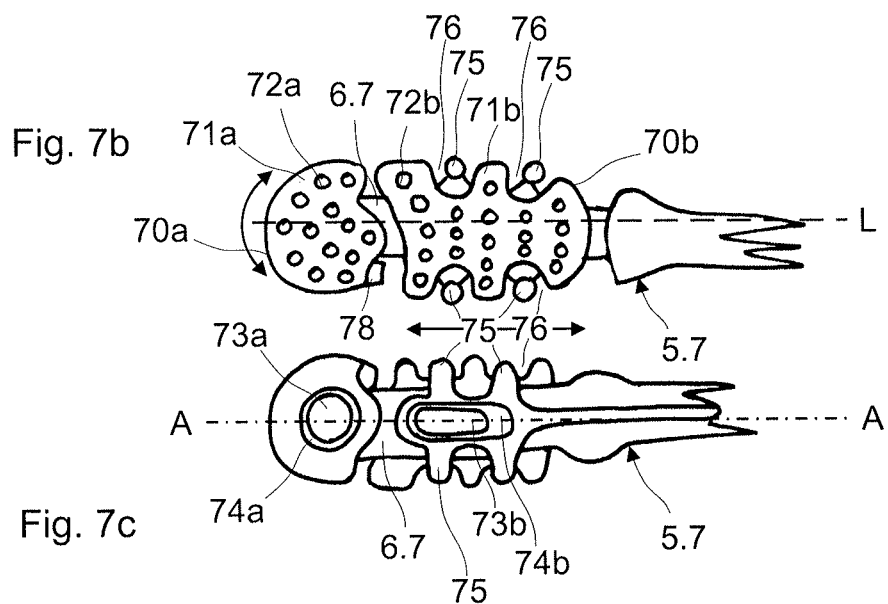
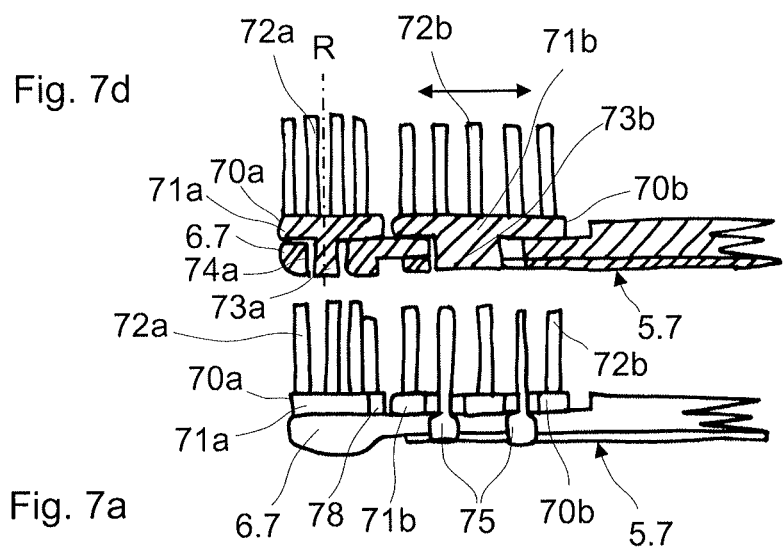

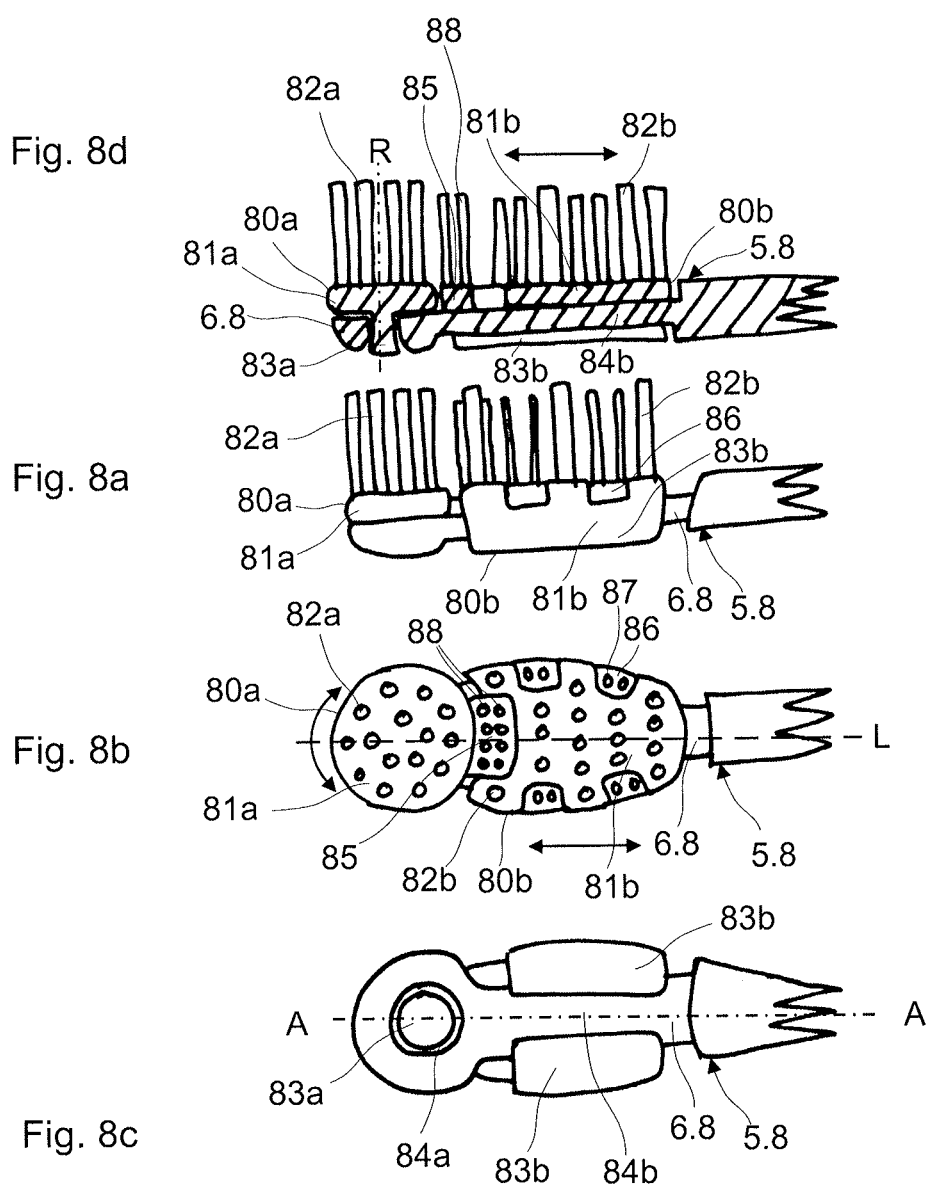

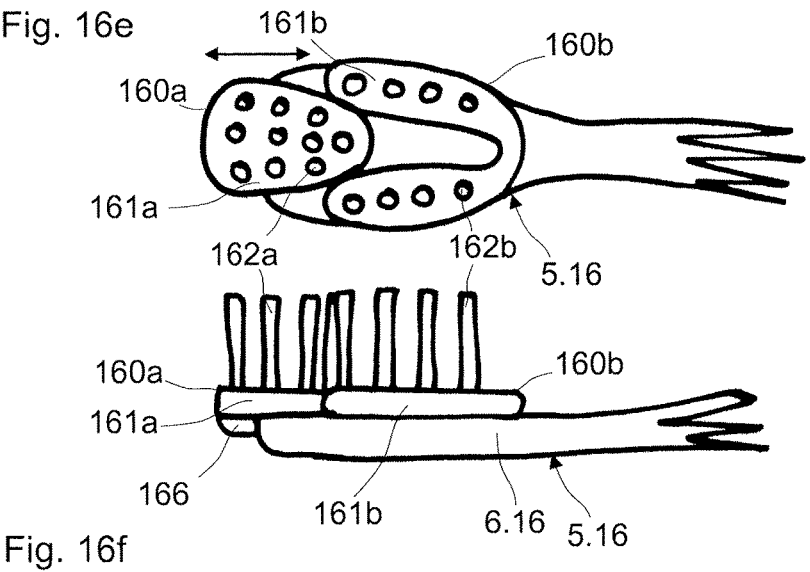
Fig. 16e
Fig. 16f
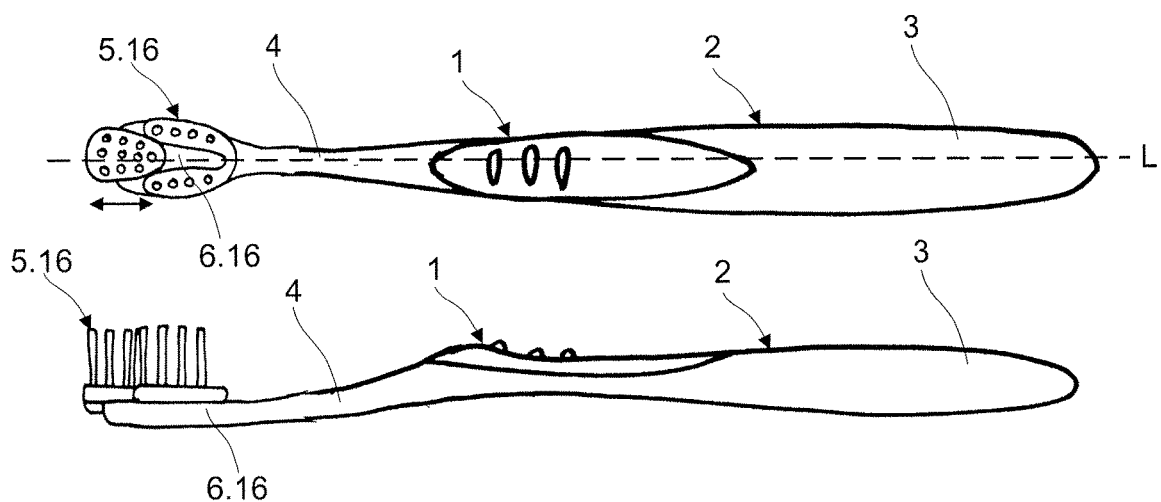
Fig. 16g
Fig. 16h

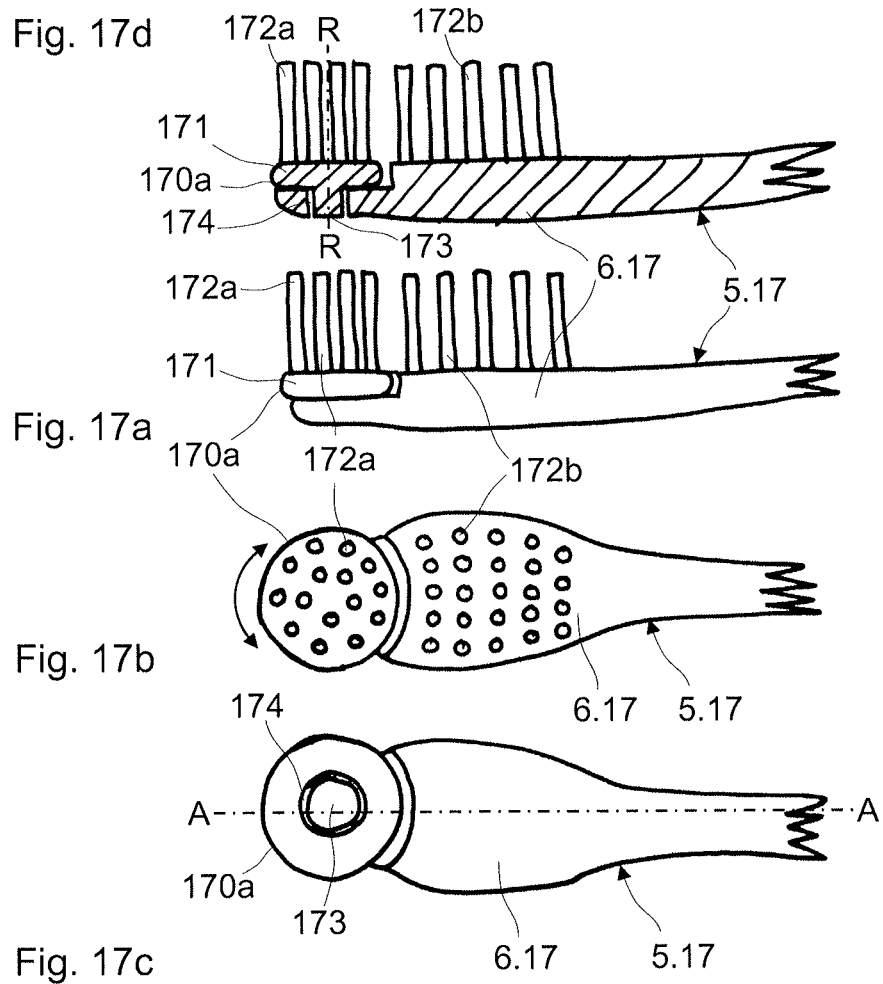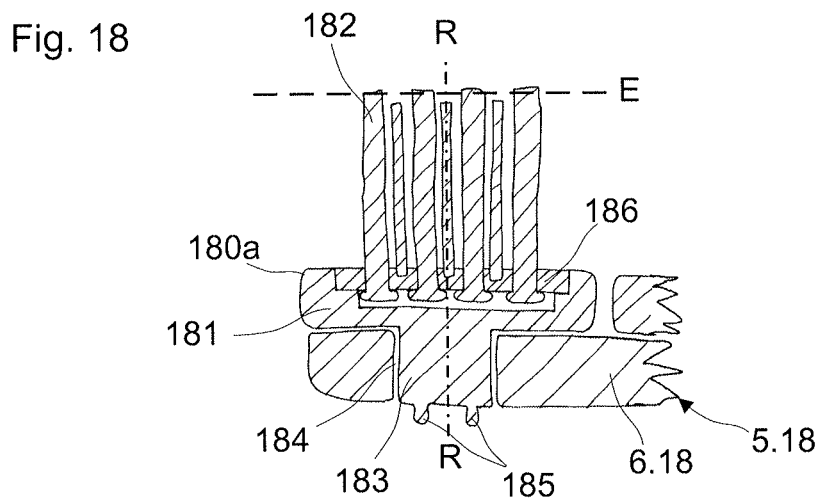

Fig. 20e
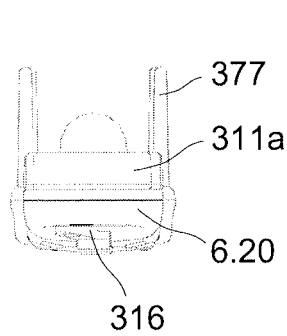
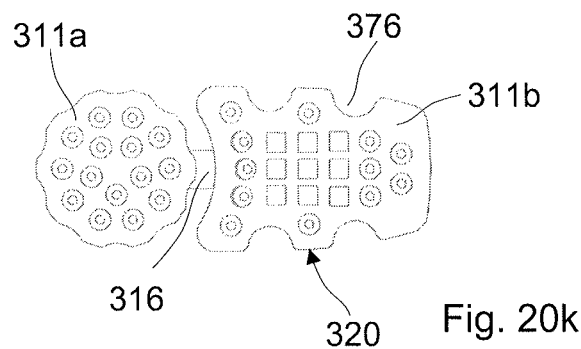
Fig. 20k
Fig. 20f
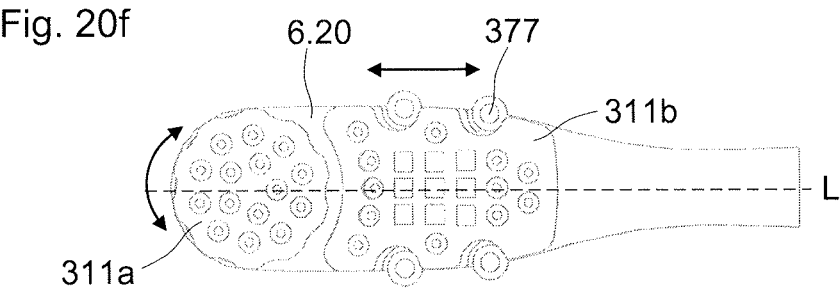
Fig. 20g
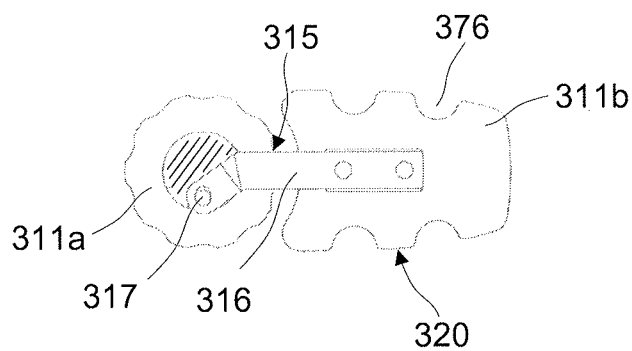
Fig. 20h
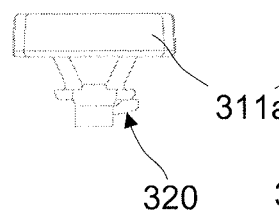
Fig. 20i
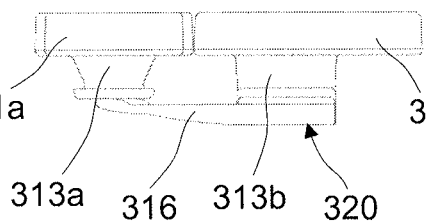
Fig. 20j
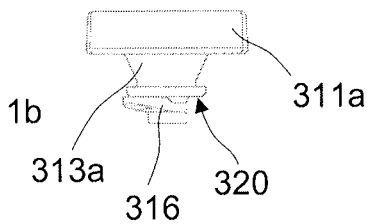

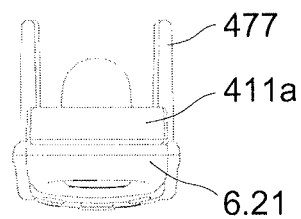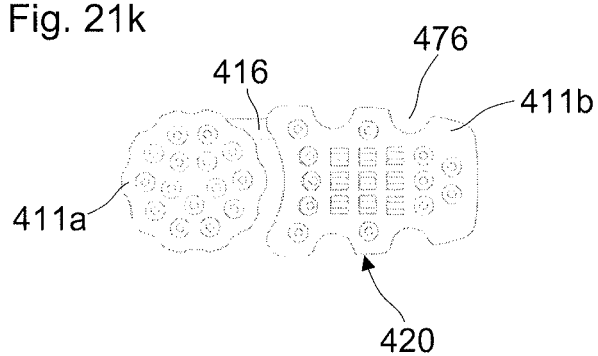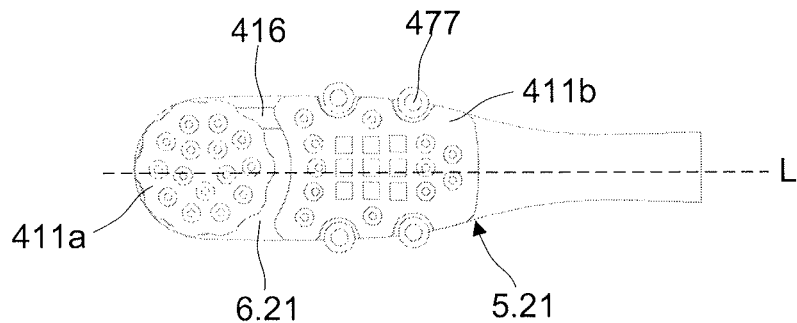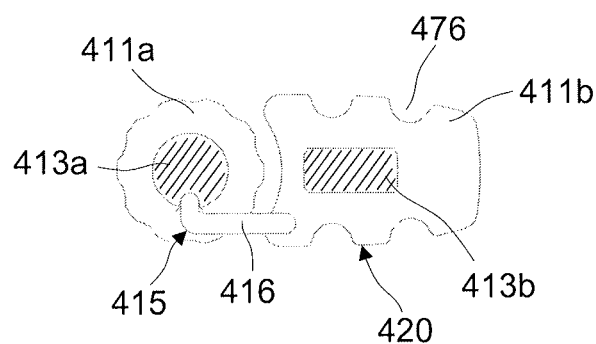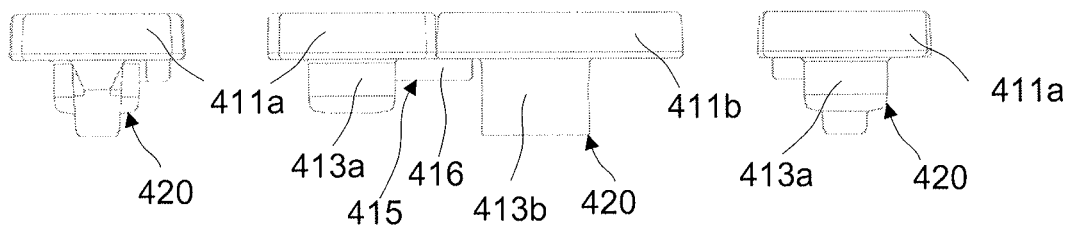

TOOTHBRUSH WITH MOVED ELEMENTS

The invention relates to the field of dental care and concerns a toothbrush comprising a main body with a grip part, with a neck part and a with head part, wherein at least one brush body with cleaning bristles and which is movable relative to the head part is arranged in the head part. The invention moreover relates to a method for manufacturing a toothbrush according to the invention.

Conventional toothbrushes, with which the bristle movement is effected exclusively by way of a cleaning movement carried out by hand, hereinafter called hand toothbrushes, comprise a bristle field of a plurality of cleaning bristles which is arranged in the brush head. The cleaning bristles are fixedly anchored in the brush head. The movement of the cleaning bristle relative to the brush head is limited to the elastic bending of the cleaning bristles.

Hand toothbrushes, with which cleaning bristles are fixed on a carrier body, and this carrier body in turn is movably attached on the brush head, are known as well.

Thus the published document U.S. Pat. No. 5,996,157 describes a hand toothbrush, with which cleaning bristles are attached to a rotary platelet. The rotary platelet with the cleaning bristles is arranged on a rotary pivot on the brush head for this. The rotary platelet with the cleaning bristles is then brought into rotation on carrying out a cleaning movement.

In contrast to electrical toothbrushes, with which a multitude of movement patterns for cleaning bristles or bristle fields are known, such a development in the field of hand toothbrushes, with which cleaning bristles or bristle fields are moveable relative to the brush head, is less advanced.

Thereby, new movement patterns of cleaning bristles or of complete bristle fields, in the case of hand toothbrushes permit improved cleaning and care effects or a more gentle dental care.

It is therefore an object of the invention, to suggest a hand toothbrush which permits optimal cleaning and care effects.

A further object of the invention is to suggest a hand toothbrush, which permits a gentle dental care.

The object is achieved by the features of claim 1. The dependent claims comprise particular embodiments and further developments of the invention.

The invention is now characterised in that at least one brush body which is movable relative to the head part and which together with the head part forms at least a part of a brush head is arranged in the head part, wherein the at least one brush body is movable relative to the head part via a cleaning movement which is exerted manually onto the teeth.

According to a further development of the invention, at least two brush bodies which are movable relative to the head part as well as relative to one another and which together with the head part form at least a part of the brush head, are arranged in the head part, wherein the at least two brush bodies are movable relative to the head part via a cleaning movement exerted manually onto the teeth.

The brush body comprises a bristle carrier, on which the cleaning bristles are arranged. The bristle carrier can have a height of 2 to 4 mm, in particular of 2 to 3 mm. The brush body can have a length of 5 to 18 mm. The brush body can have a width of 5 to 18 mm. The brush body can have a maximal diameter of 5 to 18 mm, in particular of 10 to 15 mm, in the case that this is designed in a round or elliptical, in particular circularly round manner.

The head part together with the at least one or the at least two brush bodies can form the brush head of the toothbrush.

The brush head defines a geometric cleaning plane, which corresponds to that plane which is led parallel to the surface of the teeth during the dental cleaning. The surface of the bristle ends thus lies parallel to the cleaning plane, in the case for example of equally directed bristles of the same length. The cleaning plane in particular is parallel to the longitudinal axis of the toothbrush.

The term "parallel" is basically not to be understood as a strict geometric parallelism. Essentially parallel arrangements which develop the same effect as a strictly parallel arrangement are also to fall under this term.

The brush head in particular comprises a dental care side, also front side, and a rear side which lies opposite to the dental care side. The dental care side corresponds to that side which faces the teeth to be cleaned. The cleaning bristles with their free ends in particular are directed towards the dental care side.

The main body in particular is manufactured in a single-part manner in an injection moulding method. The main body in particular comprises a hard component, which gives the main body the necessary flexural rigidity and shape stability. The main body can also consist of a hard component. The head part in particular comprises or consists of a hard component which gives this the necessary stiffness and shape stability.

The main body can be constructed of several components. A first component can be a hard component, which gives the main body shape stability. A second component can be a soft component which gives the main body additional functions, such as cleaning functions or gripping functions. The main body can thus comprise a thumb grip of a soft component.

The main body can moreover comprise a third component and, as the case may be, also further components. Each of these components can be a hard component or a soft component in each case.

The hand toothbrush in particular is a toothbrush which is not electrically operated. This means that the brush head is not motorically driven. The brush body or bodies which are movably mounted on the head part, or parts of these, in contrast are moved relative to the head part by way of the manual cleaning movement. The hand toothbrush can be a disposable or reusable toothbrush.

The cleaning bristles on the brush head form one or more bristle fields. The bristle field or fields in particular are formed by cleaning bristles on the brush bodies.

One can also envisage cleaning bristles also being arranged on the head part, additionally to the at least one brush body. The cleaning bristles in particular can be fastened directly to the head part or main body. These cleaning bristles in particular are therefore not displaceable with respect to the head part. These cleaning bristles in particular can form a part of the bristle field.

The cleaning bristles, e.g. considered in the longitudinal direction, can be arranged on the head part, laterally of, in front of or behind a brush body or between two brush bodies. Moreover, the same also applies to the subsequently described further functional elements.

The cleaning bristles can be cylindrical. The cross section of the cleaning bristles in particular is constant over the entire length of the bristle. The cross section in particular can be round, which is to say the bristles form a straight cylinder.

The ends of the cylindrical cleaning bristles can be rounded and e.g. have a hemispherical or hemisphere-like end.

The cleaning bristles can moreover also be pointed (tapered). Pointed cleaning bristles likewise in particular have a round cross section.

Cleaning bristles which are pointed in a double-sided manner have a cross section which reduces from a middle region of the cleaning bristle. This means that the ends of the cleaning bristles are pointed.

Cleaning bristles which are pointed at one side, in contrast to this have a side with a constant cylindrical cross section which leads into a hemispherical or hemisphere-like end, and have a side with a pointed end, which is to say a side of the cleaning bristle reduces in cross section and leads into a pointed end.

Cleaning bristles with pointed ends, in particular are fastened directly to the main body or to the head part, in order to minimise the wear. Alternatively or additionally, cleaning bristles with pointed ends, in particular are also fastened to the periphery of movable brush bodies. The tips of the pointed cleaning bristles in particular project beyond the other cleaning bristles or functional elements.

A combination of cleaning bristles with round ends and ends which are pointed at one side or at both sides is possible.

The cleaning bristles and further functional elements can be arranged at a right angle to the geometric cleaning plane or to the longitudinal axis. The cleaning bristles and further functional elements can be arranged at an angle of smaller than 90° to the geometric cleaning plane which is to say or to the longitudinal axis, so as to achieve a particular cleaning effect.

Moreover, the cleaning bristles and further functional elements can also be arranged at an angle, in order to assist the movement of the respective brush body and to drive this. For example, the inclination of the bristles can be selected in the direction of the movement axis, in order to assist the movement.

Cleaning bristles in particular are manufactured by way of extrusion.

Cleaning bristles can alternatively also be manufactured by way of injection moulding methods. The injected cleaning bristles in particular can be integrally manufactured with the main body or the head part, in a multi-component injection moulding method.

The cleaning bristles can also be manufactured in a separate working step. The cleaning bristles in particular can be integrally injection moulded with the bristle carrier of the brush body. The brush body is subsequently assembled onto the head part.

The bristle carrier in particular consists of a material which is harder than the injection-moulded cleaning bristles. Brush bodies with injection moulded cleaning bristles in particular are manufactured in the multi-component injection moulding method.

The cleaning bristles which are manufactured in the injection moulding method can consist of one of the following plastics:
- polyamide elastomer (e.g. Grilflex ELG 5930 of Ems-Chemie AG)
- polyester elastomer (e.g. Riteflex 672 RF Nat or Riteflex RKX 193 RF Nat of Ticona Polymers or Hytrel 7248 of DuPont).
- thermoplastic elastomers based on urethane (e.g. Desmopan of Bayer Material Science or Elastollan of BASF Polyurethanes GmbH.

The plastics for injected cleaning bristles for example have a Shore D hardness of 0 to 100, preferably 30 to 80. Injected cleaning bristles preferably have a stepped and/or conical shape, in the longitudinal direction.

Conventional cleaning bristles which are manufactured by way of extrusion and which for example can be pointed or cylindrical are preferably manufactured of polyamide (PA) or polyester (PBT).

The fastening of the bristles to the brush body or to its bristle carrier can be effected in the most varied of manners. The anchor-free tufting (AFT) method can be applied for example. With the AFT method (anchor-free tufting), the conventional or extruded, cylindrical or pointed bristles or the bristle tufts are be fastened to the carrier body without the aid of an anchor. The carrier body can be a carrier platelet.

The carrier body can correspond to the bristle carrier. The carrier body however can also be attached to the bristle carrier of the brush head as a separate component in a further assembly step after the attachment of the bristles. The carrier body can thus be fastened to the brush body in a recess, after the attachment of the bristles. This is effected for example by way of ultrasound welding or other connection methods. The recess is thereby specially adapted to the geometry of the carrier body.

The brush body can comprise a cavity between the bristle carrier and the carrier body, so that the brush body can be moved as easily and simply as possible. The bristle carrier preferably has means serving for the connection to the brush head. The carrier body can also alternatively likewise have means for connection to the brush head.

The rounded cleaning bristles are profiled in tufts and with their end which lies opposite the free used end are led through passages in the carrier body, so that an end region of the bristle tuft projects out beyond the lower side of the carrier body. The bristles are fastened by way of melting on, bonding or welding, at this end region of the bristles which projects beyond the lower side of the carrier body.

The carrier body can have a length of 15 to 35 mm, a width of 6 to 15 mm and a height of 1 to 4 mm.

Moreover, the bristles can be fastened in the bristle carrier by way of the conventional anchor stamping procedure. For this, the bristle tufts are folded and subsequently fixed in the bristle receiving holes, by way of a metallic anchoring platelet. The bristle tuft comprises two halves on account of the folding by way of the anchor, and these halves each comprise one of the ends of the folded bristles. The post-machining such as profiling and cutting is effected after the fastening of the bristles, depending on the bristle type. The bristle carrier with the bristle receiving holes can thereby be additionally provided with soft-elastic massaging and cleaning elements which are materially attached to the bristle carrier in the multi-component injection moulding method.

The bristle receiving holes can have a diameter of 1.2 to 2.4 mm, in particular of 1.4 to 1.9 mm, and a depth of 2 to 4 mm, in particular of 2.5 to 3.5 mm.

Other bristling methods such as IAP (integrated anchorless production) or IMT (in-mould tufting) can of course also be applied for the insertion of the bristles. As described, the bristles can of course also be formed from a plastic material in a direct manner in the injection moulding tool by way of injection moulding.

So-called bio-plastics can likewise be applied as a bristle material or as one of the material components. These are plastics which are manufactured from sustainable raw materials.

The brush body, apart from the conventional cleaning bristles, can yet comprise further functional elements on the front side or on the rear side of the brush head. The further functional elements can be manufactured of a soft component. The further functional elements in particular can be soft-elastic massage elements and cleaning elements.

The functional elements can moreover also be designed as hard components. The further functional elements can also be manufactured from a combination of hard and soft components.

The functional elements can be lamella-shaped (gill-shaped), nub-shaped or "prophy-cup"-shaped. The functional elements can also be designed as bristles, in particular as injected bristles.

The functional elements can moreover also be a roughness pattern on a surface.

The functioning element can e.g. be designed as a tongue cleaner.

The further functioning elements can be integrated into the bristle field. The further functional elements can be arranged on the brush body. The further functional elements can be arranged on the head part.

The further functional elements can be arranged on the front side or the rear side of the head part.

Functional elements in particular can be arranged on the side of movable or immovable parts of the brush body, said side facing the rear side of the head part.

The functional elements can thus e.g. be arranged on that side of a guide element guided in a translatorily displaceable manner in a guide opening, which faces the rear side of the head part, as will yet be explained hereinafter.

Such functional elements can moreover be arranged e.g. on the side of a pivot element rotatably mounted in a pivot opening, said side facing the rear side of the head part, as will yet be explained hereinafter.

Functional elements in particular can be designed in such a flexible manner that these carry out movements when interacting with the brush body or bristle carrier. Recesses etc., in which soft-elastic cleaning elements are guided, can be provided for example in brush bodies or in bristle carriers. This movement is transmitted onto the soft-elastic cleaning elements by way of the movement of the brush body, and these are therefore moved.

Such functional elements can moreover be arranged on the head part, e.g. at the side of an encompassing element which faces the rear side of the head part, as will yet be explained hereinafter.

Not only can the further functional elements which are mentioned above be arranged on the head part, but alternatively or additionally also on the neck part or on the grip part of the main body.

The further functional elements can likewise be injected by way of the injection moulding method. The further functional elements in particular can be integrally manufactured with the main body or the bristle carrier. The functional elements can also be manufactured in a separate working step and be assembled thereafter.

The brush body and its movable arrangement on the head part are described in more detail hereinafter.

The outer contour of the head part in particular can be of a nature such that the at least one movable brush body does' not project beyond the outer contour of the head part in any movement position. This serves for the protection of the user against possible injury, which is to say the pinching of the mucous membrane of the mouth, the gums or the tongue.

The brush body can be manufactured as a separate component and be assembled onto the head part. This can be effected for example by way of a snap-click connection. A "snap-click connection" in this patent application is generally to be understood as a connection, with which the elasticity of the plastic materials is used for creating the connection, in order to guide the joining parts into their connection position. One or both joining parts elastically deforms during the creation of the connection. The joining part or parts deforms/deform at least partly back into its initial shape on assuming the connection position, so that the connection can no longer be released or only be released after destruction, or only when applying a larger force. The clicking-in can particularly be an engagement (latching), e.g. into a guide. The snap-click connection in particular can be a positive fit connection.

The brush body can also be integrally manufactured together with the head part, e.g. by way of injection moulding. The brush body in this case can be connected to the head part for example via film hinges, as will yet be explained hereinafter.

The brush body which is to say the associated bristle carrier can also be provided with a topography. This means that the surface of the bristle carrier is arcuate or stepped for example. The bristle holes or the bristle fastening plane is thus not necessarily designed in a flat manner. Examples of possible surface topologies are:
- the bristle carrier becomes higher from the edge (i.e. the middle region lies higher, e.g. convex shape);
- the bristle carrier becomes deeper from the edge (i.e. the middle region lies more deeply, e.g. concave shape);
- the bristle carrier has an ascending height course from the one outer side to the other outer side (i.e. the bristle fastening plane is lectern-shaped).

The profiling of the brush body or of the bristle carrier, apart from an irregular design can also have a regular design. Examples of this are:
- the bristle carrier of the first movement variant (rotation) which is described further below is designed in a rotationally symmetrical manner;
- bristle carrier of the second or fourth movement variant (translation, rocking) which is described further below is designed in a mirror-symmetrical manner along the longitudinal axis or along a symmetry axis transverse to the longitudinal axis or is designed in a point-symmetrical manner.

The bristle carrier or also the bristle holes can have an inclination with respect to the rotation axis or generally with respect to the movement axis.

The brush head, apart from the at least one brush body which is arranged on the head part in a movable manner relative to the head part, can also comprise one or more brush bodies which are assembled on the head part in a fixed manner with regard to movement or which form an integrated constituent of the head part.

The movement of the movable brush body of the subsequently described type can also be activated (actuated) by a pressing force perpendicular to the geometric cleaning plane or to the longitudinal axis, as is built up e.g. on pressing the brush head onto the teeth. The movement of the brush body can alternatively or additionally also be activated by way of a force acting along longitudinal axis, as is produced for example by way of the to and fro movement of the toothbrush during the cleaning of the teeth.

The at least one movable brush body with regard to its movement in particular is influenced solely by the cleaning of the teeth. The brush bodies in particular are not actively driven by a drive mechanism on the toothbrush.

Two brush bodies can be movable independently of one another if at least two movable brush bodies are provided. This means that the at least two brush bodies do not mutually influence one another with regard to their movement.

The at least two movable brush bodies can also be coupled to one another via coupling means, in particular via a coupling mechanism, in a manner such that a movement of the one brush body influences the movement of the other brush body via the coupling means. The term coupling should therefore be understood in that at least a first brush body influences the movement of a second brush body via the coupling means. The coupling in particular is a mechanical coupling.

The movement of the one brush body can activate a movement of the other brush body via the coupling means.

One can also envisage the movement of the one brush body amplifying a movement of the other brush body via the coupling means. The movement of the one brush body can also impede or weaken a movement of the other brush body via the coupling means.

The two brush bodies can also mutually influence one another with regard to their movement and in each case impede or weaken, or activate or reinforce this movement at the other brush body.

The coupling means or the coupling mechanism, for example comprise coupling elements. The coupling elements can be of a hard or soft component. The coupling elements e.g. can be separate components which are connected e.g. to at least one of the brush bodies. The coupling elements e.g. can be connected to at least one of the brush bodies in a releasable manner or in a manner such that it can be assembled once and is then unreleasably connected. The coupling elements can also be an integral part of at least one of the two brush bodies.

The coupling means can e.g. comprise a coupling element in the form of a guide arm or guide pin or guide lug. Such a coupling element in particular is at least connected to a translatorily movable brush body.

The coupling elements can be pivotably mounted via an articulated connection.

The two brush bodies can be connected to one another via the coupling means. The coupling means can also be connected to none or only to one of the two brush bodies. The connection can be fixed, which is to say permanent, or releasable. The connection can therefore be a positive connection, such as latch or detent connection.

A coupling element can e.g. be connected to one of the two brush bodies and moreover comprise a contact section, via which the coupling element creates a contact with the other brush body, said contact being permanent or temporary depending on the movement course of the one or of both brush bodies. The movement of the one brush body or both brush bodies is influenced via the permanent or temporary contact.

One can envisage a first brush body being rotatably mounted, and a second brush body being translatorily displaceably mounted, on the head part.

According to a first embodiment, the two brush bodies are connected to one another via a coupling element. The connection is such that the translatorily alternately displacing brush body brings the other brush body into an alternating rotation movement via the coupling element. The rotation movement however lies within a certain rotation angle of in particular less than 180°. The coupling element thus executes the function of a push and pull element.

According to a further embodiment, a coupling element is arranged on the translatorily displaceable brush body. The coupling element forms a contact section to the rotatable brush body.

The rotatable brush body e.g. can comprise a cog-like peripheral structure, into which the coupling element temporarily engages with its contact section.

The two brush bodies interact in manner such that the second brush body moving to and fro in a translatory manner brings the first brush body into a rotation movement via the coupling element. The contact section of the coupling element jumps into the next recess or indent of the cog structure during the rotation.

The coupling element, in particular its contact section, can also have a saw-tooth structure, such as a rack. The saw-tooth structure in particular is connected to the translatorily displaceable brush body.

The coupling element, with the saw-tooth structure can engage into a cog structure or a cog-like peripheral structure, on the rotatable brush body. The rotatable brush body is brought into an alternating rotation movement via the meshing engagement, by way of the translatory moving of the coupling element.

A contact element of the coupling mechanism can also be designed as a guide arm which connects the two brush bodies to one another and thus converts a translatory movement of the second, translatorily movable brush body into a rotation movement of the first rotatable brush body. The guide arm is hereby attached to the rotatable brush body outside the rotation axis or pivot.

The first brush body can be rotatably mounted in only one direction (freewheel). One can also envisage the first brush body interacting with a latch (detent) mechanism which has the effect that the coupling element can only rotate the brush body further by single latch (detent) positions.

The coupling element can be part of a brush body or bristle carrier and for example consist of the same component, such as a hard component. The coupling of an element of the brush body which has a rotating movement, to an element of the brush body which has a translatory movement can be carried out in this manner.

The translatorily movable brush body can be provided with a coupling element in the form of a projecting lug. The rotating brush body can form a contact surface which serves as a stop for the coupling element. The rotating brush body is brought into rotation by way of the pressing of the coupling element and the continued movement of this. The rotating brush body can be actively connected to a soft-elastic spring element for the restoring movement. The spring element is fastened for example to the head part. The rotating brush body is pressed by the spring element back into the initial position, as soon as the force exerted by the coupling element decreases.

The coupling element can be designed in a varied manner. The coupling element can thus be shaped in a serpentine or meandering manner or in the manner of a helical spring or spiral spring. The coupling element can thus also have the function of a restoring element. The coupling elements can moreover comprise functional elements of the type described further above.

The coupling element in particular can also be fastened to the head part with a fixed rotation point.

According to a further embodiment, the two brush bodies are commonly encompassed by an encompassing element. The brush bodies are in contact with the encompassing element in each case at least over part of the periphery. The contact in particular can be a positive fit or material fit.

The encompassing element is elastically deformed, in particular stretched, if the one brush body now acts upon the encompassing element due to its movement, e.g. due to a lateral deflection, or due to the catching of the encompassing element at the contact section on account of a rotation. A movement of the other brush body is activated or such a movement is influenced due to the elastic deformation of the encompassing element.

The encompassing element can be designed in a rubber-elastic manner and activate or influence a movement of the other brush body by way of an elastic stretching or straining, which is activated by the one moving brush body. The encompassing element can be a rubber-elastic encompassing band or a rubber-elastic encompassing circlet (hoop). The encompassing element in particular is arranged on the brush bodies.

Functional elements such a nubs, prophy cups, lamellae (also called ribs or gills) or even bristles can be arranged on the encompassing element, e.g. on the front side, rear side and/or to the side. The functional elements can serve for cleaning and/or massage and in particular as a tongue cleaner.

The encompassing element, in a plan view can be polygonal or have any closed contour. The cross section of the encompassing element can change over its height.

The dimension of the encompassing element is designed such that the part of the encompassing element which bears directly on the bristle carrier of the brush body is maximally equally high as the bristle carrier of the brush body. The encompassing element can have a height e.g. of 1 mm to 5 mm.

At least one functional element can be arranged on the encompassing element. The at least one functional element can project beyond the bristle carrier, e.g. at the front side of the head part.

A further embodiment for a coupled movement between two brush bodies comprises a brush body which is designed in a horseshoe-shaped manner. Horseshoe-shaped manner in particular is also to include U-shaped, V-shaped and C-shaped. The horseshoe-shaped brush body comprises two lateral limbs which enclose a receiving space open to one side. A further brush body is guided on the head part in a translatorily displaceable manner along the longitudinal axis. This further brush body is displaceable into the receiving space of the horseshoe-shaped brush body. The elastically designed limbs are pressed to the side by way of this, on account of a spreading force due to the brush body moving into the receiving space. The limbs assume their initial position again due to a restoring force, on moving the brush body out of the receiving space.

Thereby, it is possible for the restoring force to be so large, that the brush body is deflected back into its initial position due to the moving-back of the limbs.

The translatorily displaceable brush body can be displaceable via a slide guide, in particular of the type described further below.

Various movement variants for the brush head are hereinafter described in detail.

At least one brush body can also be non-movably, i.e. fixedly fastened to the head part. Brush bodies which are non-movably assembled on the head part are not mentioned as actual movement variants since they do not execute a movement when the dental cleaning forces act upon these. Despite this, these brush bodies can be combined with brush bodies having the most varied of movement variants.

The brush bodies which are non-movably assembled on the head part, with regard to their fashioning, in particular are designed such that they comprise cleaning bristles. These can be of a varied design. This means that cylindrical as well as pointed bristles can be combined for example. Furthermore, it is also possible for yet other bristle types to be combined. Moreover, functional elements, such as soft-elastic lamellae, etc., can be arranged on the mentioned brush bodies. The cleaning bristles can be fastened to the associated bristle carrier with the various methods which are described further above.

The brush body according to a first movement variant is rotatably mounted on the head part about a geometric axis. The rotation angle can be 360° (angle degrees), so that the brush body can be completely rotated. The rotation angle can also be less than 360°, so that the brush body is only rotatably in a defined rotation angle. The limitation of the rotation angle can also be effected via a stop or also via suitably shaped-out damping elements. The damping elements can act in a resilient manner, so that the brush body is rotated back at least partly via a restoring effect of the damping element.

The brush body can be rotatably mounted in both directions or only in one direction. The rotation in only one direction can be achieved by way of a freewheel.

The rotation axis in particular is aligned perpendicularly to the geometric cleaning plane. The rotation axis in particular is arranged perpendicularly to the longitudinal axis. The rotation axis can also be arranged at an angle to the longitudinal axis or geometric cleaning plane. The rotation axis in particular is stationary with respect to the head part.

The rotation axis can alternatively be combined with a translation of the brush body in the longitudinal a direction of the toothbrush or perpendicularly to this, and thus likewise be displaceable in the translation direction.

The rotatable brush body in particular can be arranged at the free end-section of the head part.

The brush body and in particular the bristle field can be designed in a round, in particular circularly round or oval manner. The brush body can also have a cog-like outer contour.

The brush body furthermore can also be present in a kidney-shaped manner or in another shape, such as a polygonal shape, with a closed contour. The brush body in particular can comprise contour elements, such as cog serrations, lateral grooves or projecting elements. The contour elements can serve as a positioning aid of the brush body on manufacture. The contour elements can moreover serve for the user moving the brush body by hand, e.g. for testing the function, for unblocking the brush body on fouling or for cleaning.

Contour elements can moreover also be applied with all other brush bodies which are described in this document and are with different movement patterns, such as e.g. translation, etc. The contour elements are preferably arranged in the periphery of the brush body which is accessible to the user.

The brush body can comprise a pivot element which is rotatably mounted in the head part, in a pivot receiver, also called pivot opening.

In a reverse arrangement, the head part can also comprise the pivot element which is mounted in a pivot receiver in the brush body. The brush body is rotatably mounted on the pivot element by way of the pivot receiver.

The pivot element can be inserted into the pivot receiver via a snap-click connection, and thus axially secured.

The pivot receiver can be round, in particular circularly round. The pivot receiver can positively receive the pivot element. The pivot receiver can be geometrically shaped equally and oppositely to the pivot element. The pivot receiver e.g. has a diameter of 3 mm to 9 mm.

Slots, recesses and/or thinner wall thicknesses can be realised in the region of the pivot receiver and/or in the region of the pivot element, for improving the assembly of the snap-click connection.

An annular recess which is separated from the pivot receiver by an annular wall can be arranged around the pivot receiver. The annular wall in particular has a relatively small wall thickness of e.g. 1 mm to 3 mm. The annular wall has resilient which is to say compliant characteristics thanks to the thin wall thickness. The annular wall can moreover comprise radial slots or slot-like recesses. The pivot receiver can also comprise radial slots or slot-like recesses, in its wall region, independently of the presence of such an annular recess. Thus e.g. 3 to 8 such slots or slot-like recesses can be provided, which likewise permit a certain yielding.

The pivot element at its free end can comprise a recess in the centre. The pivot element can thus form an annular wall in its free end-section. This can provide for a spring effect which is to say a compliancy, on assembly. The shape of the recess can be quasi arbitrary. The recess in cross section can be round or circular or polygonal or a combination of these. The recess has a depth which corresponds maximally to the length of the pivot element, which is to say the recesses at the most reaches up to the bristle carrier. The wall thickness to the outside in particular is 1 mm to 3 mm. The thus formed annular wall can likewise comprise radial slots or slot-like recesses.

The recess in the pivot element provides the further possibility of the closure elements being able to be anchored therein, as will yet be described further below.

The elements for the pivot receiver, as well as for the pivot element can of course be combined.

The pivot receiver can be a continuous opening. The pivot element can exit out of the pivot receiver at the rear side. One can also envisage the pivot receiver being closed at the rear side by way of a closure element. The closure element can be joined in as an assembly part by way of a positive connection, such as a snap-click connection. The closure element can also be integrally moulded with the injection moulding method. The closure element can be formed from a hard component or soft component.

The closure element can be connected to the pivot element, and e.g. engage with a connection element into a recess in the pivot element. The closure element with the head part can also be connected to the pivot receiver.

The closure element on its outwardly facing surface can be provided with further functional elements such as a tongue cleaner for example.

The pivot receiver can also be designed as a deepening, such as a blind hole.

Slots which improve the elastic stretching ability of the diameter of the pivot receiver for creating a snap-click connection can be arranged concentrically or radially about the pivot receiver.

The pivot element can be designed as a pin, in particular a circularly-cylindrically-shaped pin.

The pivot element and/or the pivot receiver in cross section can also have a geometric shape which is different to being circularly round. The pivot element and/or the pivot receiver can have a surface structure. The surface structure can be designed such that fouling can be displaced from the pivot receiver, on movement of the brush body. A self-cleaning effect can be achieved by this.

Means which serve for fastening brush bodies can generally be provided with surface structures which develop a self-cleaning effect for the guiding.

The pivot element can form a changing diameter in the longitudinal direction of the pivot. The pivot element in particular can comprise a thickening at the free end. The pivot element or the pin at the narrowest location can have a diameter of 2.5 to 8.5 mm and a maximal diameter of 3 mm to 9 mm at the widest location. The length of the pivot element from the exit point out of the bristle carrier up to the free end in particular is 1 mm to 4 mm.

The pivot element, as mentioned can be led through a through-opening on the head part. Functional elements such as nubs, prophy cups, lamellae or even cleaning bristles can be arranged at the free end of the pivot element which is arranged on the rear side of the head part. The functional elements can serve for cleaning and/or massage and in particular as a tongue cleaner. The functional elements are moved parallel and rotationally simultaneously with the brush body due to the cleaning movement on account of this arrangement.

According to a particular further development, the pivot receiver is designed as a longitudinal opening or slot opening. The longitudinal opening or slot opening can be a groove or a through-opening.

This permits a combined movement of a rotation of the brush body about the rotation axis and of a translatory displacement of the brush body along the slot opening.

The brush body can also form a type or rotary ring which is rotatably mounted on the head part, on a pivot element or in an annular opening. A reverse arrangement is likewise possible. The rotary ring can be fastened to the pivot element or in the ring opening, in a rotatable but axially secured manner, via a snap-click connection.

In contrast to the embodiment described above, the rotatory ring rotates about the pivot element or about the ring opening. The pivot element or the ring opening can be formed on the head part in a rotationally fixed manner. The pivot element can be designed as a pin, in particular as a circularly cylindrical pin.

The rotary ring can be completely received in an in particular annular recess in the bristle carrier.

According to a special embodiment, the brush body is designed as a rotary ring which is rotatably mounted on the head part, in an annular recess. The rotary ring is forthwith a bristle carrier for the cleaning bristles.

Conversely, one can also envisage the brush body comprising an annular recess, into which a guide ring on the head part engages, wherein the brush body is rotatably mounted on the guide ring. The guide ring can e.g. be an annular projection on the head part.

The possibility of attaching further cleaning elements exists within the guide ring. These can be fastened for example in a fixed manner. Apart from this, it is also possible to attach further moved elements within the guide ring, for example further moved elements of the first movement variant.

According to a further development of the invention, the brush body in a plan view can be designed in a round, in particular in a circularly round manner and be rotatably received in an in particular equal and opposite recess in the head part. The recess in particular can be round, such as circularly round. The brush body according to this embodiment is designed as a type of rotary plate.

The geometric rotation axis or the pivot element can be arranged in a centred or eccentric manner with respect to the rotatable brush body. The brush body pivots out laterally in the latter mentioned case.

Means which effect an up-and-down movement of the brush body along the rotation axis during the rotation of the brush body can be provided. This movement can be designed in a resilient manner. The means e.g. can be interface planes between the head part and the brush body, said planes being designed e.g. in a waved manner and contacting one another. The up and down movement can be 0.5 to 3 mm. The interface plane can also be designed in a flat manner. The width of the interface plane which corresponds to the contact surface is 1 mm to 3 mm.

The pivot element and the pivot receiver can also comprise a screw thread arrangement, the effect of which being that the brush body rotates relative to the head part and is simultaneously axially moved, by way of a screw movement. The screw movement for example can be activated by an axial pressure upon the brush body. A restoring member can bring the brush body back into an initial position by way of a screw movement.

The surfaces of the pivot element and of the pivot receiver which contact one another can be of a hard component. One or both of the contacting surfaces of the pivot element and of the pivot receiver can also be completely or partly of a soft component. This can lead to a damping or impeding of the rotary movement, or also have a resilient effect.

The bristle carrier of this movement variant can be designed in varied manners. This means that the bristle carrier can be of one or more parts. The parts can be connected to one another, e.g. via a soft component. It is moreover possible to connect parts of the bristle carrier to one another via film hinges or other connection variants. The multi-part design e.g. permits a flexibility of the bristle carrier, for example in the outer regions. The bristle carrier can thus tilt away with outer parts if this is loaded too greatly.

The brush body according to a second movement variant is guided on the head part in a translatorily movable manner. The translatory movement in particular is a to and fro movement.

The translatory movement can be a movement parallel to the longitudinal axis of the toothbrush. The translatory movement can be a lateral movement transverse to the longitudinal axis. The translatory movement can be a movement upwards away from the head part, in the direction of the teeth to be cleaned, transverse to the longitudinal axis.

Arbitrary combinations of these three movement directions are possible. The slide guide is designed accordingly.

The translatory movement can thus also run at an angle to the longitudinal axis.

The translatory movement can be parallel to the geometric cleaning plane. The translatory movement can however also be at an angle to the geometric cleaning plane.

According to a particular embodiment, the brush body moves to the teeth to be cleaned and away from these again, via a translatory movement. This for example can be effected in a type of wave-like movement, wherein the movement can also run through several wave peaks and wave troughs. The magnitude of the translatory movement component of the head part to the teeth can be 0.5 to 5 mm.

The translatory longitudinal movement in particular is in a straight line. Accordingly, a guide opening or a longitudinal guide body of a slide guide is likewise designed in a straight-lined manner as will yet be described hereinafter.

The translatory longitudinal movement however can also be curved. Accordingly, a guide opening or a longitudinal guide body is likewise designed in a curved, in particular wave-like, such as S-shaped manner.

The translatorily movable brush body can be guided in a sliding guide, in particular a slide guide. A translatory movement along the longitudinal axis can be 2 to 12 mm, in particular 2 to 5 mm. A lateral, translatory movement transverse to the longitudinal axis can be 2 to 10 mm.

The slide guide according to a first embodiment can comprise a longitudinal guide body which is formed by the head part. This guide body serves as a type of slide rail. The brush body is guided on the longitudinal guide body in a sliding manner. For this, the brush body comprises at least one guide element, also called encompassing element, which at least partly encompasses the longitudinal guide body.

The brush body can comprise guide elements encompassing the longitudinal guide body on both sides. The width of an individual guide element, measured parallel to the longitudinal guide body can be 8 to 15 mm.

The brush body per encompassing side, in each case can comprise one or a plurality of guide elements, such as guide arms or guide fingers, which are distanced to one another and are arranged successively along the longitudinal guide body. In particular, 1 to 5 guide elements can be provided per side. The guide elements, measured parallel to the longitudinal guide body, can have a width of 1.5 to 3 mm, in the case of several guide elements per side.

The encompassing elements can be of a hard component and/or soft component. The encompassing elements are flexible, in particular elastic in the latter case. The encompassing elements however in particular can be designed as a hard component, wherein the flexibility is achieved due to the geometric design which is to say the material thickness of the elements. It is moreover possible to provide soft-elastic zones, which result in a flexibility.

Functional elements, nubs, prophy cups, lamellae or even cleaning bristles can be arranged on the encompassing elements, to the side and/or on the rear side. The functional elements can serve for cleaning and/or massage and in particular as tongue cleaners. Such functional elements can of course also be designed in a manner directed towards the front side in the bristle field.

The maximal movement of the brush body is defined by the geometries on and around the longitudinal guide body as well as by the geometry on the brush body. The longitudinal guide body comprises stop elements, in particular at the front and at the rear end, considered in the longitudinal axis direction. These stop elements for example can be shaped out on the head part in a direct manner. These can moreover also be shaped out as brush bodies. The second brush body can therefore come to abut on the first brush body for example.

The longitudinal guide body is preferably designed such that the movement of the brush body is guided over the complete deflection. Thereby, a middle rib which prevents a rotation of the brush body about the longitudinal axis can be provided between the encompassing arms for example.

The longitudinal guide body considered in cross section comprises a closed contour. This for example can be round or polygonal. The contour in particular can be T-shaped.

The slide guide according to a second embodiment can comprise a guide opening which is formed by the head part. The brush body comprises at least one guide element which engages into the guide opening and is guided therein in a sliding manner. The brush body can now be guided in a sliding manner along the guide opening via the at least one guide element. A reverse arrangement of the guide opening and guide element is also possible.

The guide element and/or guide opening, as already described further above, can have a surface structure for the self-cleaning of the guide.

The guide opening can have a length of 5 to 20 mm, in particular of 8 to 15 mm. The width of the guide opening can be 1 to 5 mm.

The guide element in particular has a length of 3 mm to 15 mm. The further dimensions in particular are identical to those of the pivot pin described further above.

The guide opening can be a longitudinal groove or a continuous opening slot in the head part.

The at least one guide element in particular is secured against falling out of the guide opening. This can be effected via a positive guide. The at least one guide element can be inserted into the guide opening in a manner displaceable along the guide opening, e.g. via a snap-click connection. Thereby, the brush body in particular is clamped between the lower side of the bristle carrier and a projecting part on the guide element. The embodiment of the clamping is designed analogously to the first movement variant with respect to the gap dimensions, tolerances, etc.

The guide element can comprise a recess in the centre. A spring effect results on assembly by way of this. The cross-sectional shape of the recess is freely selectable and can have the shape of an elongate hole, be round, oval, polygonal or a combination of these. The cross-sectional shape of the recess in particular is however closed. The recess in particular has a depth which corresponds maximally to the height of the guide element. This means that the recess at the most reaches to the bristle carrier. The wall thickness of the guide element with the recess in particular is 1 mm to 3 mm. The recess further provides the possibility of the closure element being able to be anchored therein, as will yet be described further below.

If, on the brush head, the brush body according to the second movement variant is combined with an adjacently arranged, further brush body according to a first or third movement variant, then the guide opening of the slide guide can run out into the pivot receiver or the joint receiver. The pivot receiver or the joint receiver in particular is wider than the guide opening.

The guide element is then laterally insertable into the guide opening via the wider pivot receiver or the joint receiver. The insert opening is blocked, and the guide element is secured against sliding out of the guide opening, by way of inserting the pivot element or the joint head into the pivot receiver or joint receiver respectively.

One can also envisage the guide element being designed of at least two parts. A first part is connected to the brush body and is inserted from the front side into the continuous guide opening. A second part is introduced from the rear side into the guide opening and is connected to the first part, e.g. via a snap-click connection or via a material-fit connection such as welding connection. The assembled guide element is now secured against falling out of the guide opening on account of a particular geometric design of the two parts.

Recesses such as expansion slots can be incorporated into the head part, in the proximity of the guide opening. The recesses are to increase the elastic stretching ability of the guide opening, for creating a snap-click connection to the guide element.

The width of the guide groove can increase towards the groove base. The guide groove with regard to cross section in particular can be designed in a swallowtail-shaped manner.

The at least one guide element can be a guide pin or guide lobe or a guide strip, which engage into the guide opening. The guide element can be designed in an elongate or round, in particular circularly round manner. The guide element can also be called a sliding element or sliding pin or sliding lobe due to the fact that it is guided in the guide opening in a sliding manner.

Functional elements such as nubs, prophy cups, lamellae or even cleaning bristles can be arranged on the free end of the guide element, at the rear side of the head part, in the case that the guide element is led through an opening slot on the head part. The functional elements can serve for cleaning and/or massage and in particular as a tongue cleaner.

One can also envisage the opening slot being closed at the rear side via a closure element. The closure element can be joined as an assembly part via a positive connection, such as a snap-click connection. The closure element can also be integrally injected onto the head part in an injection moulding method. The closure element can be manufactured from a hard component or soft component.

The closure element can be connected to the guide element, and e.g. engage with a connection element into a recess in the guide element. The closure element can also be connected with the head part to the slot opening.

The closure element on its outwardly facing surface can be provided with further functional elements, such as a tongue cleaner for example.

According to a particular further development, the guide opening can widen in a direction or locally, in a manner such that the guide element becomes rotatable in the widened region of the guide opening and can thus carry out a combined movement of a translatory movement and rotation. The guide opening can thus be widened, in particular in an end region, so that a translatorily moved brush body for example can be additionally or exclusively rotated in this region.

The bristle carrier which is designed as a slide can basically be of one or more parts. The parts can be connected to one another e.g. via a soft component. Moreover, it is possible to connect parts of the slide to one another via a movable and/or flexible element of a hard component, e.g. film hinge, spring element or other means. A flexibility of the slide can be achieved in this manner, by way of e.g. lateral parts of the bristle carrier being fastened in a flexible manner. A corresponding geometry of the head part can of course act in an assisting which is to say non-impeding manner.

Bristle carriers designed in a similar manner, in each case with one or more guide pins and corresponding guide openings in the head part can provide a further movement form. If the guide openings for the flexible parts of the guide slide in the head part have a shape which is matched to the remaining or further guide openings and guide pins with bristle carriers, then a laterally pivoting-away movement can also be achieved for the flexible elements by way of the translation for example. The elements accordingly rotate away laterally when the slide moves to the front.

A fashioning of flexibility or alternative movement forms can also be formed on the slide at the front and rear conspired in the longitudinal direction. The flexible section can thereby be formed parallel or at an angle to the longitudinal axis.

The translatory movement of the brush head can further be built up such that the longitudinal axis of the bristle carrier or slide is not parallel to the movement direction, which is to say to the direction of the guide slot.

A further design variant for the brush body lies in the brush body consisting of a translatory slide with a bristle carrier which is flexibly arranged on this. The brush body can thus be moved forwards and backwards and simultaneously deflect in a flexible manner.

Several slide guides with brush bodies can be arranged successively and/or next to one another, on the head part.

The brush body according to a third movement variant is connected to the head part and is pivotably arranged relative to the head part about a rotation point in several directions, in particular in three axis directions, via a joint connection. The deflection in particular however is limited to a pivot angle of maximal 180°, in particular of maximal 90°. The brush body in particular can execute a cone rotation about the rotation point.

The joint connection can be a ball joint. The ball joint in particular comprises a joint head and a joint receiver. The joint receiver can be designed as a joint socket. The joint head can be formed by the bristle carrier, and the joint receiver by the head part, or vice versa.

The joint receiver, also called joint opening, can be designed as a deepening. The joint receiver can also be designed as a continuous opening in the head part. The joint receiver can be round, in particular circularly round.

The rotation point can be arranged towards the head part or towards the bristle carrier. The rotation point can be arranged in the bristle carrier, in the head part or in a connection section between the bristle carrier and the head part.

One can also envisage a joint connection of the type described above being provided on the head part as well as on the bristle carrier and these being connected to one another via a connection section or pivot section.

The joint head can also be inserted into the joint receiver and connected to this, i.e. secured from springing out of the joint receiver, by way of a snap-click connection.

The surfaces of the joint head and of the joint receiver and which contact one another can be of a hard component. One or both of the contacting surfaces of the joint head and of the joint receiver can be of a soft component. This can lead to a damping or impeding of the rotation movement.

The joint head and/or the joint receiver can have a surface structure.

The brush body according to a fourth movement variant is designed as a rocker via an articulated connection to the head part.

An articulated connection in this description is to be understood in that the two components are pivotable about a common rotation axis or about a geometric rotation point. The brush body in particular is designed in manner in which it rocks (seesaws) relative to the head part about a geometric rotation axis or about a geometric rotation point.

The geometric rotation axis in particular is arranged parallel to the geometric cleaning plane. The geometric rotation axis can be arranged parallel to the longitudinal axis. The geometric rotation axis can be arranged at an angle to the longitudinal axis. The geometric axis in particular can also be arranged perpendicularly to the longitudinal axis. The geometric axis in particular can be arranged on or in the head part or brush body.

The rocker can be formed by a joint connection. The joint connection can be a rocker pivot which is guided in a longitudinal groove. The longitudinal groove can be arranged on or in the head part, and the rocker pivot on the brush body, or vice versa.

According to a special embodiment of a rocker, the geometric rotation axis of the rocker is arranged between the head part and the brush body. The joint elements of the joint connection, such as e.g. the rocker pivot and the longitudinal groove are rigidly connected to the head part or to the brush body via connection elements. One of the connection elements can form a rotary connection with the head part or brush body. This connection element can therefore form a pivot element which is rotatably held in a pivot receiver on the head part or brush body. Such a rotary connection has already been described further above. The position of the rotation axis in particular lies at a distance to the head part as well as to the brush body. The rotation axis is arranged at the height of the brush body according to a further embodiment.

The bristle carrier which is designed as a rocker, and the main body with the head part can be manufactured as separate components in different manufacturing steps, such as the injection moulding method. The bristle carrier and the main body with the head part can also be manufactured in a common injection moulding method. In the latter case, the rocker pivot and the longitudinal groove in particular consist of non-connecting materials.

The rocker pivot can be introduced into the longitudinal groove via a snap-click connection or can be inserted laterally into the longitudinal groove. The longitudinal groove and the rocker pivot can have a round part-contour in cross section. The securing of the rocker pivot against sliding away in the longitudinal groove can be effected in various manners, for example by way of overmoulding, clamping elements or snap-click mechanisms.

Lateral openings of the rocker can be covered, in order to prevent injuries. The rocker pivot or the complete rocking part can also be sunk, which is to say recessed, in the head part.

An articulated connection can also be effected via a film hinge. This is characterised by a thin-walled connection permitting a pivot movement. The bristle carrier and the head part can be designed in a single-part manner according to this embodiment.

The deflection of the rocking movement can be 2 to 5 mm. The deflection is defined as the distance between the lower side of the rocking element and the upper side of the head part in the initial position (i.e. in the idle condition).

The geometric rotation axis can be arranged centrically. The rocking movement in this case is symmetrical, with an equal deflection to both sides. The geometric rotation axis can also be arranged eccentrically. The rocking movement in this case is asymmetrical with a differently large deflection at the respective sides.

The embodiment according to the fourth movement variant can comprise a restoring member which brings the brush body designed as a rocker back into an initial position. The initial position can be a neutral position between two deflection positions. The restoring member can be fastened with a first section to the brush body and with a second section to the head part. The restoring member can also be fastened to the brush body or head part, at only one section and comprise a free section which then merely contacts the respective other part. Possible embodiments of restoring members are described hereinafter. The restoring characteristic in particular can be achieved on account of the material characteristics or the geometric characteristics.

A closure element which in particular simultaneously acts as a restoring member can moreover be formed. The closure element is designed such that it laterally closes the free spaces between the brush body and the head part. The closure element in particular is formed from a soft component.

The brush body according to a fifth movement variant is connected to the head part via articulated connections which each form a geometric rotation axis or a geometric rotation point, and is pivotable in the direction of the head part in the manner of a parallelogram. The bristle carrier of the brush body can be connected to the head part in particular via one or more lifting elements. The lifting element or elements which is/are arranged between the head part and the bristle carrier, are each connected with one end, in particular in an articulated manner, to the head part, and with the other end, in particular in an articulated manner, to the rear side of the bristle carrier. The movement possibility results from the geometric design. Thus 2 to 8 lifting elements can be provided with corresponding, articulated connections.

The lifting elements are lowered on pivoting in the brush body in the direction of the head part, and are brought upright again on pivoting out the brush body. The initial position is the pivoted-out position, from which one departs given a pressure upon the brush body.

The bristle carrier, the lifting elements and the head part or main body can be manufactured in an injection moulding method, in particular in a common injection moulding step. The connections in particular are film hinges. The bristle carrier, lifting elements and head part can be designed as one part according to this embodiment.

The displacement of the brush body in the manner of a parallelogram according to a first movement component towards the head part can be 2 to 5 mm. The displacement of the brush body according to a second movement component parallel to the longitudinal axis can be 2 to 5 mm.

According to a further movement variant, a combined movement of a bristle carrier can also be achieved via lifting elements. The lifting elements in particular can be spring elements which are characterised in that a brush body which is fastened on one or more lifting elements carries out a combined movement with a first movement to the head part or away from this, and simultaneously a second rotation movement. The spring elements can be designed such that these are simultaneously rotated in or rotated out, on lowering or lifting. The spring elements can have a spiral-like structure and e.g. be helical springs.

The bristle carrier of the brush body in particular can be connected to the head part via three or more lifting elements. The lifting element or lifting elements which are arranged between the head part and the bristle carrier are connected in each case with one end to the head part and with the other end to the rear side of the bristle carrier. The movement possibility results from the geometric design. Thus 3 to 8 lifting elements can be provided with corresponding connections.

The lifting elements are lowered on rotating in the brush body in the direction of the head part and are brought upright again on rotating out the brush body. The bristle carrier thereby undergoes a rotation-like movement, during which it simultaneously lowers. The initial position is the rotated-out position, from which one departs due to pressure upon the brush body.

The bristle carrier, the lifting elements and the head part or main body can be manufactured in an injection moulding method, in particular with a common injection moulding step. The connections in particular are film hinges. The bristle carrier, lifting elements and head part can be designed in a single-part manner according to this embodiment.

The lifting elements on the bristle carrier can be arranged in the centre and/or at the outer edge, on the side which is opposite to the bristle field. The attachment on the outer edge entails more stability and a linear movement, whereas the attachment in the centre can also result in a swinging of the bristle carrier, depending on the loading.

The displacement of the brush body according to this movement type can likewise be 2 to 5 mm in the direction of the head part.

The lifting elements can be manufactured from a hard component and/or soft component with all movement variants with lifting elements. Restoring members can moreover be provided for an optimal restoring. The restoring members for example can be of a hard component and/or soft component and can obtain their restoring function on account of the material or the geometric design. One or more restoring members can be provided.

According to a sixth movement variant, the translatory movement is combined with a rotation. The brush body is thus translatorily displaceable along a slide guide. The brush body is additionally displaced over an arcuate surface on the head part and is thus also rotationally moved about a geometric rotation axis. The geometric axis however is distanced to the brush body.

The arcuate surface can be convex, e.g. in the form of an arching, or concave, e.g. in the form of a deepening (recess). The surface in particular is arcuate in cross section. The surface can alternatively or additionally also be arcuate in the longitudinal section.

The design principle of the slide guide can correspond to the slide guide according to the second movement variant, as is already described further above. The translatory movement itself, and accordingly the slide guide can be straight-lined or curve-like, as already described further above.

According to a particular embodiment, the head part has an arching considered transversely to the longitudinal axis of the toothbrush. The rear side of the bristle carrier of the brush body and which lies opposite to the bristle field is designed concavely in an equal and opposite manner.

The brush body according to a first further development can execute a lateral pivot movement directed transversely to the longitudinal axis, over the arching, by way of a sliding guidance. According to a second further development, the guide means can also be designed such that a purely translatory displacement along the longitudinal axis takes place. According to a third further development, the guide means can also be designed such that a combined movement with a lateral pivoting-out and a displacement along the longitudinal axis takes place.

The slide guide can comprise a guide opening, such as guide slot, which is arranged in the arched surface. A guide element, in particular a guide pin, of the brush body engages into the guide opening and is slidingly guided in this.

According to the first further development, the guide opening runs transversely to the longitudinal axis, over the arching. According to the second further development, the guide opening runs along the longitudinal axis of the toothbrush. According to a third further development, the guide opening runs obliquely to the longitudinal axis, over the arching.

The opening direction of the guide opening can be adapted and does not need to move in a plane. The opening direction can also follow a three-dimensional contour. It can for example also change with regard to the inclination, over its course.

As has already been described further above with regard to the individual embodiments, certain movement types can also be combined in the case of a single brush body. All previously described movement types can basically be combined with one another. The possible combinations form an integral constituent of this invention. A few examples are specified hereafter.

A brush body which is designed as a rocker can thus additionally also be designed in a translatorily displaceable manner. A brush body designed as a rocker, as already described, can additionally be designed in a manner rotating about a rotation axis. A translatorily displaceable brush body can additionally also be designed in a rotating manner. A rotating brush body can be designed in a double-rotating meaner via a further rotary connection.

With these variants, one envisages the connection elements being movably mounted relative to the head part in each case. The rocker mechanism for example comprises a guide pin, by way of which this is fixed in the head part, and via which a rotation movement is also possible as a combination.

A selection of possible combinations of brush bodies which are movably mounted on the head part is disclosed hereinafter. Several brush bodies can be arranged one after the other along the longitudinal axis of the toothbrush, hereafter termed as "arranged successively" for the sake of simplicity. Several brush bodies can be arranged next to one another transversely to the longitudinal axis of the toothbrush, subsequently termed "arranged next to one another" for the sake of simplicity.

A brush body can be arranged at the free end-section of the head part, hereafter termed "arranged at the front" for the sake of simplicity. A brush body can be arranged toward the grip part, hereinafter termed "arranged at the rear" for the sake of simplicity. A brush body can also be arranged between a brush body arranged at the front and a brush body arranged at the rear, hereinafter termed "arranged therebetween" for the sake of simplicity.

It is to be understood that the previously described movement variants and characteristics of the brush body also apply to the subsequent combination possibilities.

As an overview, the multi-faceted combination possibilities concerning the arrangement of two brush bodies:

The toothbrush thus e.g. comprises a first brush body which is rotatably or pivotably mounted on the head part about a geometric rotation axis or a rotation point, within a rotation angle or pivot angle. Such a brush body is already described further above.

Moreover, the toothbrush comprises a second brush body which is translatorily movable along the longitudinal axis of the toothbrush. Such a brush body is already described further above.

The second brush body towards the first brush body can have a U-shaped recess in a plan view, in the case that the first brush body is designed in a round manner in a plan view. The U-shaped recess at least partly receives the first brush body given a translatory movement of the second brush body to the first brush body.

The U-shaped recess on the second brush body can be encompassed with bristles. Thus, it can be ensured that a continuous bristle gap does not arise given a translatory movement of the second brush body away from the first brush body.

According to a second combination, the brush bodies are arranged successively. Thus a brush body according to the second movement variant is arranged on the brush head, at the front and at the rear in each case. A brush body according to the first or third movement variant is arranged therebetween.

According to a third combination, the brush bodies are arranged successively. Thus a brush body according to the first or third movement variant is arranged on the brush head at the front and at the rear in each case. A brush body is arranged therebetween on the head part in a fixed manner with regard to movement.

| | | | | Movement form of brush bodies arranged at the front | | | | |
|---|---|---|---|---|---|---|---|---|
| | | | fixed | MV 1 rotatable | MV 2 translatorily movable | MV 3 articulately movable | MV 4 rocking movement | MV 5 articulated connection | MV 6 translatory movement with rotation |
| | | fixed | State of the art | Combination 1 | Combination 2 | Combination 3 | Combination 4 | Combination 5 | Combination 6 |
| Movement form of brush bodies arranged at the rear | MV 1 | rotatable | Combination 7 | Combination 8 | Combination 9 | Combination 10 | Combination 11 | Combination 12 | Combination 13 |
| | MV 2 | translatorily movable | Combination 14 | Combination 15 | Combination 16 | Combination 17 | Combination 18 | Combination 19 | Combination 21 |
| | MV 3 | articulately movable | Combination 22 | Combination 23 | Combination 24 | Combination 25 | Combination 26 | Combination 27 | Combination 28 |
| | MV 4 | rocking movement | Combination 29 | Combination 30 | Combination 31 | Combination 32 | Combination 33 | Combination 34 | Combination 35 |
| | MV 5 | articulated connection | Combination 36 | Combination 37 | Combination 38 | Combination 39 | Combination 40 | Combination 41 | Combination 42 |
| | MV 6 | Translatory movement with rotation | Combination 43 | Combination 44 | Combination 45 | Combination 46 | Combination 47 | Combination 48 | Combination 49 |

The term "MV" represents movement variant.

According to a combination, a brush body according to the first or third movement variant and a brush body which is fixedly fastened to the head part are arranged successively on the brush head (Combination 1, Combination 7).

According to a first combination, a brush body according to the first or third movement variant and a brush body according to the second movement variant are arranged successively on the brush head (corresponds to the Combination 15 or the Combination 17). The first brush body is arranged at the front. The second brush body is arranged at the rear.

According to a fourth combination, two or more brush bodies according to the first and/or third movement variant are arranged successively on the brush head. This amongst other things corresponds to the Combination 8, Combination 10, Combination 23 or Combination 25.

According to a fifth combination, two or more brush bodies according to the second movement variant are arranged successively on the brush head. This amongst other things corresponds to the Combination 16.

According to a sixth combination, the brush bodies are arranged successively. A brush body according to the second movement variant is therefore arranged on the brush head, at the front and at the rear in each case. A brush body is arranged therebetween on the head part, in fixed manner with regard to movement.

According to a seventh combination, a brush body according to a fourth movement variant is arranged in the bristle field of the brush head. Movable brush bodies or ones which are fixed with regard to movement or a bristle arrangement connected to the head part in a fixed manner with regard to movement can be provided in front of and behind the mentioned brush body. The movable brush bodies for example can be of the first, second or third movement variant.

According to an eighth combination, two brush bodies according to the second movement variant are arranged on the brush head next to one another transversely to the longitudinal axis. A brush body of the first and/or third movement variant is arranged between the two brush bodies.

According to a further combination, two brush bodies according to the second movement variant are arranged on the brush head next to one another transversely to the longitudinal axis.

According to a further combination, two brush bodies according to the second movement variant are arranged on the brush head next to one another transversely to the longitudinal axis. A bristle carrier is fixed directly to the head part, between the two brush bodies.

According to a ninth combination, a brush body according to the second movement variant and a brush body according to the first and/or third movement variant are arranged on the brush head next to one another transversely to the longitudinal axis.

According to a tenth combination, a first brush body in a plan view comprises a recess, in which a second brush body is arranged. The first brush body partly or completely surrounds the second brush body.

The tenth combination can comprise the following sub-combinations.

According to a first sub-combination, a first brush body according to the fourth movement variant surrounds a second brush body according to the first and/or third movement variant.

According to a group of eleventh sub-combinations, a first brush body according to the second movement variant surrounds a second brush body according to one of the subsequent movement variants:
first movement variant;
third movement variant;
fourth movement variant;
movement-fixed brush body
second movement variant.

The movement of two adjacent brush bodies can lead to a meshing of bristle fields. Thereby, the meshing of the bristle fields can lead to the one bristle field blocking the movement of the other bristle field, or to the bristle fields mutually blocking one another. One can also envisage the bristle fields not being blocked, but being limited in their movement.

This can be effected for example given a combination of a brush body of the first movement variant and a brush body of the second movement variant. The bristle field of the brush body of the second movement variant can thus be set obliquely in the direction of the other bristle field. The bristle fields then move into one another and mutually impede one another if this brush body is now moved against the other brush body.

Brush bodies can moreover mutually block, for example by way of their bristle carriers. They can engage from a certain movement position into the movement of the other brush body and thus block this, on account of the shaping of the bristle carriers. A brush body of the first variant for example can be impeded by a brush body of the second movement variant when these contact one another.

The movement of two adjacent brush bodies can also lead to the formation of a gap between two bristle fields. Thereby, one can succeed in the gap being kept as small as possible or even closed, also due to the shaping of the bristle carriers and the fashioning of the bristle fields with respect to the length and orientation of the cleaning bristles, and further functional elements.

Further movement combinations are the superposition of certain movement variants on elements of other movement variants. For example:

an element of the first movement variant (rotation) has a further element of the first movement variant (rotation) integrated in the brush body.

an element of the second movement variant (translation) has an element of the first movement variant (rotation) integrated directly on the brush body. Thereby, one or more cleaning elements, such as cleaning bristles, or second functional elements can be integrated on the integrated brush body of the first variant. Several brush bodies of the second movement variant can also be integrated.

an element of the fourth moment variant (rocker) can have integrated an element (or also several elements) of the first movement variant (rotation).

an element of the fourth movement variant (rocker) can have integrated an element (or also several elements) of the second movement variant.

The combination possibilities which are shown in the overview are not all described in detail. The individual movement variants are each described individually above. The movement variants which are not specified in detail however are to be seen as being disclosed by way of the overview.

According to a further development of the invention, the toothbrush and in particular the brush head can comprise a spring mechanism which in particular can be repeatedly wound up, or a rubber drive which can be wound up, wherein these can store mechanical energy for driving the movable brush bodies. It is particularly rotationally moved brush bodies which can be driven by such a spring mechanism or by such a rubber drive, during the cleaning of the teeth.

One can envisage recesses in the head part or in the bristle carrier and in which the head part and bristle carrier move relative to one another, being covered in all movement positions by way of covering elements, in order to prevent injury to the mucous membranes of the mouth or to the tongue during the use. The covering elements e.g. as already mentioned can be closure elements or elastic integral formations on the recesses, of a soft component, which are compliant with respect to the component moving in the recess. The covering elements can e.g. be designed in a film-like or lamella-like manner.

Means having the effect of a warning sound being produced in the case of too rapid a movement of the brush body and the head part relative to one another or too high a pressure impingement of the brush head can be provided. The warning sound in particular is caused by a mechanical functionality. The mechanical functionality lies in the particular design of the geometry of the parts and in the special material selection, so that a noise is produced when two components move too rapidly relative to one another, or if the one component exerts too high a pressure upon the other component.

The head part can form a flexible section, e.g. of a soft component, between the mountings (holders) of two brush bodies. The flexible section permits a bending or twisting of the head part and accordingly of the two brush bodies relative to one another. This can be advantageous for example in the case of too much pressure upon the brush body or parts thereof. Thereby, the brush body which lies closer to the free end of the brush body for example would be compliant via the head part.

Suitable means can also be provided, which permit the tilting-away or bending-away of a moving brush body, e.g. of a rotating or translatorily movable brush body, in the case of too much pressing pressure. Such means can be predetermined breakage locations, film hinges, in particular overmoulded film hinges, flexible sections, e.g. of a soft component, in the head part or brush body, and these means are not compliant until exceeding a force, and effect a bending-way or tilting-away of the brush body.

It is further possible to attach means providing a fixation possibility and thus undermining the flexibility, to the head part. These means can be designed similarly to the fixation elements for the brush body.

The brush head can comprise a restoring member for restoring the brush body, e.g. from a rotative, translatory or rocking deflection, into its initial position.

The restoring member in particular has elastic, such as rubber-elastic characteristics. The restoring member can consist of a soft component. Thus in particular an elastic deformation of the restoring member leads to a restoring effect. The restoring characteristics of the restoring member can result from the shaping and/or the material.

The restoring member can be realised from a hard component or a combination of a hard component and soft component. The restoring characteristics are hereby obtained from the shaping.

The restoring member can be arranged on the head part. According to this embodiment, the moving brush body comes to abut on the restoring member, by which means a deformation force is exerted onto the restoring member.

The restoring member can also be arranged on the brush body. According to this embodiment, the restoring member moving with the brush body comes to abut on an element of the head part or on another brush body, by which means a deformation force is exerted onto the restoring member.

The restoring member can also be designed as a connection element which connects the brush body to the head part or to a further brush body. A deformation force is exerted onto the restoring member by way of the movement of the brush body.

The restoring member elastically deforms due to the deformation force. This leads to the build-up of a restoring force upon the brush body, said force leading to a shape restoration of the restoring member to its original shape and to a restoring of the restoring member.

The restoring member can e.g. be arranged between two brush bodies. The restoring member can also be arranged in the guide opening of a slide guide and be elastically deformed by the guide element moving in the guide opening.

The restoring member can be an element with a fold structure. The fold structure in particular can be zigzag-like, serpentine or meandering. The restoring member can be an annular element. The restoring member can be elongate. The restoring element can be designed in a flat, tape-like manner. The restoring element can be designed in a straight manner or have a bend.

The restoring member in particular can be designed as an arched element and be arranged in a manner such that this arches whilst building up a restoring force, due to elastic deformation in the case of a compression. The arching in particular is effected towards the tooth cleaning side. Functional elements such as nubs, lamellae, prophy cups or even cleaning bristles can be present on the arched section and be advanced due to the arching of the restoring element, in particular advanced to the tooth cleaning side. An annular element, generally a flexible element, in particular a strip-like or wall-like, flat element is therefore suitable as an arching element.

The arching element is designed such that at least one side is fixed on a movable brush body. The further side can be fixed on a moveable or fixed brush body. Exemplary embodiments are:
  one end of the arching element is fixed on the head part and the other on the translatory slide of the second movement variant. The element is arched on account of the slide movement relative to the fastening location on the head part.
  both ends of the arching element are each fixed on a translatory slide of the second movement variant. The element is arched when the two slides move relative to one another.

The design also further entails the arching element also simultaneously being a restoring element which strives to go from the deformed position back into the initial or idle position. The initial position or idle position in each case can be the arched position or the lesser arched or non-arched position.

The restoring member according to a further embodiment can comprise at least one restoring element which is arranged on the head part, laterally of the brush body. The restoring element projects from the head part in a manner such that this element is compressed and/or deflected on movement of the brush body, via a catch contact with the brush body. The restoring element is elastically deformed due to the compressing or deflection of this. The restoring element can be elongate and be designed for example as a functional element such as a lamella or cleaning bristle. The restoring element can additionally have the function of a cleaning bristle or be provided with cleaning bristles. The restoring element in particular can be aligned or directed towards the front side. The restoring member can comprise a plurality of such restoring elements. The restoring elements are arranged successively along the longitudinal axis, in particular laterally of the brush body.

The restoring element in particular is arranged in a lateral indentation in the brush body or bristle carrier, said indentation being delimited by lateral projections or prominences.

The brush head can comprise one or more damping members. The damping member in particular has elastic, such as rubber-elastic characteristics. The damping member in particular is of a soft component. Thus an elastic deformation of the damping member in particular leads to a damping of a brush body. The damping characteristics of the damping member can result from the shaping and/or the material. The damping member can be arranged on the head part or on the brush body.

A damping member can thus be arranged between a first and a second brush body. The damping element serves for damping the movement of the brush body.

Moreover, a damping element can be arranged in the guide opening of a slide guide, on one or both end-sections considered in the movement direction. The guide element which is moved in the guide opening in each case comes to abut on a damping element before a direction change, so that the movement of the brush body is damped via the damping element. One can also envisage the inner walls of the guide opening being designed at least partly of a soft component with damping characteristics. Thereby, it is also possible to arrange damping and non-damping locations in an alternating manner.

Damping elements can generally be arranged in the end region of guides.

The reverse realisation is also conceivable, specifically with the damping elements being arranged on the guide element. The damping elements thus for example bear permanently, or, by way of movement, temporarily on a surface of the head part, in particular in the guide slot, by which means a damping is achieved.

The damping element can be designed as a stop, onto which the rotating brush body abuts, in the case that the movement of the brush body is rotative. The brush body for this can form a contact section which comes to abut with the damping element. Thereby, it is possible for the damping element to be visible or invisible with regard to the end product. If a visible damping element is realised, this is arranged on the outer side of the brush body/head part. In the case of the realisation of damping element which is not visible from the outside, this for example is arranged in the guide slot or in the receiving opening.

One can also envisage a restoring member described above assuming the function of a damping element.

Functional elements of the type which have already been described in detail above, such as cleaning bristles or tongue cleaners of a soft component can be integrally formed on the damping element. The damping element assumes a double function on account of this.

The brush head can comprise a fixation member which can be activated by hand and which is displaceable between at least a first and a second position. The fixation member in a first position can assume a fixation position, which blocks or restricts the movement of the brush body, so that this is immovable or is only movable in a restricted manner. The limited movement in particular can be a restriction of the movement path of the brush body, so that only part-movements can be carried out. Thus for example the rotation angle can be reduced or the translation path shortened or completely eliminated or the rocking movement can be restricted or completely prevented, by way of the fixation element.

The fixation member in a second position can assume an open position, which permits the (complete) movement of the brush body.

For example, one can switch between a normal and a sensitive dental cleaning, as is necessary for users with sensitive gums or sensitive tooth necks, by way of the blocking or restriction of the movement.

The fixation member in the fixation position in particular engages into the movement space of the brush body. The fixation member can be arranged on the head part. The fixation member in particular can be a slider element, which is displaceable along a guide, from the open position into a fixation position, and vice versa.

The fixation member can thus be displaceably guided in the head part, in a through-opening. The fixation member in the fixation position projects out of the head part at the tooth cleaning side. The fixation element is set back in the direction of the head part in the open position.

According to a further development of the fixation member, this can be designed such that this functions in a multi-stage manner and for example can assume three stages of limitations of the movement: no restriction of the movement, partial restriction of the movement and complete restriction of the movement/fixation, of the brush body. The fixation member can also be designed in the same way and manner such that this in each case restricts only the one or both brush bodies in their movement, in the case that several brush bodies are present.

The fixation element can also be designed as a reversibly useable element or as an irreversibly useable element. In the reversible case, the element can be changed back and forth, over and over again between the different positions. A one-off setting, i.e. the fixation or the movability is selected in the irreversible case. The selected setting can then no longer be undone. This for example can be applied in the case of a one-off customised configuration of the toothbrush. The customer defines the movement possibility after the purchase Various possibilities are conceivable with regard to the design of the fixation element. The fixation element for example can be arranged hidden below a layer of soft material. No open geometries of the fixation element are visible in this manner. The fixation element can be an assembly part which is connected to the main body, in particular to the head part, in a direct manner. The fixation element can also be designed so as to be reassembled for each use. The fixation element can e.g. be a clip or a filling element. The fixation element can also be integrally injected onto the main body in a direct manner. The fixation element in particular can assume several positions via a film hinge. Thereby, it is possible for each position to be provided with a lobe, wherein the fixation element comprises a recess, and the fixation is effected by way of bringing the lobe and recess together. A reverse arrangement is likewise conceivable.

According to a further development of the invention, at least one functional element, e.g. for cleaning or for massage and which is moved from a passive position into a functional position by way of a moving brush body, can be arranged on the brush body. The at least one functional element e.g. can be extended or pressed out by way of the movement of the brush body. The at least one functional element in particular can be extended or retracted to the side. The at least one functional element can be a nub, a prophy cup, a lamella or a bristle.

The closure elements which are already mentioned above are integrally formed in a direct manner as an element for the rear-side or lateral closure of openings, with the different movement variants. Closure elements can also be arranged on the front side of the head part, in order to close any occurring openings. Again, there is the possibility of joining the closure element as an assembly part via a positive-fit connection, such as snap-click connection. The closure element can also be integrally injected with an injection moulding method. The closure element can be formed of a hard or soft component.

The closure element can be connected to the brush body. The closure element can be connected to the head part.

The closure element can be provided with functional elements, such as one or more cleaning bristles, on its outwardly facing surface.

The hard component which is mentioned within the scope of this invention is a plastic, in particular a thermoplastic plastic. The hard component is characterised by a comparatively high flexural rigidity. It provides the body with stability.

Different thermoplastic plastics can be applied as hard components. Thus the following thermoplastic plastics are suitable as hard components:

- styrene polymerisates, such a styrene acrylonitrile (SAN), polystyrene (PS), acrylonitrile butadiene styrene (ABS), styrene methyl methacrylate (SMMA) or styrene butadiene (S B);
- polyolefins, such as polypropylene (PP) or polyethylene (PE) for example also in the forms of high density polyethylene (HDPE) or low density polyethylene (LDPE)
- polyesters, such as polyethylene terephthalate (PET) in the form of acid-modified polyethylene terephthalate (PETA) or glycol-modified polyethylene terephthalate (PETG), polybutylene terephthalate (PBT), acid-modified polycyclohexylene dimethylene terephthalate (PCT-A) or glycol-modified polycyclohexylene dimethylene terephthalate (PCT-G);
- cellulose derivatives such as cellulose acetate (CA), cellulose acetobutyrate (CAB), cellulose propionate (CP), cellulose acetate phthalate (CAP) or cellulose butyrate (CB);
- polyamides (PA) such a PA 6.6, PA 6.10 or PA 6.12;
- polymethyl methacrylate (PMMA);
- polycarbonate (PC);
- polyoxymethylene (POM);
- polyvinyl chloride (PVC) or a
- polyurethane (PUR).

However, a polypropylene (PP) or an acid-modified polycyclohexylene dimethylene terephthalate (PCT-A) is particular preferably applied as a hard component. PCT-A in particular on account of its excellent transparent characteristics is particularly suitable as a first material component, which, as is known, forms the jacket body. The hard component of PP preferably has a modulus of elasticity of 1000-2400 N/mm$^2$, preferably of 1300 to 1800 N/mm$^2$.

The soft component which is mentioned within the scope of this invention is a plastic, in particular a thermoplastic plastic. The soft component in particular can be a thermoplastic elastomer. The soft component is characterised by its soft-elastic characteristics.

Different thermoplastic elastomers (TPEs) can be applied as soft components. The following thermoplastic elastomers are thus particularly suitable as soft components:

- thermoplastic polyurethane elastomers (TPE-U);
- thermoplastic styrene elastomers (TPE-S), such as for example a styrene ethylene butylene styrene copolymer (SEBS) or styrene butadiene styrene copolymer (SBS):
- thermoplastic polyamide elastomers (TPE-A);
- thermoplastic polyolefin elastomers (TPE-O)
- thermoplastic polyester elastomers (TPE-E).

A TPE-S is preferably applied as a soft component. The thermoplastics polyethylene (PE) and polyurethane (PU) can moreover be applied as a hard component as well as a soft component. The Shore A hardnesses of the soft component preferably lie below 90 Shore A.

The first and the second material component and in particular the soft components and the hard component preferably form a material fit in the injection moulding method. It is also conceivable not for a material fit, but a positive fit to occur, depending on the selection of the material components and method parameters. Regions with a material fit and positive fit can alternate.

The invention also relates to a method for manufacturing a toothbrush described above. According to the invention, the main body is manufactured in an injection moulding method. The bristle carrier of the brush body can likewise be manufactured with an injection moulding method. The bristle carrier, as the case may be, the complete brush body together with the cleaning bristles, and the main body, can be manufactured in a common injection moulding method.

Connection sections with predetermined breakage locations can be provided between the head part and the brush body, in particular the bristle carrier, on manufacture of the toothbrush, and the purpose of these is so that the movability of the brush body relative to the head part is not achieved until the breakage of the connection section along the predetermined breakage location.

Certain components such as the main body, the bristle carrier or the brush body can of course be manufactured in separate method steps and be assembled in a subsequent step.

The brush bodies which are connected to one another for example via connection sections of soft material in particular are manufactured in the same injection moulding procedure and are subsequently commonly assembled onto the head part.

With regard to the injection moulding method, it is possible for example to inject sections of a soft component onto the injected brush body of a hard component at several regions. Thereby, these regions can be materially connected to one another and thus be injected through a common injection point. On the other hand, these regions can also be arranged in an isolated manner and each be injected via a separate injection point.

The injection moulding method in particular also permits transition locations on the injection moulded brush bodies to be covered with soft material.

The assembly of the brush body on the head part can take place before or after the bristling process. The assembly in particular is effected before the packaging of the toothbrush. The assembly of the brush bodies can also be effected directly within the framework of the packaging process, but before the actual packaging.

The bristling of the brush bodies or bristle carriers is effected in the so-called bristling process. The brush body can already be assembled on the head part or not yet assembled on this, at this point in time. In both cases, one must ensure that the brush body is in a clearly defined position and that the brush body is correctly supported, so that this is not damaged during the bristling process.

The different interface structures need to be adequately supported in the case that the brush body is bristled before the assembly. Damage to these interface structures should be avoided, since the connection would otherwise no longer be optimal.

The assembly of brush bodies which are already provided with a bristling likewise needs to be effected in a careful manner, so that the bristling is not damaged. The bristle carrier in this case must be designed such that any occurring mechanical loading due to the assembly does not result in damage to the bristling interface. This could indeed lead to the bristles falling out.

The movable brush body can be designed as an exchange component. This means that the brush body can be exchanged in the case of wear, or for different care steps. Different configurations of cleaning bristles on different brush bodies can be realised for example. The user then himself decides on the configuration he wishes to use, by way of the suitable selection of the brush body.

The connection between the head part and the respective brush body is designed such that the detachment weight for the tearing-away of the brush body from the head part is for example at least 12 kg, in particular at least 15 kg, in the case that the brush body is not envisaged for exchange.

The brush head with the at least two movable brush bodies leads to an optimised cleaning effect. A combined movement of the brush body and brush head therefore leads to an increased cleaning performance, since the cleaning bristles can reach interdental spaces and other difficulty accessible locations more easily, on account of the combined movement.

Such a brush head moreover permits a gentle dental cleaning. It is particularly when applying the brush head at the beginning of the cleaning of the teeth that a large pressing pressure burdening the teeth and gums arises in each case. The application pressure is reduced and the loading of the teeth and gums is reduced if the brush body can now yield which is to say give way, due to a translatory or rotational movement or a combination of these, on applying the brush head onto the teeth.

Figure 1B:
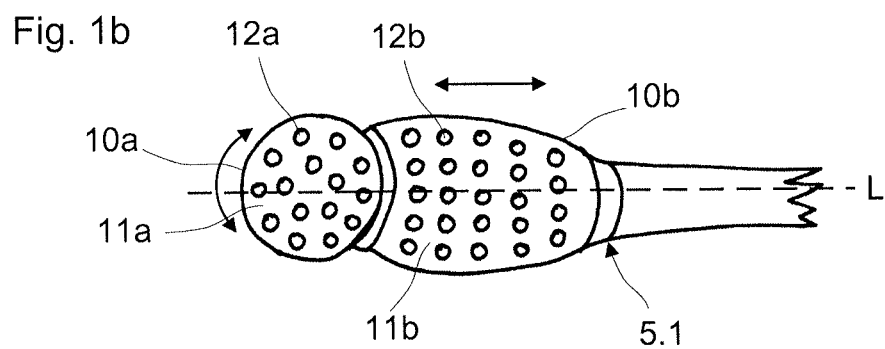
Figure 1C:
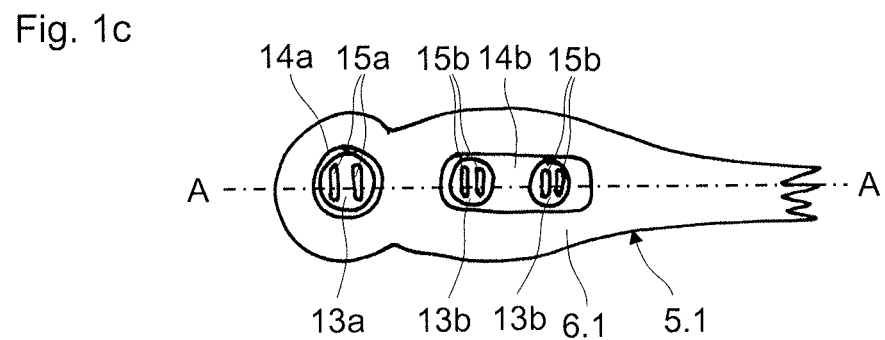
Figure 1D:
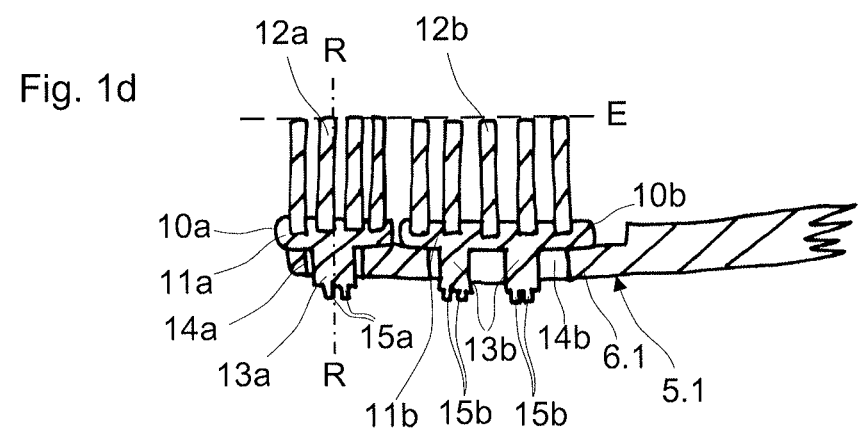
Figure 3A:
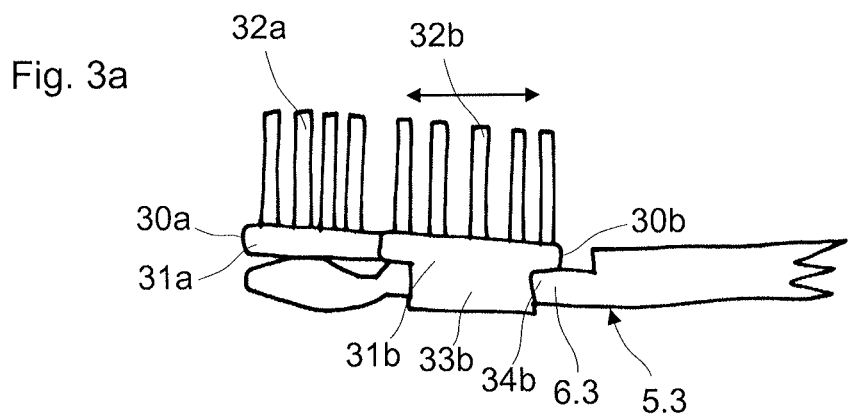
Figure 3B:
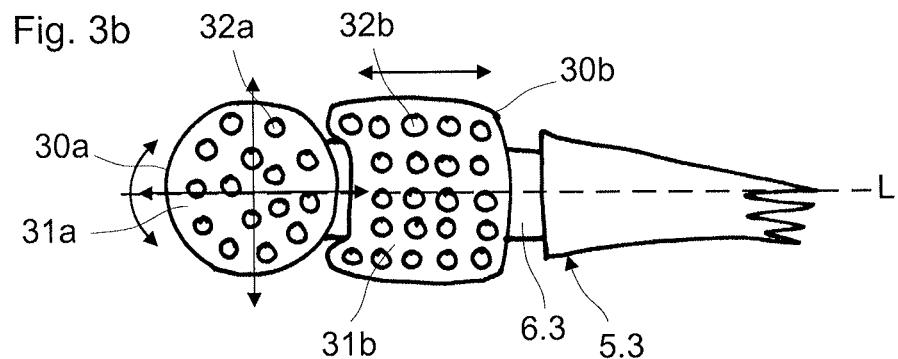
Figure 3C:
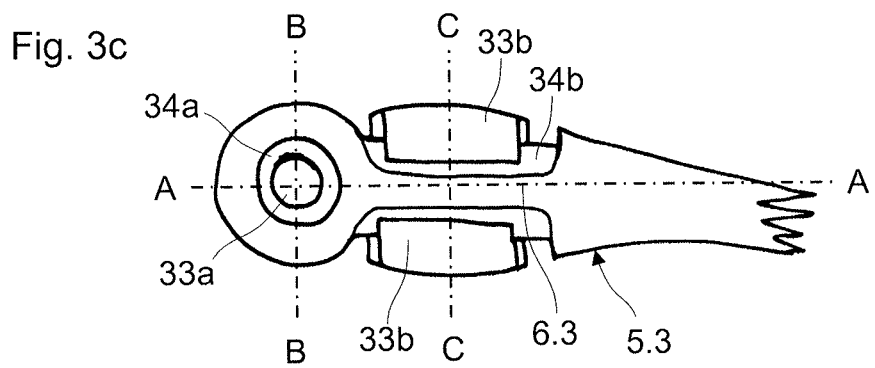
Figure 3D:
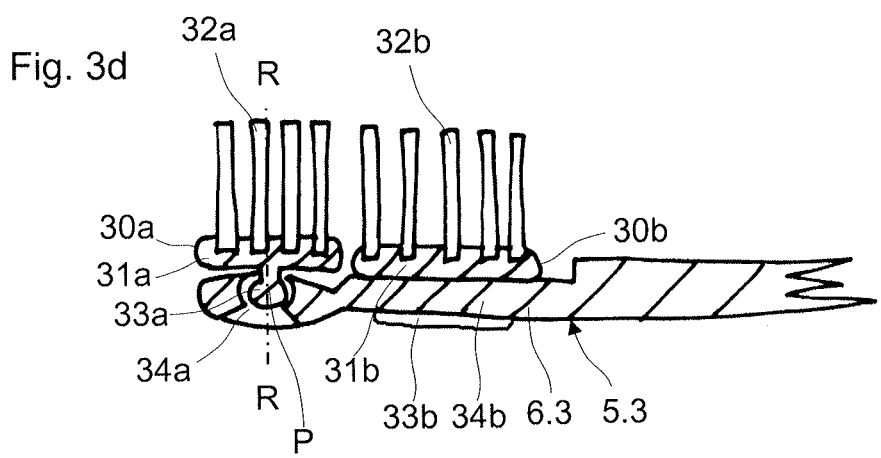
Figure 3E:
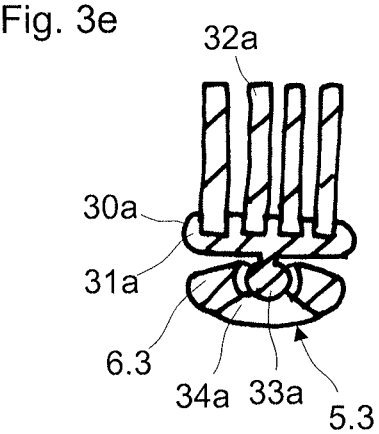
Figure 3F:
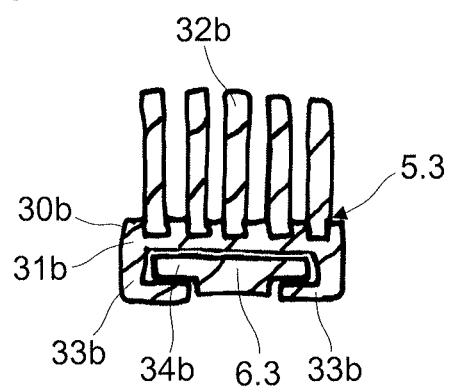
Figure 4A:
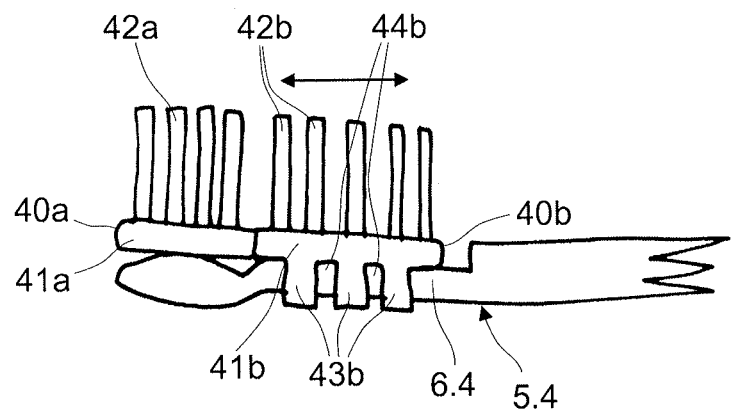
Figure 4B:
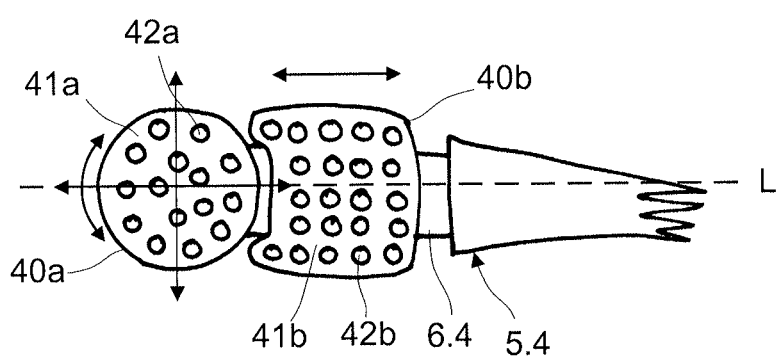
Figure 4C:
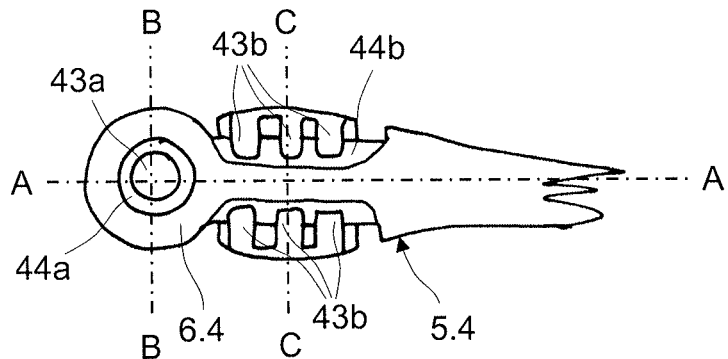
Figure 4D:
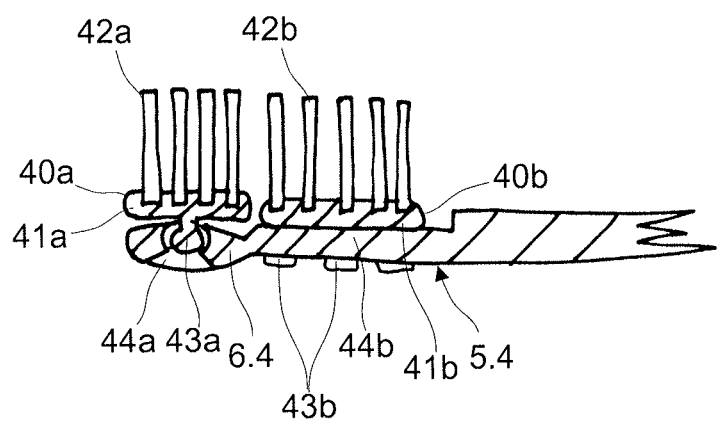
Figure 4E:
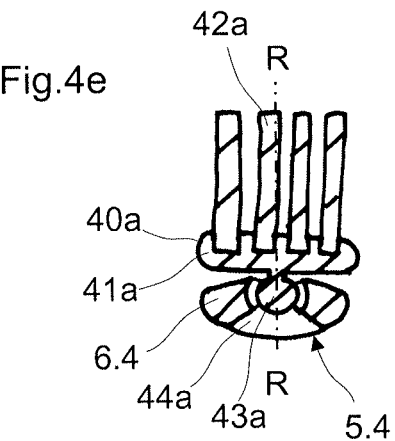
Figure 4F:
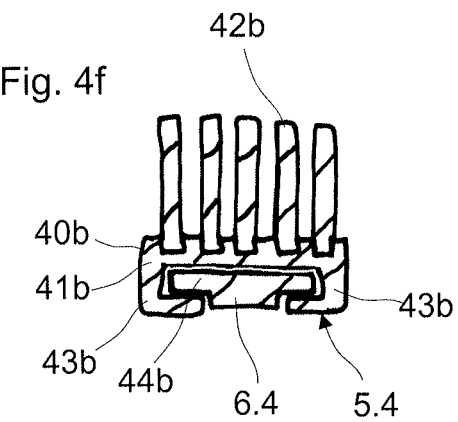
Figure 5A:
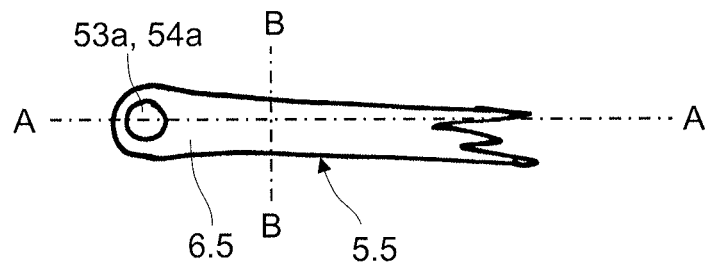
Figure 5B:
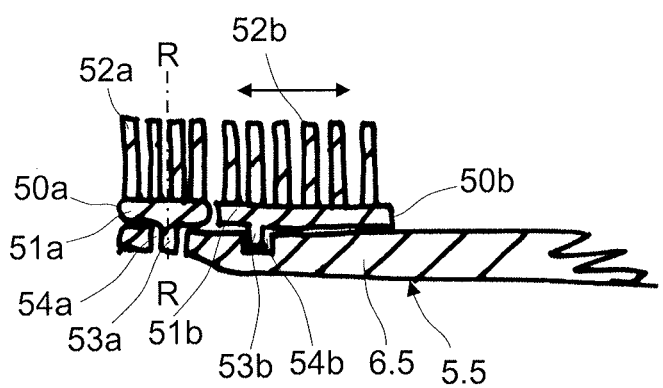
Figure 5C:
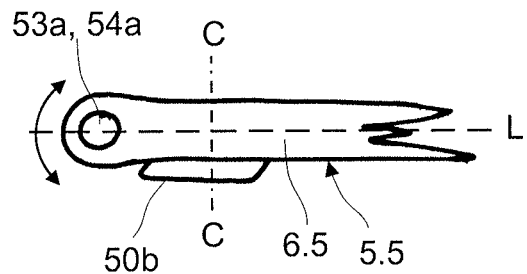
Figure 5D:
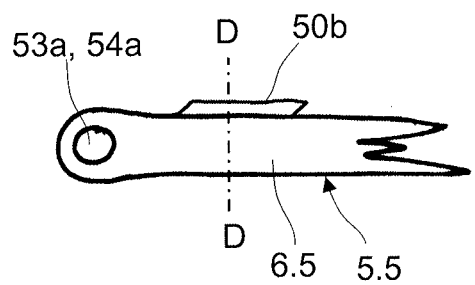
Figure 5E:
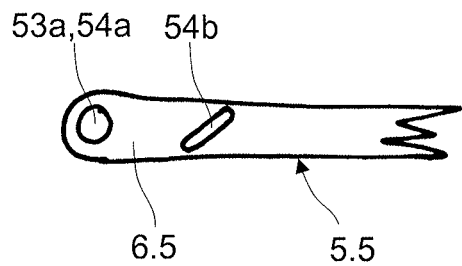
Figure 5F:
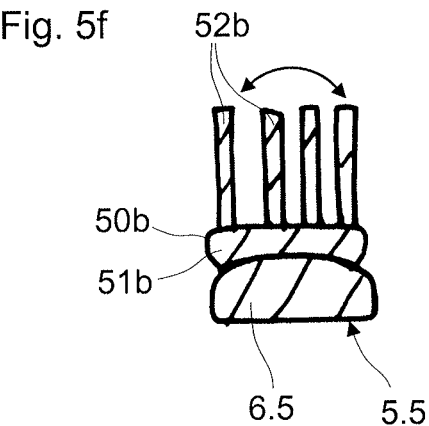
Figure 5G:
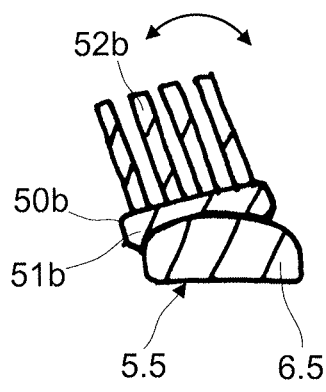
Figure 5H:
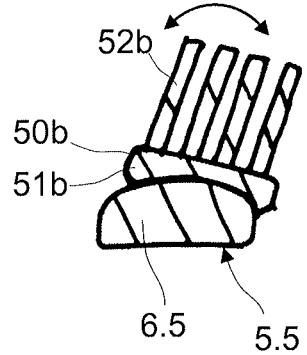
Figure 6A:
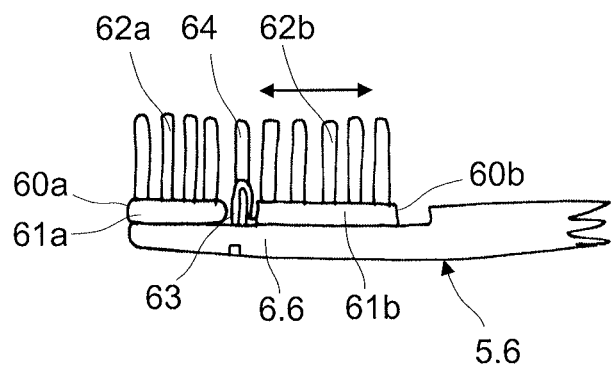
Figure 6B:
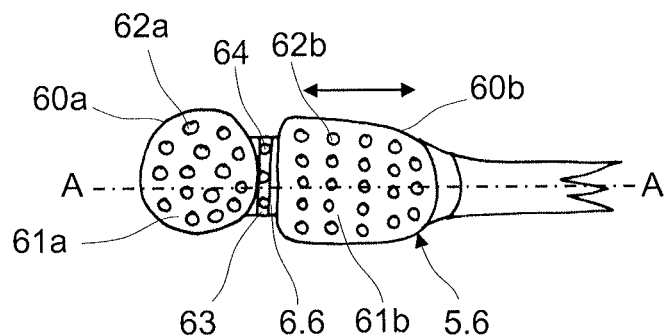
Figure 6C:
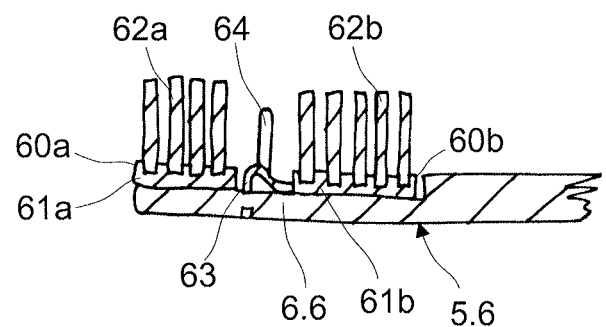
Figure 6D:
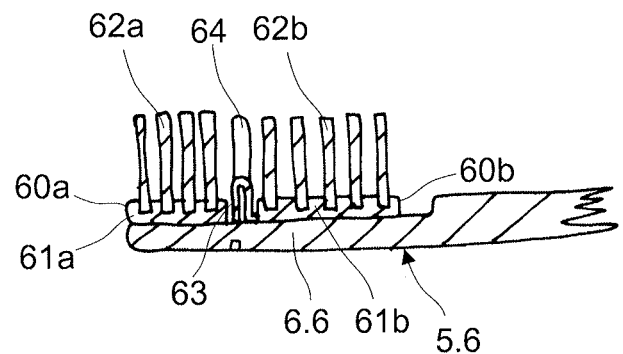
Figure 9:
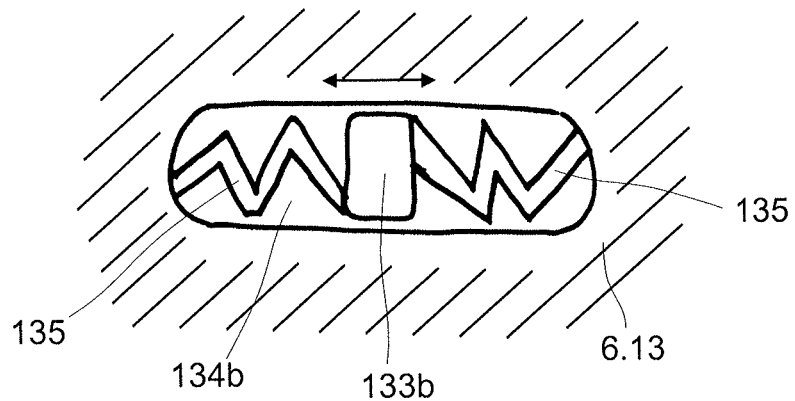
Figure 10:
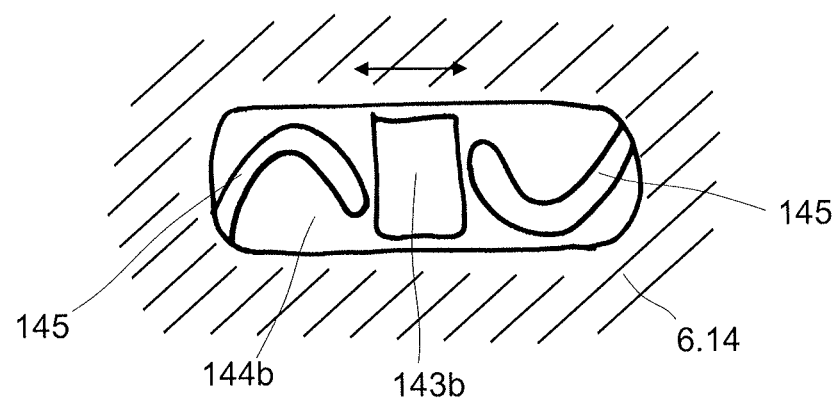
Figure 11A:
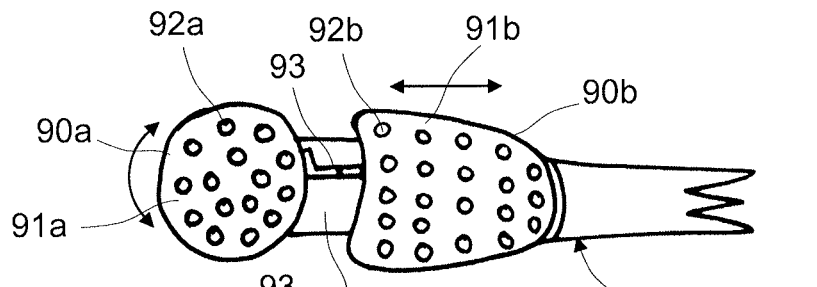
Figure 11B:
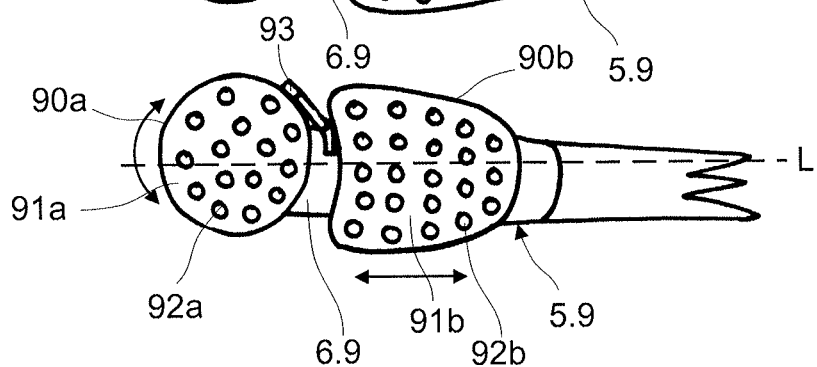
Figure 12A:
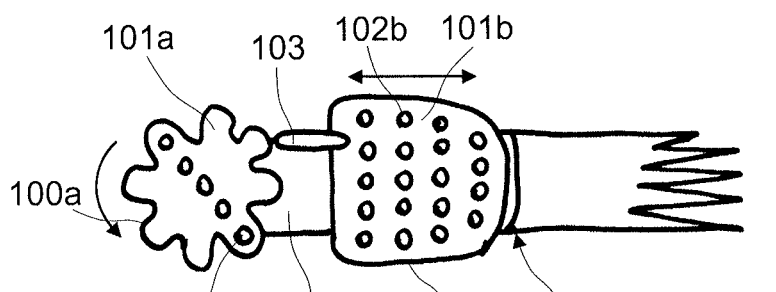
Figure 12B:
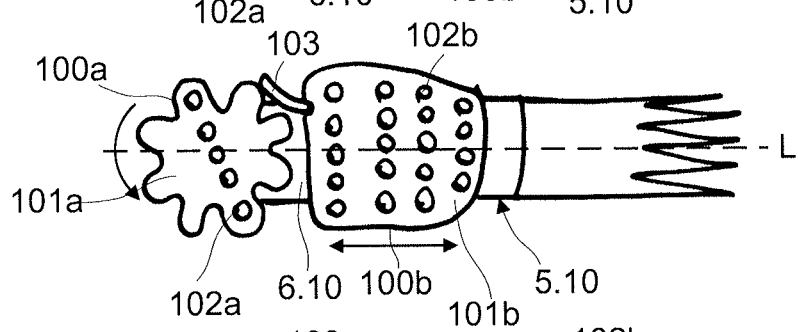
Figure 12C:
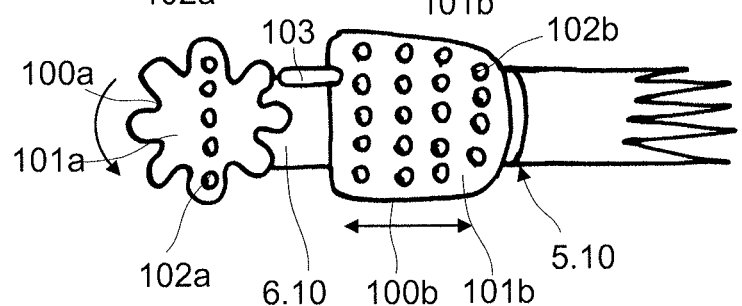
Figure 13B:
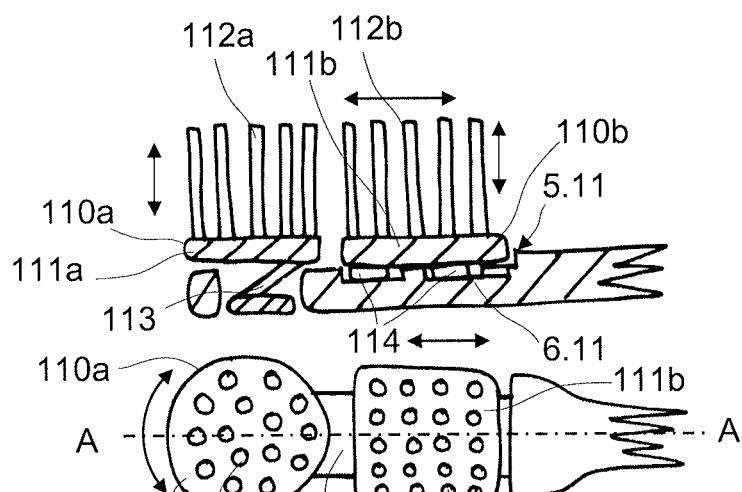
Figure 13A:
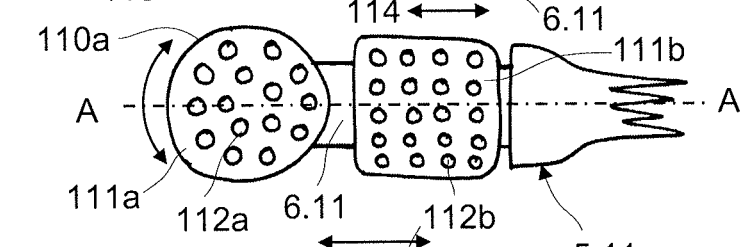
Figure 13D:
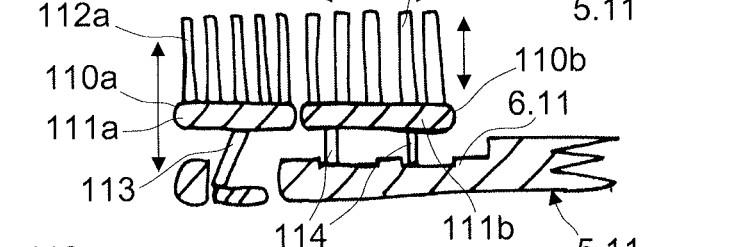
Figure 13C:
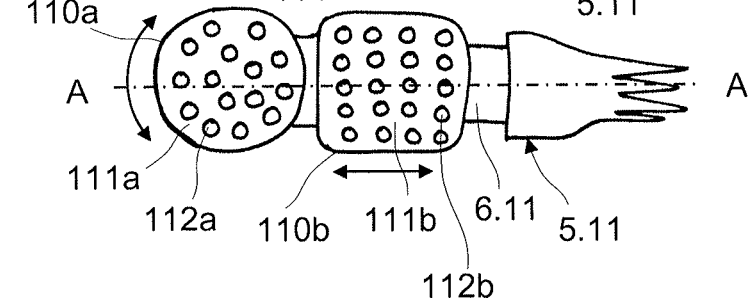
Figure 14A:
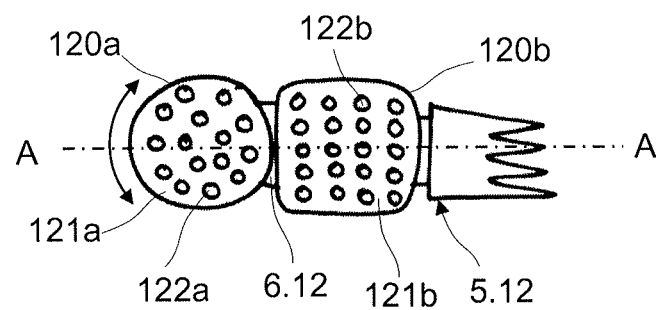
Figure 14B:
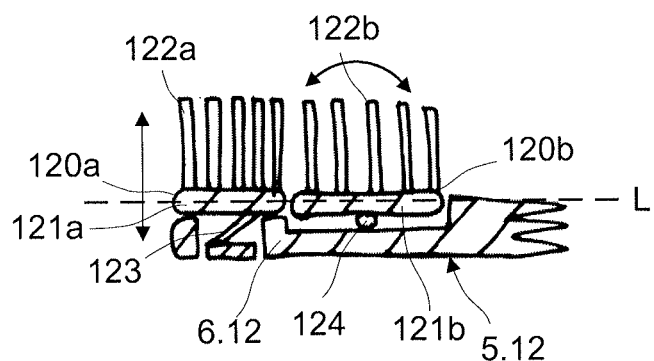
Figure 14C:
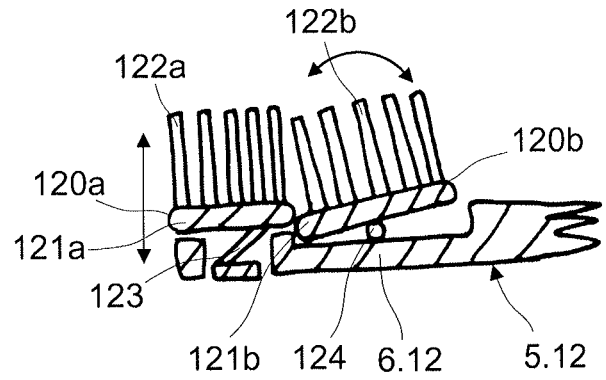
Figure 15A:
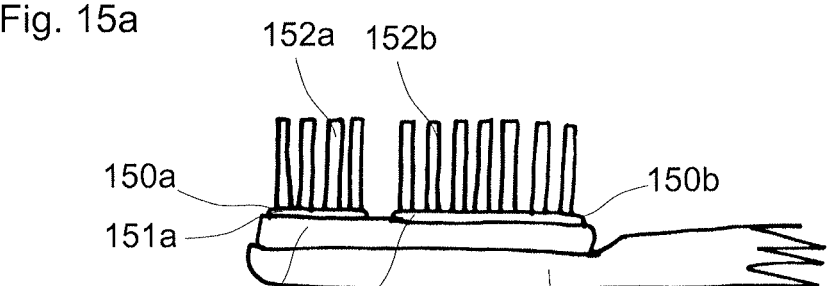
Figure 15B:
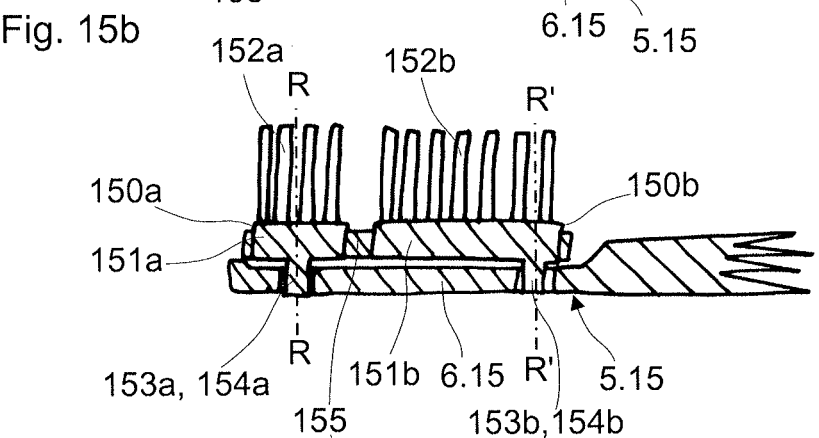
Figure 15C:
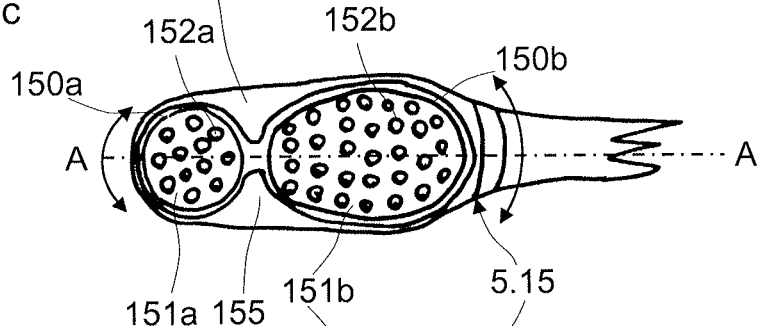
Figure 15D:
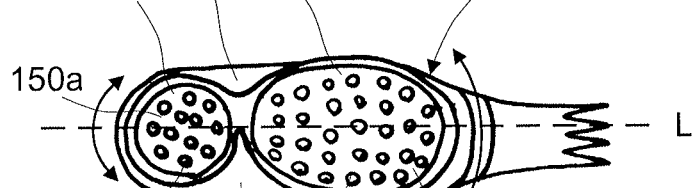
Figure 15E:
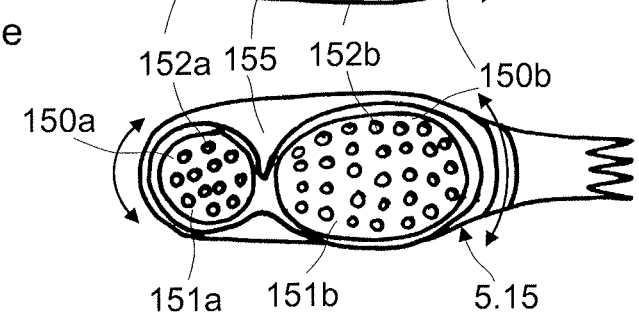
Figure 16A:
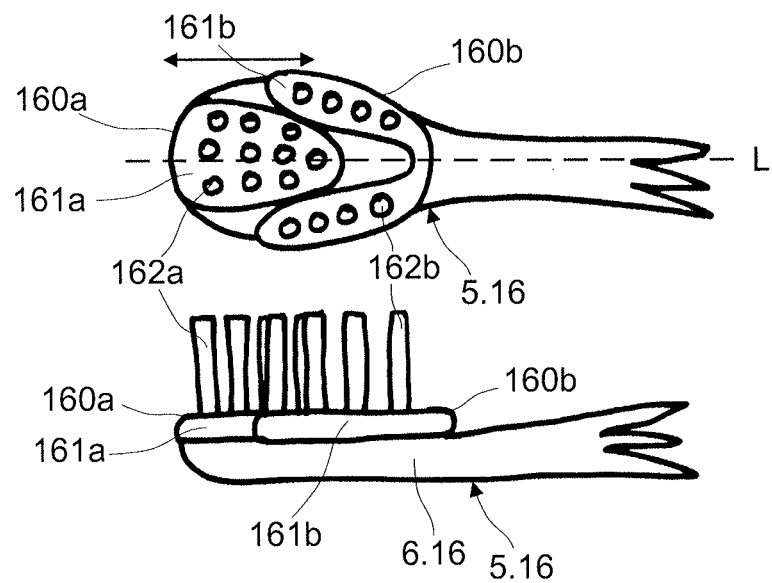
Figure 16B:
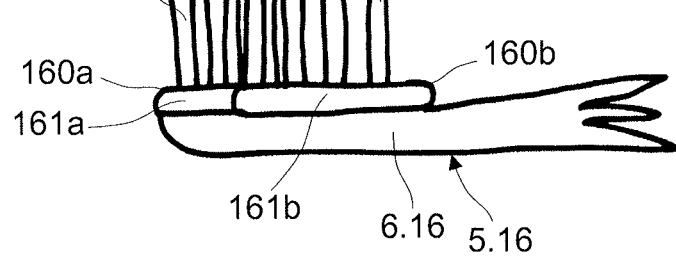
Figure 16C:
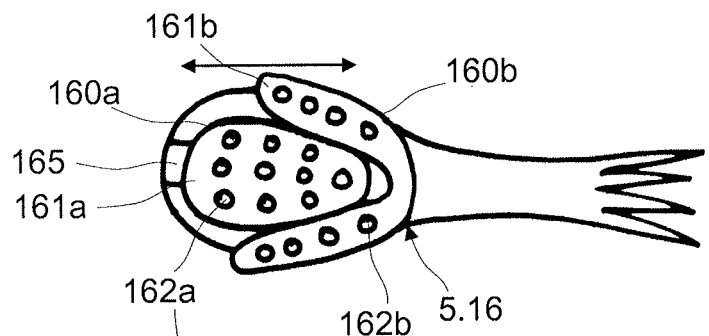
Figure 16D:
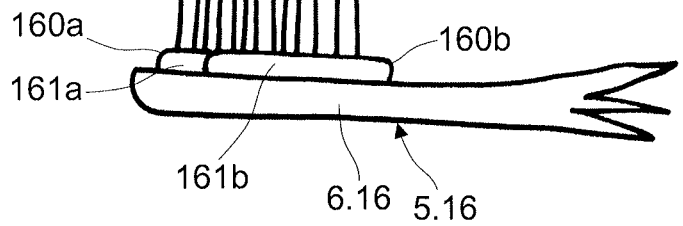
Figure 19A:
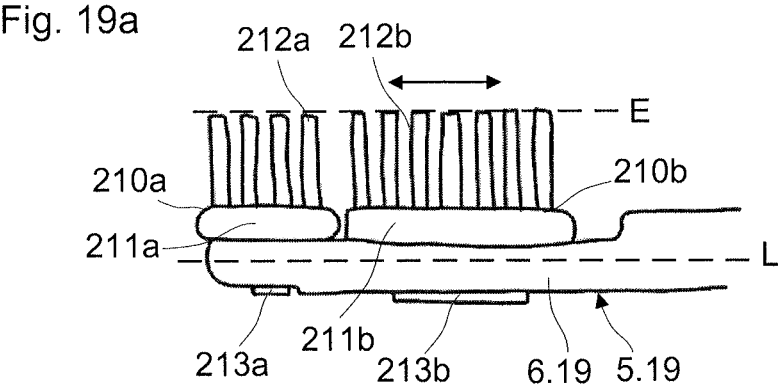
Figure 19B:
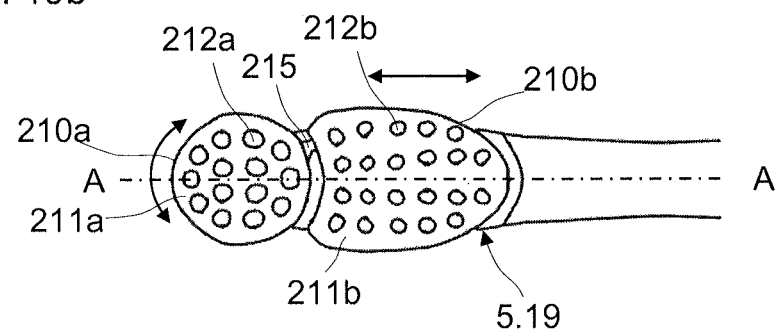
Figure 19C:
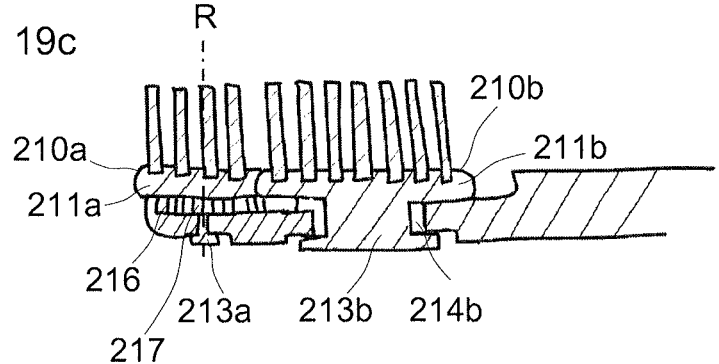
Figure 19D:
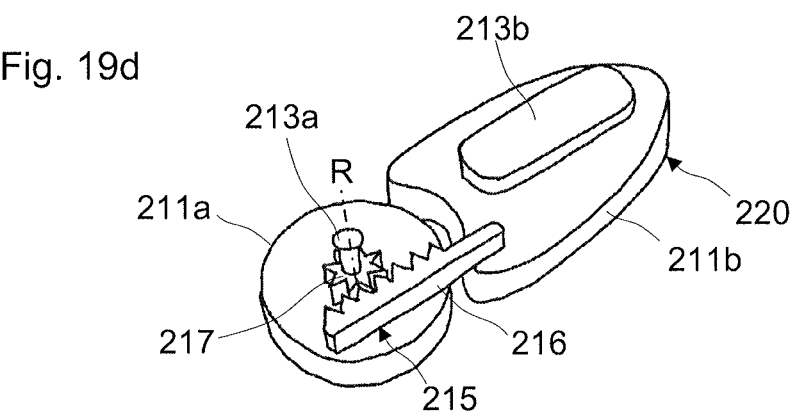
Figure 20A:
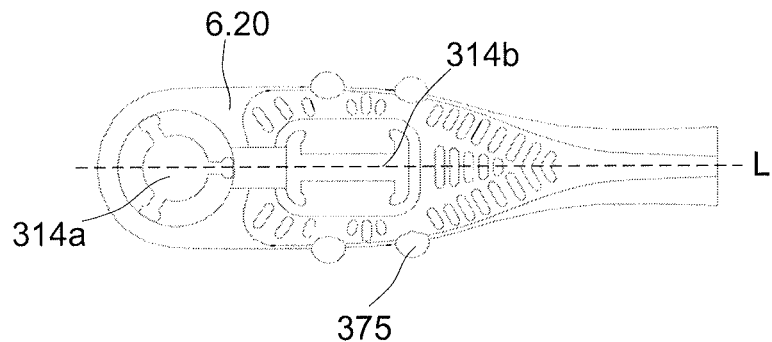
Figure 20B:
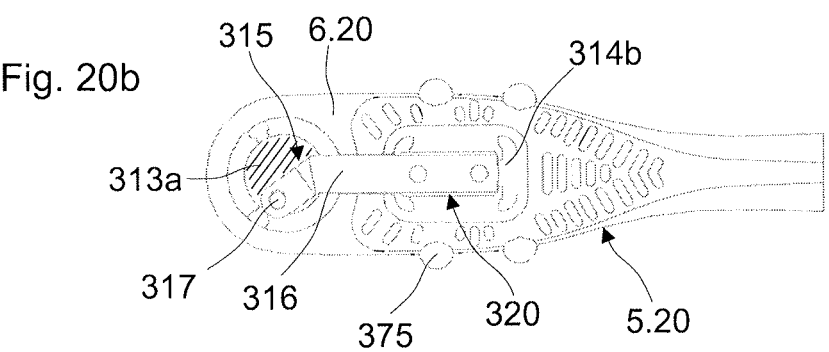
Figure 20C:
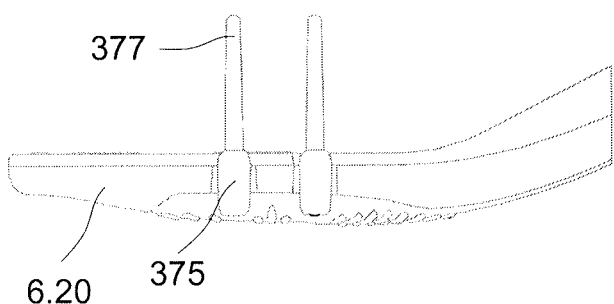
Figure 20D:
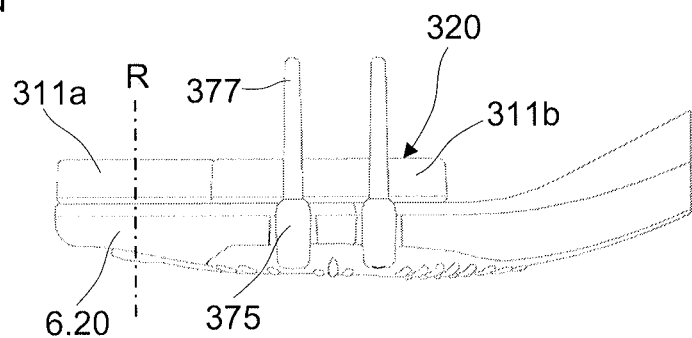
Figure 21A:
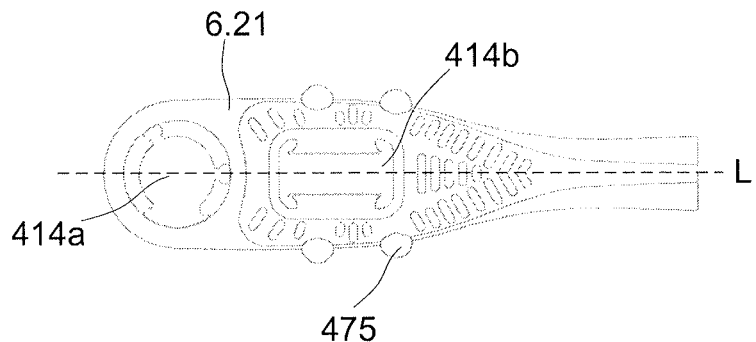
Figure 21B:
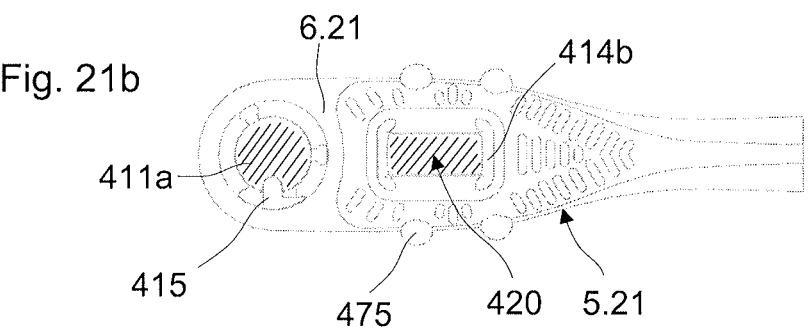
Figure 21C:
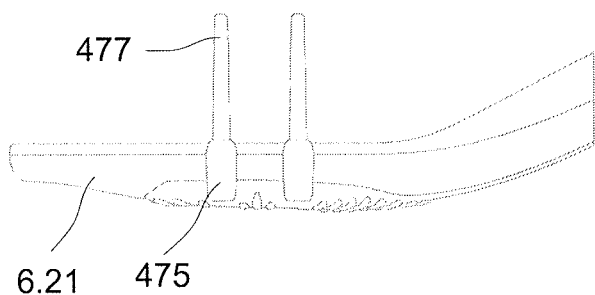
Figure 21D:
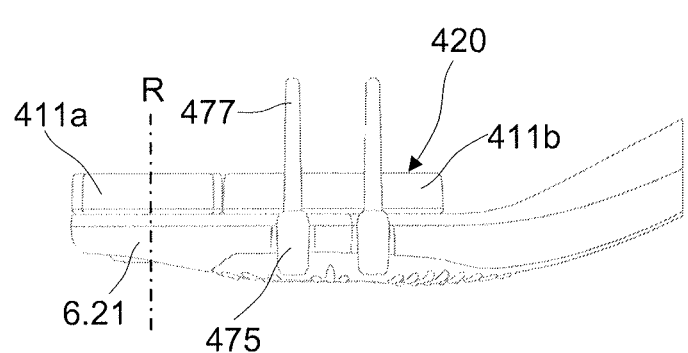

The subject-matter of the invention is hereinafter described in more detail by way of preferred embodiments which are represented in the accompanying drawings. In each are schematically shown in:

FIG. 1a: a lateral view of the brush head of a toothbrush according to the invention, according to a first embodiment variant;

FIG. 1b: a plan view of the brush head according to FIG. 1a;

FIG. 1c: a rear side view of the brush head according to FIGS. 1a and 1b;

FIG. 1d: a longitudinal section through the brush head according to FIG. 1c, along the line A-A;

FIG. 2a: a lateral view of the brush head of a toothbrush according to the invention, according to a second embodiment variant;

FIG. 2b a plan view of the brush head according to FIG. 2a;

FIG. 2c: a rear side view of the brush head according to FIGS. 2a and 2b;

FIG. 2d: a longitudinal section through the brush head, according to FIG. 2c along the line A-A;

FIG. 3a: a lateral view of the brush head of a toothbrush according to the invention, according to a third embodiment variant;

FIG. 3b: a plan view of the brush head according to FIG. 3a;

FIG. 3c: a rear side view of the brush head according to FIGS. 3a and 3b;

FIG. 3d: a longitudinal section through the brush head according to FIG. 3c, along the line A-A;

FIG. 3e: a cross section through the brush head according to FIG. 3c, along the line B-B;

FIG. 3f: a cross section through the brush head according to FIG. 3c, along the line C-C;

FIG. 4a: a lateral view of the brush head of a toothbrush according to the invention, according to a fourth embodiment variant;

FIG. 4b: a plan view of the brush head according to FIG. 4a;

FIG. 4c: a rear side view of the brush head according to FIGS. 4a and 4b;

FIG. 4d: a longitudinal section through the brush head according to FIG. 4c, along the line A-A;

FIG. 4e: a cross section through the brush head according to FIG. 4c, along the line B-B;

FIG. 4f: a cross section through the brush head according to FIG. 4c, along the line C-C;

FIG. 5a: a rear side view of the brush head of a toothbrush according to the invention, according to a fifth embodiment variant;

FIG. 5b: a longitudinal section through the brush head according to FIG. 5a, along the line A-A;

FIG. 5c: a rear side view according to FIG. 5a, with a brush body which is deflected out laterally to the left;

FIG. 5d: a rear side view according to FIG. 5a, with a brush body which is deflected out laterally to the right;

FIG. 5e: a plan view of the brush head according to FIGS. 5a-5d, without a brush body;

FIG. 5f: a cross section through the brush head according to FIG. 4c, along the line B-B;

FIG. 5g: a cross section through the brush head according to FIG. 4c, along the line C-C;

FIG. 5h: a cross section through the brush head according to FIG. 4c, along the line D-D;

FIG. 6a: a lateral view of the brush head of a toothbrush according to the invention, according to a sixth embodiment variant;

FIG. 6b: a plan view of the brush head according to FIG. 6a;

FIG. 6c: a longitudinal section through the brush head according to FIG. 6d, along the line A-A, with the brush body in an alternative movement position;

FIG. 6d: a longitudinal section through the brush head according to FIG. 6b, along the line A-A;

FIG. 7a: a lateral view of the brush head of a toothbrush according to the invention, according to a seventh embodiment variant;

FIG. 7b: a plan view of the brush head according to FIG. 7a;

FIG. 7c: a rear side view through the brush head according to FIGS. 7a and 7b;

FIG. 7d: a cross section through the brush head according to FIG. 7c, along the line A-A;

FIG. 8a: a lateral view of the brush head of a toothbrush according to the invention, according to an eighth embodiment variant;

FIG. 8b a plan view of the brush head according to FIG. 8a;

FIG. 8c: a rear side view of the brush head according to FIGS. 8a and 8b;

FIG. 8d: a cross section through the brush head according to FIG. 8c, along the line A-A;

FIG. 9: a plan view of a guide element of the brush body which is guided in a guide slot, according to a first type;

FIG. 10: a plan view of a guide element of the brush body which is guided in a guide slot, according to a second type;

FIG. 11a: a plan view of the brush head of a toothbrush according to the invention, according to a ninth embodiment variant, with a brush body in a first movement position;

FIG. 11b: a plan view of the brush head according to FIG. 11a, with the brush body in a second movement position;

FIG. 12a: a plan view of the brush head of a toothbrush according to the invention, according to a tenth embodiment variant, with the brush body in a first movement position;

FIG. 12b: a plan view of the brush head according to FIG. 12a, with the brush body in a second movement position;

FIG. 12c: a plan view of the brush head according to FIG. 12a, with the brush body in a third movement position;

FIG. 13a: a plan view of the brush head of a toothbrush according to the invention, according to an eleventh embodiment variant, with a brush body in a first movement position;

FIG. 13b: a cross section through the brush head according to FIG. 13a, along the line A-A;

FIG. 13c: a plan view of the brush head of a toothbrush according to the invention, according to FIGS. 13a and 13b, with the brush body in a second movement position;

FIG. 13d: a cross section through the brush head according to FIG. 13c, along the line A-A;

FIG. 14a: a plan view of the brush head of a toothbrush according to the invention, according to a twelfth embodiment variant, with a brush body in a first movement position;

FIG. 14b: a cross section through the brush head according to FIG. 14a, along the line A-A;

FIG. 14c: a cross section through the brush head according to FIG. 14b, with the brush body in a second movement position;

FIG. 15a: a lateral view of the brush head of a toothbrush according to the invention, according to a thirteenth embodiment variant;

FIG. 15b: a longitudinal section through the brush head according to FIG. 15c, along the line A-A;

FIG. 15c: a plan view of the brush head according to FIGS. 15a and 15b, with the brush bodies in a first movement position;

FIG. 15d: a plan view of the brush head according to FIGS. 15a and 15b, with the brush bodies in a second movement position;

FIG. 15e: a plan view of the brush head according to FIGS. 15a and 15b, with the brush bodies in a third movement position;

FIG. 16a: a plan view of the brush head of a toothbrush according to the invention, according to a fourteenth embodiment variant, with the brush body in a first movement position;

FIG. 16b: a lateral view of the brush head according to FIG. 16a;

FIG. 16c: a plan view of the brush head according to FIG. 16a, with the brush body in a second movement position;

FIG. 16d: a lateral view of the brush head according to FIG. 16c;

FIG. 16e: a plan view of the brush head according to FIG. 16a, with the brush body in a third movement position;

FIG. 16f: a lateral view of the brush head according to FIG. 16e;

FIG. 16g: a plan view of the toothbrush with the brush head according to FIG. 16e, with the brush body in the third movement position;

FIG. 16h: a lateral view of the toothbrush according to FIG. 16g;

FIG. 17a: a lateral view of the brush head of a toothbrush according to the invention, according to a fifteenth embodiment variant;

FIG. 17b: a plan view of the brush head according to FIG. 17a;

FIG. 17c: a rear side view of the brush head according to FIGS. 17a and 17b;

FIG. 17d: a longitudinal section through the brush head according to FIG. 17c, along the line A-A;

FIG. 18: a cross section of one embodiment variant for attaching the bristle field for a brush body according to FIG. 1d;

FIG. 19a: a lateral view of the brush head of a toothbrush according to the invention, according to a sixteenth embodiment variant;

FIG. 19b: a plan view of the brush head according to FIG. 19a;

FIG. 19c: a longitudinal section through the brush head according to FIG. 19a, along the line A-A;

FIG. 19d: a perspective view of the coupling mechanism;

FIG. 20a: a plan view onto the lower side of the brush head of a toothbrush according to the invention, according to a seventeenth embodiment variant, without a coupling mechanism and bristle carrier;

FIG. 20b: a plan view of the lower side of the brush head according to FIG. 20a, with a coupling mechanism and bristle carrier;

FIG. 20c: a lateral view of the brush head according to FIG. 20a;

FIG. 20d: a lateral view of the brush head according to FIG. 20b;

FIG. 20e: a front view of the brush head according to FIG. 20b;

FIG. 20f: a plan view of the upper side of the brush head according to FIG. 20b;

FIG. 20g: a plan view of the lower side of the coupling mechanism with a bristle carrier;

FIG. 20h: a rear view of the coupling mechanism with the bristle carrier, according to FIG. 20g;

FIG. 20i: a lateral view of the coupling mechanism with a bristle carrier, according to FIG. 20g;

FIG. 20j: a front view of the coupling mechanism with the bristle carrier, according to FIG. 20g;

FIG. 20k: a plan view of the upper side of the coupling mechanism with a bristle carrier, according to FIG. 20g;

FIG. 21a: a plan view of the lower side of the brush head of a toothbrush according to the invention, according to an eighteenth embodiment variant, without a coupling mechanism and bristle carrier;

FIG. 21b: a plan view of the lower side of the brush head according to FIG. 21a, with a coupling mechanism and bristle carrier;

FIG. 21c: a lateral view of the brush head according to FIG. 21a;

FIG. 21d: a lateral view of the brush head according to FIG. 21b;

FIG. 21e: a front view of the brush head according to FIG. 21b;

FIG. 21f: a plan view of the upper side of the brush head according to FIG. 21b;

FIG. 21g: a plan view of the lower side of the coupling mechanism with a bristle carrier;

FIG. 21h: a rear view of the coupling mechanism with a bristle carrier, according to FIG. 21g;

FIG. 21i: a lateral view of the coupling mechanism with a bristle carrier, according to FIG. 21g;

FIG. 21j: a front view of the coupling mechanism with a bristle carrier, according to FIG. 21g;

FIG. 21k: a plan view of the upper side of the coupling mechanism with a bristle carrier, according to FIG. 21g.

Basically, the same parts are provided in the figures with the same reference numerals. Certain features are not represented in the figures, for a better understanding of the invention. The described embodiment examples are exemplary of the subject-matter of the invention or serve for its explanation, and are to have no limiting effect.

Amongst other things, in pairings of movable brush bodies on a common head part are shown in the subsequent figures. The individual brush bodies and the associated movement mechanisms, interacting with the head part, are however also to be considered as independent disclosures, in particular if the pairings of the brush bodies have no coupled movements. Represented restoring members and damping elements are to be considered as independent disclosures to the same extent.

The toothbrush 1, as is represented with regard to its basic construction in FIGS. 16g and 16h in the context of an embodiment variant of the brush head, comprises a main body 2 with a grip part 3 for holding the toothbrush 1 by hand. The main body 2 moreover comprises a head part 6.1-6.21 (corresponds to: 6.1, 6.2, 6.3, 6.4, 6.5, 6.6, 6.7, 6.8, 6.9, 6.10, 6.11, 6.12, 6.13, 6.14, 6.15, 6.16, 6.17, 6.18, 6.19, 6.20, 6.21) as well as a neck part 4 connecting the head part 6.1-6.21 to the grip part 3.

The head part 6.1-6.21 can be designed corresponding to one of the embodiment examples according to FIG. 1 to 21. The head part 6.1-6.21 together with subsequently described brush body or brush bodies 10a-410a; 10b-410b (corresponds to: 10a, 10b; 20a, 20b; 30a, 30b; 40a, 40b; 50a, 50b; 60a, 60b; 70a, 70b; 80a, 80b; 90a, 90b; 100a, 100b; 11a, 110b; 120a, 120b; 150a, 150b; 160a, 160b; 170a; 180a; 210a, 210b; 310a, 310b; 410a, 410b) forms the brush head 5.1-5.21 (corresponds to: 5.1, 5.2, 5.3, 5.4, 5.5, 5.6, 5.7, 5.8, 5.9, 5.10, 5.11, 5.12, 5.15, 5.16, 5.17, 5.18, 5.19, 5.20, 5.21) or a part of this. The head part 6.1-6.21 serves as a carrier for the brush body or brush bodies 10a-410a; 10b-410b which is/are arranged on this.

The embodiments of brush heads 5.1-5.21 according to FIGS. 1 to 21, as mentioned each comprise a head part 6.1-6.21. A first brush body 10a-410a as well as a second brush body 10b-410b is arranged on the head part 6.1-6.21 in each case. The two brush bodies 10a-410a; 10b-410b are arranged successively along the longitudinal axis L of the toothbrush 1. The first brush body 10a-410a is arranged in each case at the front on the free end-section of the head part 6.1-6.21. The second brush body 10b-410b is arranged in each case on the head part 6.1-6.21, at the rear towards the grip part 3.

The first brush body 10a-410a comprises a first bristle carrier 11a-411a. The first brush body 10a-210a moreover comprises first cleaning bristles 12a-212a (not shown in FIGS. 20 and 21) which are arranged on the first bristle carrier 11a-411a. The cleaning bristles 12a-212a form a first bristle field.

The second brush body 10b-410b comprises a second bristle carrier 11b-411b. The second brush body 10b-410b moreover comprises second cleaning bristles 12b-212b (not shown in FIGS. 20 and 21) which are arranged on the second bristle carrier 11b.411b. The second cleaning bristles 12b-212b form a second bristle field.

According to the first and second embodiment variant according to FIG. 1a-1d as well as 2a-2d, the first brush body 10a, 20a in a plan view is designed in a round, in particular circularly round manner. The first brush body 10a, as a pivot element comprises a pivot pin 13a, 23a which is arranged on the first bristle carrier 11a, 21a, at the side which lies opposite the first bristle field.

The pivot pin 13a, 23a and via this, the first brush body 10a, 20a are rotatably mounted on the head part 6.1, 6.2, in a pivot receiver or pivot opening or, as mentioned here, in a receiving opening 14a, 24a. The receiving opening 14a, 24a is designed as a continuous round opening in the head part 6.1, 6.2. The round opening does not however need to be continuous, but can also be designed merely as a deepening (recess). The pivot pin 13a, 23a as part of the first brush body 10a, 20a is connected to the head part 6.1, 6.2 via a snap-click connection and is axially secured by way of this. The pivot pin 13a, 23a and thus the geometric rotation axis R are arranged centrically.

The free end of the pivot pin 13a, 23a which lies opposite the first bristle field extends beyond the head part 6.1, 6.2, at the other side of the continuous receiving opening 14a, 24a. First functional elements 15a, 25a such as nubs or lamellae which serve as a tongue cleaner are arranged on this free end. The tongue cleaner is accordingly movable relative to the head part 6.1, 6.2.

The second brush body 10b, 20b is designed in an elongate manner. According to the first embodiment variant according to FIG. 1a-1d, the second brush body 10b comprises two guide elements, here guide pins 13b, which are arranged on the second bristle carrier 11b, distanced to one another along the longitudinal axis L.

According to the second embodiment variant according to FIG. 2a-2d, the second brush body 20b only comprises one guide pin 23b arranged on the second bristle carrier 21b, analogously to the previously described guide elements.

The guide pin or guide pins 13b, 23b are arranged on the second bristle carrier 11b, 21b, at the side which lies opposite the second bristle field.

The guide pin or the guide pins 13b, 23b and, via these, the second brush body 10b, 20b are displaceably mounted on the head part 6.1, 6.2 in a translatory manner along the longitudinal axis L, in a guide opening, here a longitudinal opening 14b, 24b. The longitudinal opening 14b, 24b and the second brush body 10b, 20b with the guide pin or pins 13b, 23b therefore form a slide guide (carriage guide), i.e. a sliding guide, wherein the second brush body 10b, 20b corresponds to the slide.

The longitudinal opening 14b, 24b is designed as a continuous opening in the head part 6.1, 6.2. The opening however does not need to be continuous, but can also be designed merely as a longitudinal groove. The guide pin or guide pins 13b, 23b as part of the second brush body 10b, 20b are connected to the head part 6.1, 6.2 via a snap-click connection and are secured against sliding out of the longitudinal opening 14b, 24b on account of this.

The free end of the guide pin or pins 13b, 23b which lies opposite the second bristle field, in each case extends beyond the head part 6.1, 62, at the other side of the continuous longitudinal opening 14b, 24b. Second functional elements 15b, 25b such as nubs or lamellae which serve as a tongue cleaner are arranged at these free ends.

The first brush body 10a, 20a is then brought into a rotational movement about a rotation axis R by way of the cleaning movement carried out manually with the toothbrush due to a to and fro movement, and by way of exerting a pressing pressure of the brush head 5.1, 5.2 onto the teeth.

The second brush body 10b, 20b is moreover brought into a translatory to and fro movement along the longitudinal opening 14b, 24b, by way of the cleaning movement carried out manually with the toothbrush due to a to and fro movement, and by way of exerting a pressing pressure of the brush head 5.1, 5.2 onto the teeth. With this to and fro movement of the second brush body 10b, 20b, this is moved to the first brush body 10a, 20a and away from this again.

The second bristle carrier 11b, 21b in a plan view moreover forms a concave recess towards the first bristle carrier 11a, 21a, and this recess is designed to receive a part-contour of the first brush body 10a, 20a. By way of this, it is ensured that the brush head 5.1, 5.2 forms an as continuous as possible bristle field, which is to say that the arising gap in the bristle field is kept as small as possible, during the cleaning movement and in every position of the second brush body 10b, 20b along its translatory movement path.

The second embodiment variant according to FIG. 2a-2d moreover differs from the first embodiment variant, essentially in that the head part 6.2 on its rear side comprises third functional elements 26, such as nubs or lamellae, which serve e.g. as a tongue cleaner.

According to a third and fourth embodiment variant according to FIG. 3a-3f as well as 4a-4f, the first brush body 30a, 40b is likewise round, in particular circularly round, in a plan view. The first brush body 30a, 40a comprises a joint head 33a, 43a which is arranged on the first bristle carrier 31a, 41a, at the side which lies opposite the first bristle field.

The first brush body 30a, 40a is articulately mounted on the head part 6.3, 6.4, in a joint opening 34a, 44a via the joint head 33a, 43a. The joint opening 34a, 44a is designed as a continuous round opening in the head part 6.3, 6.4. The round opening however does not need to be continuous, but can also be designed merely as a deepening, e.g. as a type of joint socket. The joint head 22a, 43a as part of the first brush body 30a, 40a is stuck into the joint opening 34a, 44a via a snap-click connection, and is connected to the head part 6.3, 6.4 and is thus secured against jumping out of the joint opening 34a, 44a.

The joint connection permits a deflection of the first brush body 30a, 40a in three directions. The deflection however is only possible over a part-periphery of the pivot circle.

The second brush body 30b, 40b is designed in an elongate manner. According to the third embodiment variant according to FIG. 3a-3f, two encompassing elements 33 which are directed towards one another are formed on the second bristle carrier 31b. According to the fourth embodiment variant according to FIG. 4a-4f, in each case three finger-like encompassing elements 43b are formed on the second bristle carrier 41b per side. The encompassing elements 43b are directed towards one another at both sides.

The encompassing elements 33b, 43b are directed towards the rear side of the head part 6.3, 6.4. The encompassing elements 33b, 43b encompass a longitudinal guide body 34b, 44b at the outer side, wherein this longitudinal guide body is shaped out of the head part 6.3, 6.4. The longitudinal guide body 34b, 44b has the function of a guide rail and, considered in cross section, is designed in a T-shaped manner. A different cross-sectional geometry however is also possible. The T-shaped longitudinal guide body 34b, 44b comprises a middle rib which is led through the encompassing elements 33b, 43b which are directed towards one another. The encompassing elements 33b, 43b with the second bristle carrier 31b, 41b form a slot-like receiving space receiving the flanks of the T-shaped longitudinal guide body 34b, 44b.

The encompassing elements 33b, 43b and the longitudinal guide body 34b, 44b thus together form a sliding guide, which permits the second brush body 30b, 40b to be translatorily displaced on the head part 6.3, 6.4 along the longitudinal axis L. The sliding guide is a slide guide (carriage guide), wherein the second brush body 30b, 40b corresponds to the slide (carriage).

The encompassing elements 33b, 43b ensure that the brush body 30b, 40b cannot detach from the head part 6.3, 6.4 transversely to the movement direction. The second brush body 30b, 40 can be pushed over the longitudinal guide body 34b, 44b, e.g. via a snap-click connection. The encompassing elements 33b, 43b have elastic characteristics for this.

The first brush body 30a, 40a is now deflected out about the rotation point of the joint head 33a, 43a by way of the cleaning movement which is carried out manually with the toothbrush due to a to and fro movement, and by way of exerting a pressing pressure of the brush head 5.3, 5.4 onto the teeth.

Moreover, the second brush body 30b, 40b is brought into a translatory to and fro movement along the longitudinal guide body 34b, 44b by way of the cleaning movement which is carried out manually with the toothbrush due to a to and fro movement, and by way of exerting a pressing pressure of the brush head 5.3, 5.4 onto the teeth. With this movement of the second brush body 30b, 40b, it moves to the first brush body 30a, 40a and away from this again.

The second bristle carrier 31b, 41b moreover in a plan view forms a recess towards the first bristle carrier 31a, 41a, and this recess is designed to receive a part-contour of the brush body 30a, 40a. By way of this, it is ensured that the brush head 5.3, 5.24 forms an as continuous as possible bristle field, which is to say that the arising gap in the bristle field is kept as small as possible, during the cleaning movement and in every position of the second brush body 10b, 20b along its translatory movement path.

According to the fifth embodiment variant according to FIG. 5a-5h, the first brush body 50a is round, in particular circularly round, in a plan view. The first brush body 50a comprises a pivot pin 53a as a pivot element, which is arranged on the first bristle carrier 51, at the side which lies opposite the first bristle field.

The pivot pin 53a and, via this, the first brush body 50a are rotatably mounted on the head part 6.5, in a pivot opening, the receiving opening 54a. The receiving opening 54a is designed as a continuous round opening in the head part 6.5. The round opening however does not need to be continuous, but can also be designed merely as a recess. The pivot pin 53a as part of the first brush body 50a is connected to the head part 6.5 via a snap-click connection and is axially secured by way of this. The pivot pin 53a and thus the geometric rotation axis R are centrically arranged.

The second brush body 50b is designed in an elongate manner and comprises a guide pin 53b as a guide element, which is arranged on the second bristle carrier 51b. The guide pin 53b is arranged on the second bristle carrier 51b, at the side lying opposite to the second bristle field. The guide pin 53b and, via this, the second brush body 50b are displaceably mounted on the head part 6.5, in a guide opening, the longitudinal opening 54b.

The longitudinal opening 54b and the second brush body 50b with the guide pin or guide pins 53b thus form a slide guide, i.e. a sliding guide, wherein the second brush body 50b corresponds to the slide.

The longitudinal opening 54b is formed as a guide groove in the head part 6.5. The opening however can also be designed in a continuous manner. The guide pin 53b as part of the second bristle carrier 51b is connected to the head part 6.5 via a snap-click connection and is prevented from sliding out of the longitudinal opening 54b by way of this.

The longitudinal opening 54b runs obliquely to the longitudinal axis L, in contrast to the first and second embodiment according to FIGS. 1a-1d and 2a-2d, so that the second brush body 50b has a movement component along the longitudinal axis L as well as transversely to the longitudinal axis L. Moreover, the second brush body 50b considered transversely to the longitudinal axis L is guided over an arching. The lower side of the second bristle carrier 51b which lies opposite the second bristle field is concavely recessed in an equal and opposite manner. The movement transverse to the longitudinal axis L becomes a pivoting movement on account of this, with which pivoting movement the second bristle field, which is to say the bristle field of the second brush body 50b, is pivoted to the side about a geometric rotation axis.

The first brush body 50a is now brought into a rotational movement about a rotation axis R by way of the manual cleaning movement which is carried out by the toothbrush due to a to and fro movement, and by way of exerting a pressing pressure of the brush head 5.5 onto the teeth.

The second brush body 50*b* is moreover pushed to and fro along the longitudinal opening 54*b* by way of the cleaning movement which is carried out manually with the toothbrush due to a to and fro movement, and by way of applying a pressing pressure of the brush body 5.5 onto the teeth. Thereby, the second brush body 50*b* executes a combined movement which has a movement component along the longitudinal axis L towards the first brush body 50*a* and away from this again, as well as a lateral pivoting out (see FIGS. 5*f*, 5*g*, 5*h*).

A position is shown in each case in the FIGS. 5*f*, 5*g* and 5*h*. Thereby, FIG. 5*f* shows the middle position when the second brush body 50*b* is located directly in the axis with the head part 6.5. FIG. 5*g* shows the position of the second brush body 50*b* with a maximal deflection to the left. FIG. 5*h* shows the position of the second brush body 50*b* with a maximal deflection to the right.

According to the sixth embodiment variant according to FIG. 6*a*-6*d*, the first brush body 60*a* is designed in a round, in particular circularly round manner, in a plan view, and is fastened to the head part 6.1 in a stationary or rotatable manner.

The second brush body 60*b* is designed in an elongate manner and is translatorily displaceable along the longitudinal axis L, towards the first brush body 60*a* and away from this again, via a sliding guide which is not explained in more detail here.

A rubber-elastic restoring member 63 is arranged between the first and the second brush body 60*a*, 60*b*, at the side of the bristle field. The restoring member 63 in particular is designed from a soft component and as an arching element.

The restoring member 63 is fastened with a first end to the head part 6.6 and with another end to the second brush body 60*b*. The design and fastening of the restoring member 63 are such that this arches given a displacement of the second brush body 60*b* from an initial position towards the first brush body 60*a*, by way of the reduction of the intermediate space between the first and the second brush body 60*a*, 60*b*, and in this manner is put under stress. The restoring member is designed as a flat element in the present example. The restoring member in a further development of the invention can also be designed as a ring-like element (not shown).

The second brush body 60*b* is brought into a translatory to and fro movement by way of the cleaning movement carried out manually with the toothbrush due to a to and fro movement, and by way of exerting a pressing pressure of the brush head 5.6 onto the teeth. With this movement, the second brush body 60*b* moves to the first brush body 60*a* and away from this again.

With the return movement, the second brush body 60*b*, given a reduction of the displacement force, is pushed back into its initial position again by way of the restoring force of the restoring member 63 which is under stress.

Moreover, functional elements 64 in the form of cleaning bristles or lamellae are arranged on the restoring member 63. The functional elements 64 are arranged on the arching section of the restoring member 64, such that these move up and down given a to and fro movement of the second brush body 60*b*.

The various extreme positions are recognisable by way of comparing between the two FIGS. 6*c* and 6*d*. FIG. 6*c* shows the initial position with a functional element 64 which is set more deeply and with an almost flat, rubber-elastic restoring member 63. The distance between the first brush body 60*a* and the second brush body 60*b* is maximal. FIG. 6*d* shows the position of the functional element 64 and of the rubber-elastic restoring member 63, in which the distance between the first brush body 60*a* and the second brush body 60*b* is at its smallest.

According to the seventh embodiment variant according to FIG. 7*a*-7*d*, the first brush body 70*a* in a plan view does not have a completely round shape. The first brush body 70*a* as a pivot element comprises a pivot pin 73*a* which is arranged on the first bristle carrier 71*a*, at the side which lies opposite the first bristle field, and permits a rotation.

The pivot pin 73*a* and, via this, the first brush body 70*a* are rotatably mounted on the head part 6.7, in a pivot receiver, the receiving opening 74*a*. The receiving opening 74*a* is designed as a continuous round opening in the head part 6.7. The round opening however does not need to be continuous, but can also be designed merely as a recess. The pivot pin 73*a* as part of the first brush body 70*a* is connected to the head part 6.7 via a snap-click connection, and is axially secured by way of this. The pivot pin 73*a* and thus the geometric rotation axis R are thus centrically arranged.

The second brush body 70*b* is designed in an elongate manner and comprises a guide pin 73*b* as guide element, which is arranged on the second bristle carrier 71*b*. The guide pin 73*b* is arranged on the second bristle carrier 71*b*, at the side which lies opposite the second bristle field.

The guide pin 73*b* and, via this, the second brush body 70*b* are mounted on the head part 6.7 in a translatorily displaceable manner along the longitudinal axis L, in a guide opening, the longitudinal opening 74*b*. The longitudinal opening 74*b* and the second brush body 70*b*, with the guide pin 73*b* thus form a slide guide, i.e. a sliding guide, wherein the second brush body 70*b* corresponds to the slide.

The longitudinal opening 74*b* is designed as a continuous opening in the head part 6.7. The opening however does not need to be continuous, but can also be designed merely as a longitudinal groove.

The guide pin 73 as part of the second brush body 70*b* is connected to the head part 6.7 via a snap-click connection and by way of this is secured against sliding out of the longitudinal opening 74*b*.

The second bristle carrier 71*b* comprises laterally arranged indentations 76. Moreover, restoring elements 75 of a soft component are arranged in the region of the slide guide in a manner projecting laterally from the head part 6.7. The restoring elements 75 in the initial position of the second brush body 70*b* are positioned in the indentations 76 of the second brush body 70*b*. The restoring elements 75 in each case comprise at least one cleaning bristle 77 which merges into the bristle field of the brush head 5.7.

The second brush body 70*b* is brought into a translatory to and fro movement along the longitudinal opening 74*b* by way of the cleaning movement carried out manually by the toothbrush due to a to and fro movement, and by way of exerting a pressing pressure of the brush head 5.7 onto the teeth. The second brush body 70*b* thereby moves to the first brush body 70*a* and away from this again.

With this movement procedure, the restoring elements 75 in the indentions 76 come to laterally abut with the brush body 70*b* or the bristle carrier in an alternating manner in each case. The elastic restoring members 75 are deformed and/or laterally deflected by way of the displacement force, due to the fact that they cannot slide out of the indentation 76. In this manner, on the one hand a damping effect is applied onto the moving second brush body 70*b*, and on the other hand the individual restoring element 75 also exerts a restoring force upon the moving second brush body 70*b*, bringing this back into its initial position. The restoring elements 75 thus form a restoring member.

The first brush body 70a is moreover brought into a rotational movement about a rotation axis R by way of the cleaning movement carried out manually with the toothbrush due to a to and fro movement, and by way of exerting a pressing pressure of the brush head 5.7 onto the teeth.

The first brush body 70a likewise comprises a restoring element 78. This restoring element is elastically deformed by way of the deflection as is the case with the elements on the second brush body 70b, and thus leads to a restoring of the first brush body 70a into the initial position. The restoring element 78 is fastened directly to the head part 6.7. The restoring element 78 is additionally also designed as a cleaning element/functional element.

According to the eighth embodiment variant according to FIG. 8a-8d, the first brush body 80a is designed in a round, in particular circularly round manner in a plan view. The first brush body 80a comprises a pivot pin 83a as a pivot element, which is arranged on the first bristle carrier 81a, at the side which lies opposite the first bristle field.

The pivot pin 83a and, via this, the first brush body 80a are rotatably mounted on the head part 6.8, in a pivot receiver, the receiving opening 84a. The receiving opening 84a is designed as a continuous round opening in the head part 6.8. The round opening however does not need to be continuous, but can also be designed merely as a deepening. The pivot pin 83a as part of the first bristle carrier 81a is connected to the head part 6.8 via a snap-click connection and is axially secured by way of this. The pivot pin 83a and thus the geometric rotation axis R are centrically arranged.

The second brush body 80b is designed in an elongate manner. Two encompassing elements 83b which are directed towards one another are formed on the second bristle carrier 81b. The encompassing elements 83b are directed to the rear side of the head part 6.8. The encompassing elements 83b encompass or engage around a longitudinal guide body 84b formed on the head part 6.8, at the outer side. The longitudinal guide body 84b has the function of a type of guide rail and is designed in a T-shaped manner considered in cross section. A different cross-sectional geometry however is also possible. The T-shaped longitudinal guide body 84b comprises a middle rib which leads through between the encompassing elements 83b which are directed towards one another. The encompassing elements 83b with the bristle carrier 81b form a slot-like receiving space receiving the flanks of the T-shaped longitudinal guide body 84b.

The encompassing elements 83 and thus the second bristle carrier 81b and the longitudinal guide body 84 together form a slide guide i.e. a sliding guide. This permits the second brush body 80b to be translatorily displaced on the head part 6.8 along the longitudinal axis L. The second brush body 80b thereby corresponds to the slide.

The encompassing elements 83b ensure that the brush body 80b cannot detach from the head part 6.8 transversely to the movement direction. The second brush body 80b can be transversely pushed over the longitudinal guide body 84b via a snap-click connection. The encompassing elements 83b have elastic characteristics for this.

The second bristle carrier 81b comprises carrier sections 86 of a soft component which are arranged at both sides on the base of the encompassing element 83b. A cleaning element 87, such as a cleaning bristle or lamella, e.g. of a soft component is arranged on the carrier sections 86 in each case.

A damping element 85 of a soft component is moreover fixedly arranged on the head part 6.8, between the first and the second bristle carrier 81a, 81b. The damping element 85 has elastic characteristics and executes a damping or buffer function with respect to the second brush body 80b. The damping element 85 is moreover a carrier of cleaning elements 88, such as cleaning bristles or lamellae, e.g. of a soft component.

The cleaning elements 87, 88 mentioned above blend into the existing bristle field.

The second brush body 80b is brought into a translatory to and fro movement along the longitudinal guide body 84b by way of the cleaning movement carried out manually with the toothbrush due to a to and fro movement, and by way of exerting a pressing pressure of the brush head 5.8 onto the teeth. The second brush body 80b thereby moves towards the first brush body 80a and away from this again.

With this movement procedure, the second bristle carrier 81b towards the first brush body 80a comes to abut on the damping element 85 in each case. The abutting or striking of the second brush body 80a on the damping element 85 is damped on account of the elastic characteristics of the damping element 85. The damping element 85 can even exert a restoring force upon the second brush body 80b on account of an elastic deformation, with this procedure.

Moreover, the first brush body 80a is brought into a rotational movement about a rotation axis R by way of the cleaning movement carried out manually with the toothbrush due to a to and fro movement, and by way of exerting a pressing pressure of the brush head 5.8 onto the teeth.

FIGS. 9 and 10 show a first and a second type of slide guide for the second brush body, in combination with restoring members. The slide guide amongst others is described in detail in the embodiment variants according to FIGS. 2a-2d and 7a-7d. The restoring members have elastic characteristics, in particular on account of their shaping.

FIG. 9 shows a longitudinal opening 134b in the head part 6.13. The guide pin 133b of the second brush body, as a guide element, is guided along the longitudinal opening 134b in a sliding manner, in the guide opening, thus this longitudinal opening 134b. A restoring member 135 of a soft or hard component is arranged in the longitudinal opening 134b, in each case on both sides of the guide pin 133b. The two restoring members 135 each comprise a fold structure with a zigzag pattern. The two restoring members 135 are connected in each case with a first end section to the guide pin 133b and with a second end section in the longitudinal opening 134b to the head part 6.13.

The restoring members 135 are in a neutral position, i.e. they are relaxed, when the guide pin 133b is located in the middle of the longitudinal opening 134b. The fold structure of the restoring members 135 at the one side are pulled apart and at the other side are pressed together, by way of displacing the guide pin 133b along the longitudinal opening 134b. The pressed-together restoring member 135 then exerts a restoring force from a compressive stress, upon the guide pin 133b in the direction of the neutral position in the middle of the longitudinal opening 134b. The pulled-apart restoring member 135 likewise exerts a restoring force from a tensile stress, onto the guide pin 133b in the direction of the neutral position. The guide pin 133b and, with this, the second brush body, subsequently to a deflection is led back into the middle of the longitudinal opening 134b by way of the restoring forces of the restoring members 135 in this manner.

FIG. 10 as a guide opening shows a longitudinal opening 144b in a head part 6.14. The guide pin 143b of the second brush body, as a guide element, is slidingly guided along the longitudinal opening 144b in this longitudinal opening 144b.

A restoring member 145 of a soft or hard component is arranged in each case on both sides of guide pin 143*b*, in the longitudinal opening 144*b*. The two restoring members 145 have an arched structure. The two restoring members 145 with a first end section in each case form a contact section to the guide pin 143*b*. The two restoring members 145 are moreover connected in each case and with a second section in the longitudinal opening 144*b*, to the head part 6.14.

If the guide pin 143*b* is located in the middle of the longitudinal opening 144*b*, then the restoring members 145 are located in a neutral position, i.e. they are relaxed. The arched structure of the restoring member 145 is pressed together at the one side due to the displacement of the guide pin 143*b* along the longitudinal opening 144*b*. The pressed-together restoring member 145 now exerts a restoring force from a compressive stress, onto the guide pin 143*b* in the direction of the neutral position in the middle of the longitudinal opening 144*b*. The guide pin 143*b*, and with this, the second brush body, subsequently to a deflection are led back into the middle of the longitudinal opening 144*b* by way of the restoring force of the restoring member 145 in this manner.

The restoring members can also have a different shaping. A restoring member can also be arranged in the longitudinal opening at only one side of the guide pin, in the case that the restoring member in the longitudinal opening is connected on the one hand to the head part and on the other hand to the guide pin.

FIGS. 11*a*-11*b* and 12*a*-12*c* show a ninth and tenth embodiment variant of a toothbrush according to the invention, with which the movement between the first and the second brush body 90*a*, 90*b*; 100*a*, 110*b* is coupled via a coupling element. The coupling element can consist of a hard component or soft component. The coupling element 93, 103 is designed in an elastic, which is to say flexible manner.

The first brush body 90*a*, 100*a* is rotatably mounted on the head part 6.9, 6.10. The second brush body 90*b*, 100*b* is guided on the head part 6.9, 6.19 in a translatorily displaceable manner along the longitudinal axis. L. The manner of guiding is of a lesser significance according to these embodiment examples.

According to the embodiment according to FIG. 11*a*-11*b*, the first and the second brush body 90*a*, 90*b* are directly coupled to one another via a coupling element 93, wherein this coupling element 93 is fixed to the first as well as to the second brush body 90*a*, 90*b*. The connection is such that the translatorily alternately displacing second brush body 90*b* brings the first brush body 90 into a likewise alternating rotation movement via the coupling element 93. The rotation movement however lies within a limited rotation angle, in particular of less than 180°. The coupling element 93 executes the function of a push and pull element.

If the second brush body 90*b* is displaced in the direction towards the first brush body 90*a*, then a movement of the first brush body 90*a* into a rotation direction is initiated via the coupling element 93, in particular until the two brush bodies 90*a*, 90*b* bear on one another. The two brush bodies 90*a*, 90*b* distance themselves to one another again when the second brush body 90*b* moves back again, and the first brush body 90*a* rotates in the opposite direction until the coupling element 93 is extended which is to say stretched.

According to the embodiment according to FIG. 12*a*-12*c*, a coupling element 103 is arranged on the second brush body 100*b*. The coupling element 103 forms a contact section to the first brush body 100*a*, and the opposite side of the coupling element 103 is fixedly and directly connected to the second brush body 100*b*. The first brush body 100*a* has a cog-like peripheral structure, into which the coupling element 103 meshes with its contact section. The first brush body 100*a* according to this embodiment example only has one bristle row 102*a*, for visualising the rotation movement.

The two brush bodies 100*a*, 100*b* interact in a manner such that the translatorily alternately displacing second brush body 100*b* brings the first brush body 100*a* into a rotation movement when contact is created via the coupling element 103. The contact section of the coupling element 103 springs into the next recess of the cog structure during the rotation.

The first brush body 100*a* can be rotatably mounted in only one direction, thus can have a freewheel. By way of this, one succeeds in the first brush body 100*a* not rotating back when the second brush body 100*b* distances itself from this again, and the coupling element 103 drags over the cog-like outer geometry of the brush body 100*a*.

The course of the movement of this principle of the drive of the first brush body 100*a* by the second brush body 100*b* is schematically represented in FIG. 12*a* to 12*c*. The procedure or course is in the sequence of the FIGS. 12*c*, 12*b* and 12*a*.

FIG. 12*c* shows the initial position. The bristle row with the cleaning bristles 102*a* is represented in a first position. In FIG. 12*b*, the coupling element 103 comes into contact with the first brush body 100*a* and rotates this further, as is to be recognised by the position of the represented bristle row. The coupling element 103 is thereby deflected. The second brush body 100*b* is again represented in the initial position in FIG. 12*a*, when this is moved back and the first brush body 100*a* is located in a next engagement position. In a further movement sequence, the second brush body 100*b* again presses coupling element 103 onto the first brush body 100*a* and thus advances the rotation movement of the first brush body 100*a*.

FIGS. 13*a*-13*d* and 14*a*-14*c* shows an eleventh and twelfth embodiment variant with alternative movement concepts for the brush bodies 110*a*, 110*b*; 120*a*; 120*b*.

The brush head 5.11, 5.12 thus comprises a lifting element 113, 123 movably connecting the first brush body 110*a*, 120*a* to the head part 6.11, 6.12 which lies therebelow. The lifting element 113, 123 is thereby fastened on the lower side of the bristle carrier 111*a*, 121*a* which lies opposite the bristle field. The lifting element 113, 123 is designed and fastened on the head part 6.11, 6.12 in a manner such that the first brush body 110*a*, 120*a* is helically movable towards the head part 6.11, 6.12 and away from this, via the lifting element 113, 123.

According to the embodiment variant according to FIG. 13*a*-13*d*, the second brush body 110*b* is articulately connected to the head part 6.11 lying therebelow, via two lifting elements 114 which are arranged distanced to one another. The lifting elements 114 are fastened on the lower side of the second bristle carrier 111*b* which lies opposite the bristle field. The lifting elements 114 are designed and fastened on the brush head 5.11 or on the head part 6.11 such that the second brush body 110*b* via the lifting elements 114 can be moved to the head part 6.11 and away from this, in the manner of a parallelogram.

FIG. 13*d* shows the initial position of the two brush bodies 110*a*, 110*b*, when no force is exerted onto these. The lifting elements 113, 114 have a maximal angle with respect to the head part 6.11. The restoring forces of the lifting elements 113, 114 on account of the geometric shape act such that the mentioned initial position is reached again and again in the non-loaded condition.

The first and the second bristle carrier 111a, 111b are pressed in the direction of the head part 6.11 during the application, by way of exerting a pressure upon the cleaning bristles 112a and 112b. The first bristle carrier 111a on account of the pressure undergoes a movement in the direction of the head part 6.11 and simultaneously a rotation in a direction which is set by the respective lifting element 113. The first bristle carrier 111a carries out a quasi screw (helical) movement.

The second bristle carrier 111b executes a parallelogram-like movement given the application of a pressure. The parallelogram-like movement is a combined movement, on the one hand in the direction of the head part 6.11 and on the other hand in the direction of the neck part of the toothbrush, which is to say in a direction away from the first brush body 110a. The parallelogram-like movement in turn is set by the design of the lifting elements 114.

The design of the brush bodies 110a, 110b and the head parts 6.11 with lifting elements 113, 114 thus encompasses two movement components. A first common movement component runs in the height, i.e. towards the head part 6.11 and away from this again. A second movement component either comprises a rotation about geometric axis or a translation away from the other brush body 110a and back to this again.

FIG. 13c shows the initial position in a plan view. FIG. 13d shows a cross-sectional view of FIG. 13c. FIG. 13a shows the brush head on application of a pressure upon the brush bodies 110a, 110b. FIG. 13b shows a cross-sectional view of FIG. 13a.

According to the embodiment variant according to FIG. 14a-14d, the second brush body 120b is designed as a rocker, with which the second bristle carrier 121b is mounted on a rocker pivot 124. The rocker pivot 124 is aligned transversely to the longitudinal axis L and lies parallel to the geometric cleaning plane. The second bristle carrier 121 can thus execute a rocking movement with respect to the head part 6.12.

The movement of the brush bodies 110a, 110b; 120a, 120b relative to the head part 6.11, 6.12 is likewise activated by way of the manually executed cleaning movement of the toothbrush due a to and fro movement and exerting a pressing pressure of the brush head 5.11 and 5.12 respectively, upon the teeth.

According to the thirteenth embodiment variant according to FIG. 15a-15e, the first brush body 150a in a plan view is designed in a round manner, in particular in a circularly round manner. The first brush body 150a as a pivot element comprises a pivot pin 153a which is arranged on the first bristle carrier 151a, at the side which lies opposite the first bristle field.

The pivot pin 153a and, via this, the first brush body 150a are rotatably mounted on the head part 6.15, in the pivot receiver, a receiving opening 154a. The receiving opening 154a is designed as a continuous round opening in the head part 6.15. The round opening however does not need to be continuous, but can also be designed merely as a deepening. The pivot pin 153a as part of the first bristle carrier 151a is connected to the head part 6.15 via a snap-click connection and is axially secured by way of this. The pivot pin 153a and thus the geometric axis R are arranged centrically.

The second brush body 150b is designed in an oval manner. The second brush body 150b comprises a pivot pin 153b as a pivot element, which is arranged on the second brush body 150b, at the side which lies opposite the second bristle field.

The pivot pin 153b and, via this, the second brush body 150b are rotatably mounted on the head part 6.15, in the pivot receiver, a receiving opening 154b. The receiving opening 154 is likewise designed as a continuous round opening in the head part 6.15. The round opening however does not need to be continuous, but can also be designed merely as a deepening. The pivot pin 153b as part of the second brush body 150b is connected to the head part 6.15 via a snap-click connection, and is axially secured by way of this. The pivot pin 153b and thus the geometric rotation axis R' are however arranged eccentrically with respect to the second bristle carrier 151b. For this reason, the second brush body 150b laterally deflects given a rotation movement about the rotation axis R'.

The two brush bodies 150a, 150b are commonly encompassed by a rubber-elastic encompassing element 155 which is attached directly to both brush bodies 150a and 150b.

The second brush body 150b is brought into a rotation movement about a rotation axis R' by way of the cleaning movement carried out manually with the toothbrush due to a to and fro movement, and by way of exerting a pressing pressure of the brush head 5.15 onto the teeth.

Thereby, the second brush body pivots out laterally on account of the eccentric arrangement of the rotation axis R' and exerts a deflection force onto the encompassing element 155. The deflection force effects a tensile stress in the encompassing element 155 which leads to a stretching (straining) of this. The first brush body 150a is set into rotation by way of the stretching movement of the encompassing element 155.

The influencing of the movements is effected mutually, so that the first brush body 150 can bring the second brush body 150b into movement.

According to a fourteenth embodiment variant according to FIG. 16a-16h, a second brush body 160b which is designed in a horseshoe-like manner is arranged on the head part 6.16. The horseshoe-shaped second brush body 160b forms two flexible limbs which enclose a receiving space. Both limbs have elastic characteristics and are movable laterally outwards by way of this. The elastic characteristics are achieved for example by way of flexible zones in the limbs or by way of the geometric design of the limbs. The limbs in particular consist of a hard component, so that the bristles can likewise be anchored. Cleaning bristles 162b which form a bristle field are arranged on the limbs. The receiving space is open to the free end of the brush head 5.16.

A first brush body 160a which with a section reaches into the horseshoe-like opening of the second brush body 160b is arranged on the head part 6.16, towards the free end of the brush head 5.16. The first brush head 160a is guided in a translatorily displaceable manner along the longitudinal axis L via a slide guide. The slide guide comprises a guide groove 165 in the head part 6.16, as well as a guide element 166 on the first brush body 160a and guided in the guide groove 165. The guide element 166 is arranged on the first bristle carrier 161a, at the side which lies opposite the bristle field. The guide element 166 is inserted into the guide groove via a snap-click connection and is secured against sliding out. The slide guide can however also be designed differently.

The first brush body 160a is brought into a translatory movement by way of the cleaning movement carried out manually with the toothbrush due to a to and fro movement, and by way of exerting a pressing pressure of the brush head 5.16 onto the teeth. The first brush body 160a is thereby pushed into the opening between the two limbs of the second brush body 160b. With this procedure, the first brush body 160a exerts a spreading force onto the two limbs. The two limbs as a result of this are pressed apart and deflect laterally amid the enlarging of the opening. The two limbs also retreat again back into their initial position on account of an elastic restoring force, with the retreat of the first brush body 160a out of the opening with the counter movement.

According to a fifteenth embodiment variant according to FIG. 17a-17d, the brush head 5.17 in contrast to the preceding embodiment variants merely comprises one brush body 170a which is movably arranged on the head part 6.17.

The brush body 170a is arranged at the front, i.e. on the free end-section of the head part 6.17. The brush body 170a comprises a bristle carrier 171 as well as first cleaning bristles 172a which are arranged on the bristle carrier 171. These first cleaning bristles 172a form a first bristle field.

A second bristle field with second cleaning bristles 172b is arranged subsequently to the brush body 170a in the direction of the grip part. The second cleaning bristles 172b are anchored directly in the head part 6.17. The cleaning bristles can also be anchored in a bristle carrier of a second brush body fixedly arranged on the head part, as an alternative to this embodiment. The second bristle field as a whole is however not movable relative to the head part.

The movable brush body 170a is designed in a round manner in a plan view. As a pivot element, it comprises a pivot pin 173 which is arranged on the bristle carrier 171, at the side which lies opposite the first bristle field.

The pivot pin 173 and, via this, the movable brush body 170a are rotatably mounted on the head part 6.17, in a pivot receiver or pivot opening or, as mentioned here, a receiving opening 174. The receiving opening 174 is designed as a continuous round opening in the head part 6.17 The round opening however does not need to be continuous, but can also be designed merely as a deepening. The pivot pin 173 as part of the movable brush body 170a is connected to the head part 6.17 via a snap-click connection, and is axially secured by way of this. The pivot pin 173 and thus the geometric axis R are arranged centrically.

The free end of the pivot pin 173 which lies opposite the first bristle field extends beyond head part 6.17, at the other side of the continuous receiving opening 174.

The movable brush body 170a is now brought into a rotation movement about a rotation axis R by way of the cleaning movement carried out manually with the tooth brush due to a to and fro movement, and by way of exerting a pressing pressure of the brush head 5.17 onto the teeth.

FIG. 18 shows a longitudinal section through a particular embodiment of a rotating brush body 180a. The rotating brush body 180a with regard to the design and arrangement on the head part 6.18 is designed in the same manner, with the exception of the subsequently described differences.

In contrast to the embodiment variant according to FIG. 1a-1d, the cleaning bristles 182 are not arranged, i.e. attached to the bristle carrier 181 in a direct manner, or integrally manufactured with this, but are fastened on a carrier body 186. The cleaning bristles 182 are hereby fastened on the carrier body 186 by way of a so-called AFT method. This is effected by way of the cleaning bristles 182 being led through through-openings in the carrier body 186. Thereby, the end sections of the cleaning bristles 182 which exit out of the through-openings at the other end are melted amid the formation of a molten puddle. The cleaning bristles 182 are thus anchored in the carrier body 186 due to the re-solidified molten puddle. The carrier body 186 is subsequently fastened to the bristle carrier 181. The carrier body 186 is inserted into a deepening in the bristle carrier 181 for this.

Yet further functional elements, such as soft-elastic bristles, can be attached on the carrier body 186. Further functional elements 185 are arranged on the pivot element 183.

The first brush body 210a according to the embodiment variant according to FIG. 19a-19d is designed in a round, in particular circularly round manner, in a plan view. The first brush body 210a comprises a first bristle carrier 211a, on which first cleaning bristles 212a forming a first bristle field are arranged.

The first bristle carrier 211a moreover comprises a pivot pin 213a which is arranged at the side lying opposite the first bristle field. The head part 6.19 comprises a pivot receiver or pivot opening for the rotatable mounting of the pivot pin 213a.

The pivot pin 213a and, via this, the first brush body 210a are rotatably mounted on the head part 6.19, in the pivot receiver or pivot opening.

The pivot opening is designed as a continuous round opening in the head part 6.19. The round opening however does not need to be continuous, but can also be designed merely as a deepening. The pivot pin 213a as part of the first brush body 210a is connected to the head part 6.19 and axially secured via a positive connection. The free end of the pivot pin 213a amid widening thereby extends beyond the head part 6.19 at the other side of the continuous receiving opening.

The second brush body 210b is designed in an elongate manner and comprises a second bristle carrier 211b. Second cleaning bristles 212b forming a second bristle field are arranged on the second bristle carrier 211b. A sliding lobe 213b is moreover arranged on the second bristle carrier.

The sliding lobe 213b is arranged on the second bristle carrier 211b at the side which lies opposite the second bristle field and is displaceable relative to the head part 6.19 along the longitudinal axis L, in a longitudinal opening 214b in the head part 6.19. The second brush body 210b is translatorily displaceable along the longitudinal axis L by way of this. The movement path is delimited by the length and the design of the longitudinal opening.

The first and second brush body 210a, 210b or bristle carriers 211a, 211b are now coupled to one another via a coupling mechanism 215. The coupling mechanism 215 comprises a cog 217 which is arranged on the first bristle carrier 211a concentrically to the rotation axis R. The coupling mechanism 215 moreover comprises a rack 216 with a toothing, said rack being connected to the second bristle carrier 211b and being directed to the first bristle carrier 211a. The rack 216 with its toothing meshes on the cog 217.

The coupling is now of such a nature that the alternately translatorily moved second brush body 210b brings the first brush body 210a into an alternating rotation movement via the coupling mechanism 215.

The first and the second bristle carrier 211a, 211b thus together form a bristle carrier unit 220.

Hereby, the rack 216 which is translatorily moved together with the second brush body 210b, on account of the meshing engagement, brings the cog 217 and, with this, the first brush body 210a into a rotation movement. The rotation movement however lies within a limited rotation angle of less than 360°.

The rotation angle amongst other things is defined by the toothing on the cog 217, the toothing length on the rack 216 and the possible translatory movement of the second brush body 210a.

If the second brush body 210*b* is now translatorily moved to the first brush body 210*a*, then a simultaneous rotation movement of the first brush body 210*a* is initiated via the coupling mechanism 215. The two brush bodies 210*a*, 210*b* move away from one another again when the second brush body 210*b* moves back again in a translatory manner, and the first brush body 210*d* simultaneously rotates back in the opposite direction.

The coupling mechanism 215 thus has the effect of the first brush body 210*a* or the first bristle carrier 211*a* simultaneously carrying out rotation movement, given a translatory movement of the second brush body 210*b* or the second bristle carrier 211*b*.

According to the embodiment variants according to FIGS. 20*a*-20*k* and 21*a*-21*k*, the brush head 5.20, 5.21 comprises a head part 6.20, 6.21 as well as a bristle carrier unit 320, 420 which is assembled on the head part 6.20, 6.21.

The bristle carrier unit 320, 420 comprises a first bristle carrier 311*a*, 411*a* which is designed in a round manner in a plan view, as well as a second bristle carrier 311*b*, 411*b* which is elongate in a plan view. The bristle carriers 311*a*, 311*b*; 411*a*, 411*b* each together with bristles (not shown) form a first and second brush body respectively. For this, the bristles carriers 311*a*, 311*b*; 411*a*, 411*b* comprise receivers for bristles, at the side which is away from the head part 6.20, 6.21.

The bristle carrier unit 320 420 moreover comprises a coupling mechanism 315, 415 which mechanically connects the two bristle carriers 311*a*, 311*b*; 411*a*, 411*b* to one another.

The first bristle carrier 311*a*, 411*a* is rotatably mounted and held on the head part 6.20, 6.21 in a receiving opening 314*a*, 414*a*, via a pivot pin 313*a*, 413*a* which is arranged on the first bristle carrier 311*a*, 411*a*, at the side which lies opposite to the first bristle field (not shown). The second bristle carrier 311*b*, 411*b* is mounted and held on the head part 6.20, 6.21 in a translatorily displaceable manner along the longitudinal axis L in a longitudinal opening 314*b*, 414*b*, via a sliding lobe 313*b*, 413*b* which is arranged on the second bristle carrier 311*b*, 411*b*, at the side which lies opposite to the second bristle field (not shown).

According to the embodiment variant according to FIG. 20*a*-20*k*, the coupling mechanism 315 comprises a guide arm 316 which is centrally arranged, runs parallel to the longitudinal axis L and connects the two bristle carriers 311*a*, 311*b*, which is to say their pivot pins 313*a* and sliding lobes 313*b* to one another. The guide arm 316 in particular is of a hard plastic. The guide arm 316 in particular is designed as a separate component which is arranged on the rear side of the head part 6.21 which lies opposite the bristle field.

The guide arm 316 is fastened on the sliding lobe 313*b* of the second bristle carrier 311*b* and is movable relative to this. The guide arm 316 in particular is hung in on the sliding lobe 313. The connection in particular can be a detent connection. The connection is preferably non-releasable or only releasable by destruction.

The guide arm 316 is bent to the side in the region of the pivot pin 313*a* of the first bristle carrier 311*a*. The bent arm section of the guide arm 316 at its free end comprises a receiving opening for receiving a guide pin 317, said guide pin being arranged on the pivot pin 313*a*, radially to the outside with respect to the rotation axis of the first bristle carrier 311*a*. The receiving opening has play with respect to the guide pin 317 guided in the receiving opening. The receiving opening can e.g. be slot-like. The accommodation with play is necessary, in order to permit the subsequently described movement.

The coupling mechanism 315 is designed and connected to the bristle carriers 311*a*, 311*b* such that a translatory movement of the sliding lobe 313*b* in the longitudinal opening 314*b* is transmitted onto the guide arm 316 and its receiving opening at the free end of the angled (bent) arm section.

As a result of this, the guide pin 317 which is guided in the receiving opening is likewise brought into movement, by which means the first bristle carrier 311*a* executes a part-peripheral rotation movement about its rotation axis. The rotation angle can be 10° to 70°, in particular 15° to 45°.

The movement of the guide pin 317 as a result is effected along a circular path about the rotation axis of the bristle carrier 311*a*, whilst the receiving opening on the bent arm section carries out a translatory moment. The guiding of the guide pin 317 in the receiving opening with play then ensures that no stresses are introduced into the guide arm 316 despite a different movement path. This is of particular significance if the guide arm is not elastic or is only elastic to a limited extent.

The coupling mechanism 315 thus has the effect that the first bristle carrier 311*a* simultaneously executes a rotation movement, in the case of a translatory movement of the second bristle carrier 311*b*.

According to the embodiment according to FIG. 21*a*-21*k*, the coupling mechanism 415 comprises a guide arm 416 which is arranged laterally on the bristle carrier unit 420, runs parallel to the longitudinal axis L and connects both bristle carriers 411*a*, 411*b* to one another. The guide arm 416 in particular is of a hard plastic.

The guide arm 416 in the region of the pivot pin 413*a* of the first bristle carrier 411*a* is angled to the rotation axis R. The angled arm section of the guide arm 416 is thereby connected to the pivot pin 413*a* of the first bristle carrier 411*a*. The angled arm section in particular is hung in a groove on the first bristle carrier 411*a* or its pivot pin 413*a*, e.g. via a latch connection. The guide arm 416 runs between the front side and the rear side of the head part 6.21, within the brush body 5.21.

The coupling mechanism 415 is designed and connected to the bristle carriers 411, 411*b* such that a translatory movement of the second bristle carrier 411*b* is transmitted onto the guide arm 416 and accordingly onto the angled arm section.

The first bristle carrier 411*a* is then brought into a part-peripheral rotation movement via the bent arm section. The effect of the coupling mechanism 415 is such that the first bristle carrier 411*a* simultaneously executes a rotation movement given a translatory movement of the second bristle carrier 411*b*.

According to the embodiment variant according to FIGS. 20*a*-20*k* and 21*a*-21*k*, individual functional elements, in particular cleaning bristles 377, 477 are arranged laterally on the head part 6.20, 6.21, in the region of the second bristle carrier 311*b*, 411*b*. The functional elements, in particular bristles 377, 477 are connected to the head part 6.20, 6.21 via a holding section 375, 475. The holding section 375, 475 at the same time forms a delimitation element 375, 475 for delimiting the translatory movement of the second bristle carrier 311*b*, 411*b*.

For this, the second bristle carrier 311*b*, 411*b* comprises laterally arranged indentations 376, 476, in which the holding sections 375, 475 of the functional elements 377, 477 are guided with play. The bristle carriers 311*b*, 411*b* now can be translatorily displaced in the longitudinal direction L only as far as the indentations 376, 476 have play with respect to the holding sections 375, 475. The play between the indentations 376, 476 and holding sections 375, 475 defines the maximal possible movement path.

With the previously mentioned embodiment examples, it is conceivable for the one bristle carrier or brush head to be actively motorically driven and in this manner to indirectly co-drive the other bristle carrier or brush head. The motoric drive can be electrical.

The invention claimed is:

1. A toothbrush comprising:
 a main body including a grip part, a neck part, and a head part; and
 at least one first brush body and at least one second brush body that are each arranged in the head part and are each movable relative to the head part, the first brush body and the second brush body each forming, together with the head part, a part of a brush head, wherein:
  the first brush body is rotatably mounted on the head part about a geometric rotation axis, within a rotation angle, and the first brush body is rotatable relative to the head part via a cleaning movement exerted manually onto a plurality of teeth, and
  the second brush body is translatorily movably mounted on the head part along a longitudinal axis of the toothbrush, and the second brush body is translatorily movable relative to the head part via the cleaning movement exerted manually onto the plurality of teeth.

2. The toothbrush according to claim 1, wherein the main body is manufactured in a single-part using an injection moulding method.

3. The toothbrush according to claim 1, wherein the first brush body and the second brush body are movable independently of one another.

4. The toothbrush according to claim 1, wherein the first brush body and the second brush body are coupled to one another via a coupler of a coupling mechanism, such that a movement of the first brush body activates a movement of the second brush body via the coupler.

5. The toothbrush according to claim 1, wherein the second brush body is arranged on the head part next to the first brush body towards the grip part.

6. The toothbrush according to claim 1, wherein the second brush body is translatorily movable along a slide guide.

7. The toothbrush according to claim 6, wherein the slide guide includes a longitudinal guide body that is formed by the head part and on which the second brush body is slidingly guided via at least one guide element, the at least one guide element at least partly encompassing the longitudinal guide body.

8. The toothbrush according to claim 6, wherein the slide guide includes a guide opening that is formed by the head part and along which the second brush body is slidingly guided via at least one guide element engaging into the guide opening.

9. The toothbrush according to claim 1, wherein the first brush body is configured to be deflected about a rotation point in three axis directions via a joint connection to the head part.

10. The toothbrush according to claim 9, wherein the joint connection is a ball joint, the ball joint including a joint head and a joint socket.

11. The toothbrush according to claim 1, wherein a restoring member is provided on the head part or on at least one of the first brush body from body and the second brush body, the restoring member being configured to restore the at least one of the first brush body and the second brush body to an initial position from a rotative or translatory deflection.

12. The toothbrush according to claim 11, wherein the restoring member is formed by a soft component with elastic characteristics.

13. The toothbrush according to claim 11, wherein the restoring member is a spring.

14. The toothbrush according to claim 11, wherein the restoring member includes at least one deflection element that is arranged on the head part laterally of the brush body and that projects laterally from the head part such that the deflection element is deflected in a movement direction via a catch contact with the at least one of the first brush body and the second brush body, upon a translatory displacement of the at least one of the first brush body and the second brush body.

15. A method for manufacturing the toothbrush according to claim 1, wherein manufacturing of at least the main body is performed by an injection moulding method.

* * * * *